US012481842B2

(12) United States Patent
Liu et al.

(10) Patent No.: US 12,481,842 B2
(45) Date of Patent: Nov. 25, 2025

(54) TRANSLATION METHOD AND ELECTRONIC DEVICE

(71) Applicant: Honor Device Co., Ltd., Shenzhen (CN)

(72) Inventors: Junfeng Liu, Beijing (CN); Chaojie Yan, Beijing (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/004,797

(22) PCT Filed: Aug. 18, 2022

(86) PCT No.: PCT/CN2022/113390
§ 371 (c)(1),
(2) Date: Jan. 9, 2023

(87) PCT Pub. No.: WO2023/030030
PCT Pub. Date: Mar. 9, 2023

(65) Prior Publication Data
US 2024/0127007 A1    Apr. 18, 2024

(30) Foreign Application Priority Data

Sep. 2, 2021  (CN) .......................... 202111028829.9
Jan. 10, 2022 (CN) .......................... 202210023045.5

(51) Int. Cl.
*G06F 40/58*     (2020.01)
*G06F 3/0482*    (2013.01)
*G06F 3/0488*    (2022.01)

(52) U.S. Cl.
CPC ............ *G06F 40/58* (2020.01); *G06F 3/0482* (2013.01); *G06F 3/0488* (2013.01); *G06F 2203/04803* (2013.01)

(58) Field of Classification Search
CPC ...... G06F 40/58; G06F 3/0482; G06F 3/0488; G06F 2203/04803; G06F 3/04842; G06F 9/54
See application file for complete search history.

(56) References Cited

U.S. PATENT DOCUMENTS 6,772,110 B2 * 8/2004 Real ........................ G06F 9/453
                                                     715/708
9,928,803 B2   3/2018 Hillebrand et al.
(Continued)

FOREIGN PATENT DOCUMENTS

CN     101609403 A    12/2009
CN     102722479 A    10/2012
(Continued)

OTHER PUBLICATIONS

Sang, "Application of navigation control in asp.net", Journal of Fujian Computer, Sep. 25, 2017, 6 pages. With translation.
(Continued)

Primary Examiner — Michael Colucci
(74) Attorney, Agent, or Firm — Conley Rose, P.C.

(57)    ABSTRACT

A translation method and an electronic device. In the event that a user selects a to-be-translated word, an option bar is displayed. Then, a floating window with a translation result of the word is displayed on a current page of a current application based on different operations of the user. The floating window does not preempt a focus with a page window of the current application. Therefore, the user can continue to browse the current page without closing the floating window. If the user needs to query a new word, the user selects another word. Based on different operations of the user, the floating window with a translation result may be displayed on the current page of the current application. The invention facilitates continuous translation within the same (Continued)

application where the user can simultaneously browse the content of the same application.

20 Claims, 63 Drawing Sheets

(56) References Cited

U.S. PATENT DOCUMENTS

| | | | |
|---|---|---|---|
| 11,163,851 | B2 | 11/2021 | Shi |
| 2006/0173829 | A1* | 8/2006 | Neeman ............... G06F 16/951 |
| 2009/0132257 | A1* | 5/2009 | Chiu ..................... G06F 40/47 |
| | | | 704/E15.04 |
| 2014/0130882 | A1 | 5/2014 | Xiong et al. |
| 2015/0227509 | A1 | 8/2015 | Landau |
| 2016/0004315 | A1 | 1/2016 | Morey |
| 2018/0135325 | A1 | 5/2018 | Schloss et al. |
| 2018/0181396 | A1 | 6/2018 | Ostanevich et al. |
| 2018/0367666 | A1* | 12/2018 | Won ..................... G06F 3/0488 |
| 2019/0332412 | A1 | 10/2019 | Boggarapu et al. |
| 2020/0409512 | A1* | 12/2020 | Jing ..................... G06F 3/0481 |
| 2021/0004432 | A1* | 1/2021 | Li ......................... G06F 40/295 |
| 2021/0157464 | A1* | 5/2021 | Innanje ................ G06T 11/206 |
| 2022/0050975 | A1 | 2/2022 | Peng et al. |
| 2022/0382448 | A1 | 12/2022 | Lu et al. |

FOREIGN PATENT DOCUMENTS

| | | | |
|---|---|---|---|
| CN | 105677178 | A | 6/2016 |
| CN | 107153541 | A | 9/2017 |
| CN | 107608652 | A | 1/2018 |
| CN | 107818163 | A | 3/2018 |
| CN | 107870711 | A | 4/2018 |
| CN | 107943796 | A | 4/2018 |
| CN | 107992346 | A | 5/2018 |
| CN | 108073398 | A | 5/2018 |
| CN | 108415752 | A | 8/2018 |
| CN | 108595445 | A | 9/2018 |
| CN | 108600848 | A | 9/2018 |
| CN | 108628521 | A | 10/2018 |
| CN | 108664475 | A | 10/2018 |
| CN | 109359280 | A | 2/2019 |
| CN | 109408012 | A | 3/2019 |
| CN | 109543193 | A | 3/2019 |
| CN | 109561149 | A | 4/2019 |
| CN | 109669742 | A | 4/2019 |
| CN | 109782920 | A | 5/2019 |
| CN | 110032318 | A | 7/2019 |
| CN | 110058778 | A | 7/2019 |
| CN | 110166586 | A | 8/2019 |
| CN | 110286816 | A | 9/2019 |
| CN | 110442879 | A | 11/2019 |
| CN | 110806831 | A | 2/2020 |
| CN | 110837406 | A | 2/2020 |
| CN | 111310482 | A | 6/2020 |
| CN | 111401323 | A | 7/2020 |
| CN | 111680521 | A | 9/2020 |
| CN | 111967275 | A | 11/2020 |
| CN | 306273513 | S | 1/2021 |
| CN | 112764615 | A | 5/2021 |
| CN | 112764834 | A | 5/2021 |
| CN | 112905093 | A | 6/2021 |
| CN | 113010162 | A | 6/2021 |
| CN | 113138915 | A | 7/2021 |
| CN | 113157906 | A | 7/2021 |
| CN | 306713384 | S | 7/2021 |
| CN | 113253880 | A | 8/2021 |
| EP | 2916183 | A1 | 9/2015 |
| EP | 4033394 | A1 | 7/2022 |
| WO | 2021052458 | A1 | 3/2021 |

OTHER PUBLICATIONS

The End of the World, "Words can be translated offline", Computer Fan, Jul. 1, 2016, URL:http://www.cfan.com.cn/2016/0602/126428.shtml.

Swagger, "iOS 15 global translation", Jun. 8, 2021, Retrieved from the internet,URL:http://www.zhihu.com/zvideo/1385683811209015296?utm_id=0.

* cited by examiner

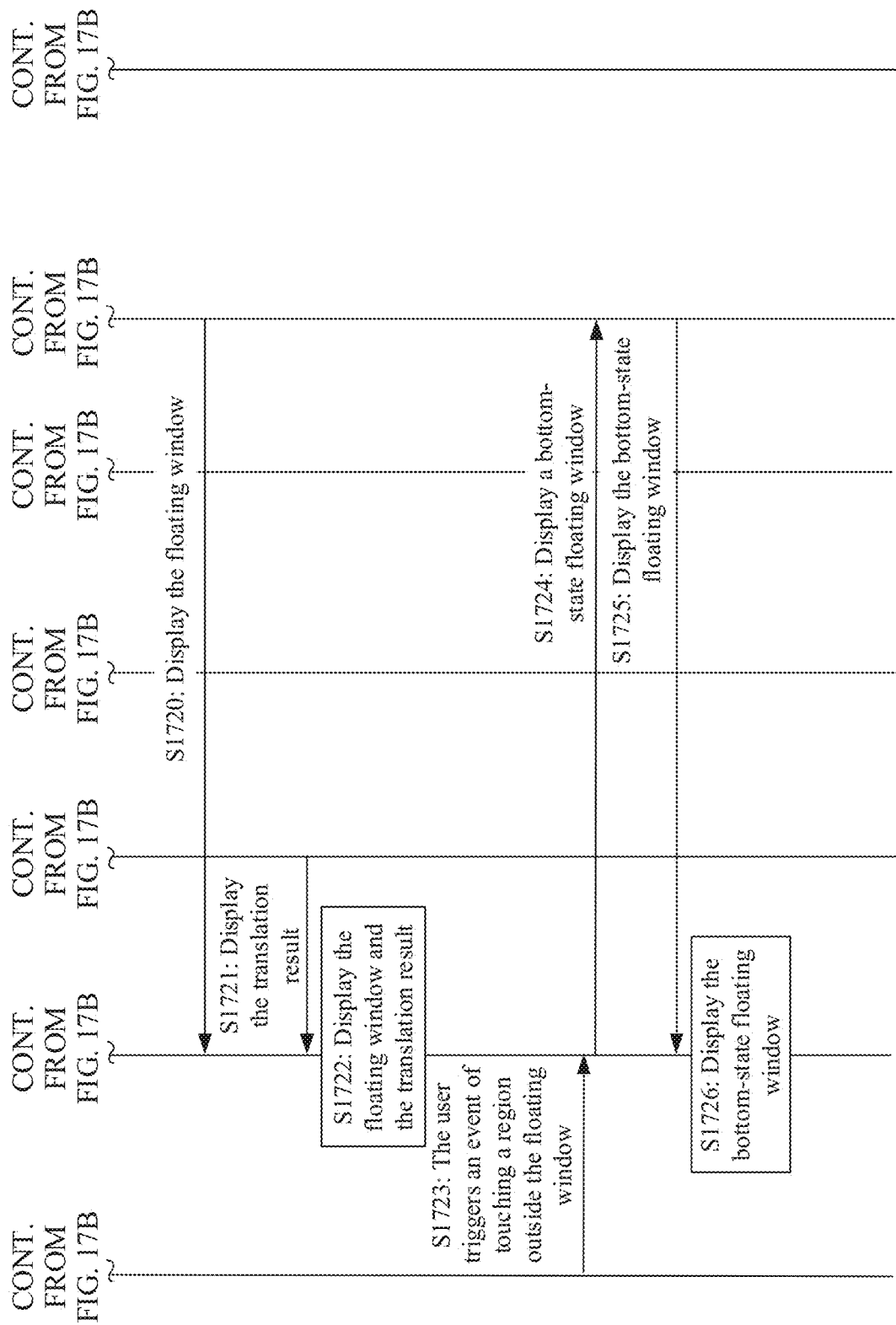

TRANSLATION METHOD AND ELECTRONIC DEVICE

CROSS-REFERENCE TO RELATED APPLICATIONS

This application is a U.S. National Stage of International Application No. PCT/CN2022/113390 filed on Aug. 18, 2022, which claims priority to Chinese Patent Application No. 202111028829.9, filed with the China National Intellectual Property Administration on Sep. 2, 2021, and Chinese Patent Application No. 202210023045.5, filed with the China National Intellectual Property Administration on Jan. 10, 2022, all of which are incorporated herein by reference in their entireties.

TECHNICAL FIELD

This application relates to the field of computer technologies, and specifically, to a translation method and an electronic device.

BACKGROUND

Translation, especially machine translation, is greatly needed by users that usually need to consult foreign literature. Built-in translation applications or installed third-party translation applications on mobile terminals can meet translation requirements of these users anytime and anywhere, and translate a to-be-queried word or sentence into a target language in real time. This brings great convenience to the users. However, most translation applications in the current market require a user to switch back and forth between a current application and the translation application after a to-be-translated text is obtained, to obtain a translation result. Operation steps are cumbersome, and consequently translation efficiency is low, affecting user experience.

SUMMARY

This application provides a translation method and an electronic device. In the method, when reading foreign literature by using an application, a user may select a to-be-translated word, so that a floating window is displayed on a current page of the current application, and a translation result of the word selected by the user is presented in the floating window. In addition, the floating window does not preempt a focus with a page window of the current application. Therefore, after querying the word, the user can continue to browse the original text without closing the floating window. In a process of continuing to browse a page on the current application, when the user needs to query a new word, the user may further select the to-be-translated word, so that a floating window is displayed on the current page of the current application, and a translation result of the newly selected word is displayed in the floating window. This is particularly applicable to a scenario in which the user requires continuous translation. In a process in which the user uses the application, experience of browsing the original text by the user is not affected.

According to a first aspect, a translation method is provided, including an electronic device and an application. The method includes: displaying a first interface of the application, where the first interface includes a first text and a first floating ball control; displaying a first control in response to a first operation performed by a user on the first text, where the first control includes a copy option and a translation option; writing the first text into a clipboard of the electronic device in response to a copy operation performed by the user on the copy option, and after the copy operation, displaying a floating window in the first interface in response to a floating ball operation performed by the user on the first floating ball control, where the floating window includes the first text and a first translation corresponding to the first text, and the floating window is displayed in a first state; displaying the first control in response to a second operation performed by the user on the first text; and displaying the floating window in the first interface in response to a translation operation performed by the user on the translation option, where the floating window is displayed in a second state, and the second state is the same as or different from the first state.

For example, the first interface of the application includes a page that has a text, for example, a read page in a read application that has a readable text, a web page in a browser that has text content that can be browsed, a chat interface of a chat application that has a text entered by a user, or a note page of a memo application that has note content entered and stored by a user.

In this way, when the user reads foreign literature by using an application, a floating window may be displayed on a current page of the current application by selecting a word that needs to be translated, and a translation result of the word selected by the user is presented in the floating window. Therefore, the user does not need to exit the current application and switch to a third-party translation application to query the word. A real-time translation query can be implemented on the current pane of the current application, and a translation result is obtained without switching between the current application and the translation application, so that translation efficiency is improved.

In a possible implementation, the copy option may also be replaced with a cut option.

In a possible implementation, the first text does not include a web address, an email address, or a password generated by using a machine, and the first text is different from a system language of the electronic device.

For example, the password generated by the machine includes a password such as a Taobao password or a Tik Tok password, and is usually used to correspond to a specific commodity or video page. Therefore, it is determined that the user does not have a requirement for translating such text in this case. In this way, disturbance to the user may be reduced as much as possible, thereby improving user experience.

In a possible implementation, the application does not include a consumer application, an entertainment application, or a video application.

For example, the consumer application includes an application such as Taobao or Jingdong, the entertainment application includes an application such as Tik Tok or a game, and the video application includes an application such as Tencent Videos or iQIYI. When the user uses the foregoing application, it is determined that the user is in an entertainment state, and therefore it is determined that the user does not have a requirement for translating such text in this case. In this way, disturbance to the user may be reduced as much as possible, thereby improving user experience.

In a possible implementation, the first operation includes any one of a selection operation, a touch operation, a tap operation, a slide operation, a touch and hold operation, or a double-tap operation on the first text, and the second operation includes any one of a selection operation, a touch operation, a tap operation, a slide operation, a touch and hold operation, or a double-tap operation on the first text.

For example, the foregoing first operation and second operation are intended to select a text. Therefore, there are a plurality of manners for selecting a text that the user needs to translate. This is not limited in the implementation of this application.

In a possible implementation, after the first interface displays the floating window, the first interface does not display the first floating ball control and/or the first control.

For example, after the floating window is displayed, the foregoing first floating ball control and the first control are hidden. In this way, a quantity of icons whose functions are repeated on the current page of the current application can be reduced as much as possible, to reduce disturbance to the user. In addition, the floating window necessary for the translation operation of the user can be displayed, so that user experience is improved.

In a possible implementation, the first state of the floating window includes any one of a bottom state, a half-screen state, or a full-screen state, and the second state of the floating window includes any one of the bottom state, the half-screen state, or the full-screen state.

For example, the floating window includes three forms. Different states are successively classified into the bottom state, the half-screen state, and the full-screen state in ascending order of screen occupation heights. According to the user's selection, the floating window is displayed in different states. Correspondingly, due to different areas displayed in the floating window, translation result content displayed in the full-screen state is more than that displayed in the half-screen state and the bottom state. Similarly, translation result content displayed in the half-screen state is more than that displayed in the bottom state. In this way, user experience for the floating window is enriched by displaying floating windows in different forms, thereby improving user experience.

For example, when the user queries a new word, a state of the floating window; for example, the first state and the second state, may be the half-screen state. Therefore, in this state, the user can obtain a translation result of the queried word in the floating window, and can conveniently operate the first interface of the current page, so that selection of the user is more flexible, and user experience is better.

In a possible implementation, after the floating window is displayed, the first interface further includes a first region, and the first region is a region other than the floating window in the first interface.

For example, when the floating window is displayed, the current page of the application includes the floating window and a remaining region other than a region occupied by the floating window on the current page. The first region may be the remaining region other than the region occupied by the floating window on the current page. In this way, the first region is disposed to meet a requirement that the user can conveniently browse or slide content in the first interface of the current application at any time in a process of using the floating window.

In a possible implementation, in response to a third operation performed by the user on the first region, the floating window is displayed in a third state, the third state includes any one of a bottom state, a half-screen state, or a full-screen state, the third state is the same as or different from the first state, and the third state is the same as or different from the second state.

For example, it may be understood that a size of the first region is variable, and a size change of the region varies with a form of the floating window. It may be understood that when the floating window is in the bottom state, an area of the first region of the floating window is larger than an area of the first region of the floating window in the half-screen state. It may be understood that when the floating window is in the half-screen state, an area of the first region of the floating window is larger than an area of the first region of the floating window in the full-screen state. In this way, the first region and a region size adaptively adjusted for different forms of the floating window are set to meet a requirement that the user can conveniently browse or slide content in the first interface of the current application at any time in a process of using the floating window.

For example, after the third operation is performed in the first region, the third state of the floating window may be the bottom state, so that it can be intuitively fed back to the user that a current focus is switched to the first interface of the current application operated by the user, instead of the floating window. In this way; experience of using the floating window by the user can be effectively improved.

In a possible implementation, the third operation includes any one of a touch operation, a tap operation, a slide operation, or a touch and hold operation on the first region.

In a possible implementation, the first interface further includes a second text, the first control is displayed in response to a fourth operation performed by the user on the second text, the fourth operation includes any one of a selection operation, a touch operation, a tap operation, a slide operation, a touch and hold operation, or a double-tap operation on the second text, the second text is the same as or different from the first text, the second text does not include a web address, an email address, or a password generated by using a machine, and the second text is different from a system language of the electronic device.

For example, after the user queries a translation result of a word, the user may further continue to query a new word, that is, the second text, Therefore, the user does not need to exit the current application and switch to a third-party translation application to query the word. A real-time translation query can be implemented on the current page of the current application, and a translation result is obtained without switching between the current application and the translation application, so that translation efficiency is improved.

In a possible implementation, in response to a copy operation performed by the user on the copy option, the second text is written into the clipboard of the electronic device, the floating window is displayed in the first interface, the floating window is displayed in a fourth state, the floating window includes the second text and a second translation corresponding to the second text, the floating window includes neither the first text nor the first translation, and the fourth state is the same as or different from the third state.

For example, after the user queries a translation result of a word, the user may further continue to query a new word, that is, the second text. Then, the system places the most recently selected word of the user into the clipboard and requests a translation server for a translation result. Because the clipboard reserves the most recently copied or cut text of the user, when the second text is written into the clipboard, the first text is overwritten. When the user triggers to display the floating window, the second text and the translation corresponding to the second text are displayed in the floating window. In this case, the first text and the translation corresponding to the first text are not displayed. In this way, the user does not need to exit the current application and switch to a third-party translation application to query the word. A real-time translation query can be implemented on the current page of the current application, and a translation result is obtained without switching between the current application and the translation application, so that translation efficiency is improved.

For example, when the user may further continue to query a new word, a state of the floating window may be set according to a habit of the user to be the same as or different from a state of the floating window displayed last time. This improves user experience of using the floating window by the user.

For example, when the user continues to query a new word, a state of the floating window may be the half-screen state. Therefore, in this state, the user can obtain a translation result of the queried word in the floating window, and can conveniently operate the first interface of the current page, so that selection of the user is more flexible, and user experience is better.

In a possible implementation, the floating window is displayed in the first interface in response to a translation operation performed by the user on the translation option, the floating window is displayed in a fifth state, the floating window includes the second text and a second translation corresponding to the second text, the floating window includes neither the first text nor the first translation, and the fifth state is the same as or different from the third state.

For example, after the user queries a translation result of a word, the user may further continue to query a new word, that is, the second text. In this case, because the user triggers the translation operation instead of a copy operation, an intention of the user clearly shows that the user needs to translate the currently selected word. Then, the system places the most recently selected word of the user into the clipboard and requests a translation server for a translation result. Because the clipboard reserves the most recently copied or cut text of the user, when the second text is written into the clipboard, the first text is overwritten. When the user triggers to display the floating window, the second text and the translation corresponding to the second text are displayed in the floating window. In this case, the first text and the translation corresponding to the first text are not displayed. In this way, the user does not need to exit the current application and switch to a third-party translation application to query the word. A real-time translation query can be implemented on the current page of the current application, and a translation result is obtained without switching between the current application and the translation application, so that translation efficiency is improved.

For example, when the user may further continue to query a new word, a state of the floating window may be set according to a habit of the user to be the same as or different from a state of the floating window displayed last time. This improves user experience of using the floating window by the user.

For example, when the user continues to query a new word, a state of the floating window may be the half-screen state. Therefore, in this state, the user can obtain a translation result of the queried word in the floating window, and can conveniently operate the first interface of the current page, so that selection of the user is more flexible, and user experience is better.

In a possible implementation, the floating window is slidable, the floating window has any one or more of a bottom state, a half screen state, or a full-screen state, and the floating window is slid in or between any one or more of the bottom state, the half-screen state, or the full-screen state.

For example, the floating window may display different forms according to different operations of the user. In this way, different requirements of the user for a floating window display form are met. In addition, the user chooses, according to different scenarios, whether to display more translation content, thereby enriching user experience.

In a possible implementation, in response to a first slide operation performed by the user on the floating window in the first state, after it is determined that the slide operation meets a sliding condition, the floating window is displayed in a sixth state, where the sixth state is different from the first state, and the sixth state includes any one of the bottom state, the half-screen state, or the full-screen state; or after it is determined that the slide operation does not meet a sliding condition, the floating window is displayed in a seventh state, where the seventh state is the same as the first state, and the seventh state includes any one of the bottom state, the half-screen state, or the full-screen state.

For example, sliding of the floating window has a determining condition. To be specific, in the half-screen state of the floating window, not all operations performed by the user for sliding the floating window upward display the floating window in the full-screen state, that is, when the sliding condition is met, the floating window is displayed in the full-screen state, or when the condition is not me, the floating window maintains the half-screen state. In this way, the sliding condition is set, so that random movement of the floating window caused by a user's accidental touch is prevented, thereby improving user experience.

For example, the floating window in the first state is a floating window displayed after the user performs a copy operation on the first text.

In a possible implementation, in response to a second slide operation performed by the user on the floating window in the second state, after it is determined that the slide operation meets a sliding condition, the floating window is displayed in an eighth state, where the eighth state is different from the second state; or after it is determined that the slide operation does not meet a sliding condition, the floating window is displayed in a ninth state, where the ninth state is the same as the second state, the eighth state includes any one of the bottom state, the half-screen state, or the frill-screen state, and the ninth state includes any one of the bottom state, the half-screen state, or the full-screen state.

For example, sliding of the floating window has a determining condition. To be specific, in the half-screen state of the floating window, not all operations performed by the user for sliding the floating window upward display the floating window in the hill-screen state, that is, when the sliding condition is met, the floating window is displayed in the full-screen state, or when the condition is not met, the floating window maintains the half-screen state. In this way, the sliding condition is set, so that random movement of the floating window caused by a user's accidental touch is prevented, thereby improving user experience.

For example, the floating window in the second state is a floating window displayed after the user performs a translation operation on the first text.

In a possible implementation, the sliding condition includes meeting any one or more of a sliding distance, a sliding speed, or a sliding direction. In this way, the sliding condition is set, so that random movement of the floating window caused by a user's accidental touch is prevented, thereby improving user experience.

In a possible implementation, determining that the sliding distance meets a condition includes determining that the sliding distance is greater than one quarter of a screen height of the electronic device.

For example, in the half-screen state of the floating window, when the sliding speed meets a condition, if the user slides the floating window upward, and a sliding distance is greater than one quarter of the screen height of the electronic device, the floating window is displayed in the full-screen state. In this way, the sliding condition is set, so that random movement of the floating window caused by a user's accidental touch is prevented, thereby improving user experience.

In a possible implementation, when the sliding distance is greater than one quarter of the screen height of the electronic device and less than three quarters of the screen height, the floating window is switched between the bottom state and the half-screen state or the half-screen state and the full-screen state; or when the sliding distance is greater than three quarters of the screen height of the electronic device, the floating window is switched between the bottom state and the full-screen state.

For example, in the bottom state of the floating window, when the sliding speed meets a condition, if the user slides the floating window upward, and a sliding distance is greater than three quarters of the screen height of the electronic device, the floating window is displayed in the full-screen state. In this way, the sliding condition is set, so that random movement of the floating window caused by a user's accidental touch is prevented, thereby improving user experience.

In a possible implementation, the method further includes: pre-loading a first detailed translation corresponding to the first translation before the floating ball is slid from the half-screen state to the full-screen state, where the first detailed translation includes content that is of the first translation and that is displayed in the floating window in the full-screen state but not displayed in the floating window in the half-screen state.

For example, in the half-screen state of the floating window, because an area of the floating window in the half-screen state is limited, more translation result content cannot be displayed. Therefore, in the current state, it is determined that the user may need to expand to the full-screen state to display more translation result content. The system pre-loads a part of translation result content that is not displayed in the floating window in the half-screen state and that is displayed in the floating window in the full-screen state. In this way, when the user expands from the half-screen floating window to the full-screen floating window, because the part of the translation result content is already loaded in advance, a more detailed sliding effect than that in a case in which translation content is not pre-loaded may be displayed in a sliding process, and user experience is not affected by sawteeth or the like, thereby greatly improving user experience of using the floating window.

In a possible implementation, the floating window further includes a first internal window, and the first internal window includes the first translation and/or the first detailed translation.

For example, the floating window includes a first internal window that is used to display a translation result.

In a possible implementation, the first internal window is slidable and configured to display content corresponding to the first translation.

For example, the floating window includes a first internal window. Different from sliding logic of the floating window in three states, due to display of an Android bottom layer, sliding logic also needs to be separately designed for the first internal window in the floating window, Therefore, when using the floating window, the user may slide the first internal window in the floating window to display more translation content, thereby improving user experience.

For example, because an interface of each application includes an activity and any activity belongs to an application process, a floating ball and a floating window that are set in a system window do not have an activity function. To enable the floating ball and the floating window to obtain an effect similar to that of the activity in the application window; that is, display, content, based on an operation performed by the user on the floating ball and the floating window, a slide operation, a slide conflict, and the like need to be additionally set in the system window, and a focus of a response window is determined based on an operation such as a tap of the user.

In a possible implementation, when the floating window is in the full-screen state, in response to a second slide operation performed by the user on the first internal window, the first internal window displays a second detailed translation, and the second detailed translation includes a part of the first detailed translation.

For example, the floating window includes a first internal window. Different from sliding logic of the floating window in three states, due to display of an Android bottom layer, sliding logic also needs to be separately designed for the first internal window in the floating window. Therefore, when using the floating window, the user may slide the first internal window in the floating window to display more translation content, thereby improving user experience.

For example, both the second detailed translation and the first detailed translation are translation result content corresponding to the first translation, and a complete translation result of the first text includes the first translation, the first detailed translation, and the second detailed translation. For example, the first translation is a simple Chinese translation result of a word corresponding to the first text, and the first detailed translation is some example sentences corresponding to the first text. When the floating window is in the full-screen state, the first translation and the first detailed translation are completely displayed. Because the word may have more example sentences, when the user slides in the first internal window, the second detailed translation is used to display the foregoing first translation and translation result content that is not displayed in the first detailed translation, for example, more example sentences in a dictionary.

In a possible implementation, before the first interface that is of the application and that includes the first floating ball control is displayed, the method further includes: displaying a second control in the first interface in response to a fifth operation performed by the user on a third text, where the first interface further includes the third text, the fifth operation includes any one of a selection operation, a touch operation, a tap operation, a slide operation, a touch and hold operation, or a double-tap operation on the third text, the third text is the same as or different from the first text, the third text does not include a web address, an email address, or a password generated by using a machine, and the third text is different from a system language of the electronic device.

In a possible implementation, an option in the second control includes a copy option or a cut option.

In a possible implementation, a second floating ball control is displayed in the first interface in response to a sixth operation performed by the user on the second control, and the sixth operation includes either of a copy operation on the copy option in the second control or a cut operation on the cut option.

For example, the second floating ball control is set to an entry for displaying a translation result to the user, After the user taps or touches the second floating ball control, a floating window with a translation result is displayed. Optionally, after the floating window is displayed, the second floating ball control disappears or continues to be displayed. This is not limited in this application.

For example, the first floating ball control is set to display the first floating ball control when the user does not trigger any tap or touch operation on the second floating ball control within a preset time. In this case, it is determined that the user does not need to perform the translation operation. Therefore, when the user triggers the copy operation, the copy behavior of the user is determined as normal text copy behavior, and the first floating ball control continues to be displayed.

For example, when the user reads foreign literature by using an application, after the user selects a word that needs to be translated and selects a copy or cut operation, the system determines that the user has a translation intention in this case, and therefore a floating ball is displayed on a current page of the current application. If the user has a requirement for continuing to display a translation result in this case, the user may continue to tap the foregoing second floating ball control to display the translation result in the floating window. In this way, the translation intention of the user is identified by determining the intention of the user, to display the second floating ball control that is used to prompt to display the translation result, and whether to display the floating window to display the translation result is selected according to an operation of the user. In this way, the user does not need to exit the current application and switch to a third-party translation application to query the word. A real-time translation query can be implemented on the current page of the current application, and a translation result is obtained without switching between the current application and the translation application, so that translation efficiency is improved.

In a possible implementation, the method further includes: displaying the floating window in response to a seventh operation performed by the user on the second floating ball control, where the floating window includes the third text and a third translation corresponding to the third text, and the seventh operation includes any one of a touch operation, a tap operation, or a touch and hold operation.

For example, when the user reads foreign literature by using an application, after the user selects a word that needs to be translated and selects a copy or cut operation, the system determines that the user has a translation intention in this case, and therefore a floating ball is displayed on a current page of the current application. If the user has a requirement for continuer to display a translation result in this case, the user may continue to tap the foregoing second floating ball control to display the translation result in the floating window. In this way, the translation intention of the user is identified by determining the intention of the user, to display the second floating ball control that is used to prompt to display the translation result, and whether to display the floating window to display the translation result is selected according to an operation of the user. In this way, the user does not need to exit the current application and switch to a third-party translation application to query the word. A real-time translation query can be implemented on the current page of the current application, and a translation result is obtained without switching between the current application and the translation application, so that translation efficiency is improved.

In a possible implementation, the method further includes: displaying a floating ball sign before the second floating ball control is displayed, where after a first preset time period, the floating ball sign disappears, and the second floating ball control is displayed.

For example, the floating ball sign is used to display that the system is recognizing or determining an intention of the user. When it is determined that the intention of the user is to translate the selected text, the second floating ball control is displayed. For another example, the floating ball sign is used to display a waiting sign that the electronic device requests a translation result from the translation server.

For example, the first preset time period is a short period in a unit of second, and a specific time length is not limited in this application.

In a possible implementation, the floating ball sign is used to determine that the sixth operation meets a translation condition, and the translation condition includes any one or more of a language type of the third text, content of the third text, or a type of the application.

For example, determining whether the translation condition is met includes: determining whether the copied text includes a current non-system language of the mobile phone; determining whether the non-system language included in the copied text is a preset language supported by the mobile phone system, determining whether the copied text conforms to a specific text type; and determining whether the source application of the copied text meets a specific application type. In this way, an unnecessary pop-up or reminder of a translation floating ball or a floating window is reduced by setting the translation condition, thereby reducing disturbance to the user and improving user experience.

In a possible implementation, the second floating ball control and the first floating ball control are displayed on a same side of the first interface of the application on the electronic device, and locations at which the second floating ball control and the first floating ball control are displayed on the same side are the same or different.

For example, the first floating ball control and the second floating ball control are slidable, and may be displayed in different regions of the first interface of the electronic device based on a user operation. The first floating ball control and the second floating ball control are disposed on a same side of the electronic device, for example, on the right side of the first interface of the electronic device, and a location relationship thereof may include an up-and-down relationship. For example, the first floating ball control is displayed on an upper right side of the first interface, and the second floating ball control is displayed on a lower right side of the first interface. For another example, the first floating ball control and the second floating ball control are displayed in a same location. In this way, a common user habit is met, and user experience is improved.

In a possible implementation, the method further includes: canceling display of the second floating ball control and displaying the first floating ball control when determining that none of a touch operation, a tap operation, a slide operation, or a touch and hold operation performed by the user on the second floating ball control is detected within a second preset time period.

For example, the second preset time period is a short period in a unit of second, and a specific time length is not limited in this application.

For example, after the second preset time period, it is determined that the user temporarily does not have a translation intention, and therefore, the floating ball is changed from a state of the second floating ball control to a state of the first floating ball control for display and is displayed on a side of the first interface. When the user has a translation intention again, the user may perform a translation operation by operating the first floating ball control. This is convenient, and user experience is improved.

In a possible implementation, the floating window is displayed in the first interface in response to an eighth operation performed by the user on the first floating ball control, the floating window includes the third text and a third translation corresponding to the third text, and the eighth operation includes any one of a touch operation, a tap operation, or a touch and hold operation.

For example, after the second preset time period, it is determined that the user temporarily does not have a translation intention, and therefore, the floating ball is changed from a state of the second floating ball control to a state of the first floating ball control for display and is displayed on a side of the first interface. When the user has a translation intention again, the user may perform a translation operation by operating the first floating ball control. This is convenient, and user experience is improved.

In a possible implementation, the first interface further includes a fourth text, if the first floating ball control is displayed in the first interface, the second control is displayed in the first interface in response to a ninth operation performed by the user on the fourth text, and the first floating ball control continues to be displayed in the first interface in response to a tenth Operation performed by the user on the second control, where the ninth operation includes any one of a selection operation, a touch operation, a tap operation, a slide operation, a touch and hold operation, or a double-tap operation on the fourth text, the tenth operation includes either of a copy operation on the copy option in the second control or a cut operation on the cut option, the fourth text is the same as or different from the third text, the fourth text does not include a web address, an email address, or a password generated by using a machine, and the fourth text is different from the system language of the electronic device.

For example, in a state of displaying the first floating ball control, because the system determines that the user temporarily does not have a translation intention, when the user copies the fourth text, the system does not trigger the translation operation to display the floating window, and the electronic device continues to display the first floating ball control, that is, the copy operation of the user on the fourth text is determined by the system as a common text copy operation. In this way, based on different states of displaying the floating ball control, the user may understand when translation needs to be performed and when a common text copy operation is displayed. When the user has a translation requirement, the user may immediately perform an operation on the first floating ball control, to display a floating window and display translation result content. This reduces interference to the user and helps the user quickly obtain translation result content, thereby improving user experience.

In a possible implementation, the floating window is displayed in the first interface in response to an eleventh operation performed by the user on the first floating, ball control, the floating window includes the fourth text and a fourth translation corresponding to the fourth text, and the eleventh operation includes any one of a touch operation, a tap operation, or a touch and hold operation on the first floating ball control.

For example, when the user has a translation requirement, the first floating ball control may be immediately operated, to display a floating window and display translation result content. This reduces interference to the user and helps the user quickly obtain translation result content, thereby improving user experience.

In a possible implementation, the floating window is a system window, and the system window is different from an application window of the application.

For example, because the floating ball and the floating window in the implementation of this application are system windows, the floating ball and the floating window cannot be disposed in the application window. The floating ball and the floating window do not belong to any application, are created by the system, and belong to only the system.

In a possible implementation, the floating window is a modeless dialog box, and when the floating window is displayed in the first interface, either of the first interface or the floating window is slidable.

For example, the modeless dialog box has the advantage of not preempting the focus of the window. When using the floating window in the implementation of this application, the user may return the floating window to the bottom state by touching or tapping a region outside the floating window, to continue to browse content of the current application, thereby improving user experience.

In a possible implementation, a window attribute of the floating window is set to including FLAG_NOT_TOUCH_MODAL, and the floating window does not preempt a window focus with the first interface of the application, where when the floating window is displayed in the first interface, if the first interface is slid, the floating window does not disappear, and in response to a fact that the floating window is slid, the first interface does not disappear; and if the floating window is slid, the first interface does not disappear, and in response to a fact that the first interface is slid, the floating window does not disappear.

For example, the window attribute of the floating window is set to FLAG_NOT_TOUCH_MODAL. Therefore, in this mode, the system transfers a touch/tap event outside the current window region to an underlying window, and a tap event in the current window region is processed in the current window. When the mobile phone detects a touch or tap event in the region outside the floating window, the mobile phone transfers the window to the current read application, so that the user can continue to browse the page of the current read application. When the mobile phone detects a touch or tap event in the floating window region, the floating window continues to be used to process the touch or tap event of the user.

In a possible implementation, when the floating window is closed, the first floating ball control is displayed in the first interface.

For example, for closing of the floating window, an "X" icon on the floating window is tapped or touched, to close the floating window. In this case, the floating window is closed, and is still displayed on a side of the first interface of the electronic device in a form of the first floating ball control. In this way, when the user has a translation requirement again, the first floating ball control may be immediately operated, to display a floating window and display translation result content. This reduces interference to the user and helps the user quickly obtain translation result content, thereby improving user experience.

According to a second aspect, an embodiment of this application provides an electronic device. The electronic device includes a memory configured to store computer program instructions and a processor configured to execute the program instructions. When the computer program instructions are executed by the processor, the electronic device is triggered to perform any method in the first aspect.

The second aspect and any implementation of the second aspect are respectively corresponding to the first aspect and any implementation of the first aspect. For technical effects corresponding to the second aspect and any implementation of the second aspect, refer to the technical effects corresponding to the first aspect and any implementation of the first aspect. Details are not described herein again.

According to a third aspect, an embodiment of this application provides a computer-readable storage medium. The computer-readable storage medium stores a computer program, and when the computer program is run on a computer, the computer is enabled to perform any method in the first aspect.

The third aspect and any implementation of the third aspect are respectively corresponding to the first aspect and any implementation of the first aspect. For technical effects corresponding to the third aspect and any implementation of the third aspect, refer to the technical effects corresponding to the first aspect and any implementation of the first aspect. Details are not described herein again.

According to a fourth aspect, an embodiment of this application provides a computer program product. The computer program product includes a computer program, and when the computer program is run on a computer, the computer is enabled to perform any method in the first aspect.

The fourth aspect and any implementation of the fourth aspect are respectively corresponding to the first aspect and any implementation of the first aspect. For technical effects corresponding to the fourth aspect and any implementation of the fourth aspect, refer to the technical effects corresponding to the first aspect and any implementation of the first aspect. Details are not described herein again.

In a possible design, the program in the fifth aspect may be completely or partially stored in a storage medium packaged with the processor, or may be partially or completely stored in a memory not packaged with the processor.

BRIEF DESCRIPTION OF DRAWINGS

To describe the technical solutions in embodiments of this application more clearly, the following briefly describes the accompanying drawings for describing the embodiments. It is clear that, the accompanying drawings in the following description show merely some embodiments of this application, and a person of ordinary skill in the art may still derive other drawings from these accompanying drawings without creative efforts.

FIG. 17A to FIG. 17C are a time sequence diagram of logic implementation according to an embodiment of this application;

DESCRIPTION OF EMBODIMENTS

Figure 1:
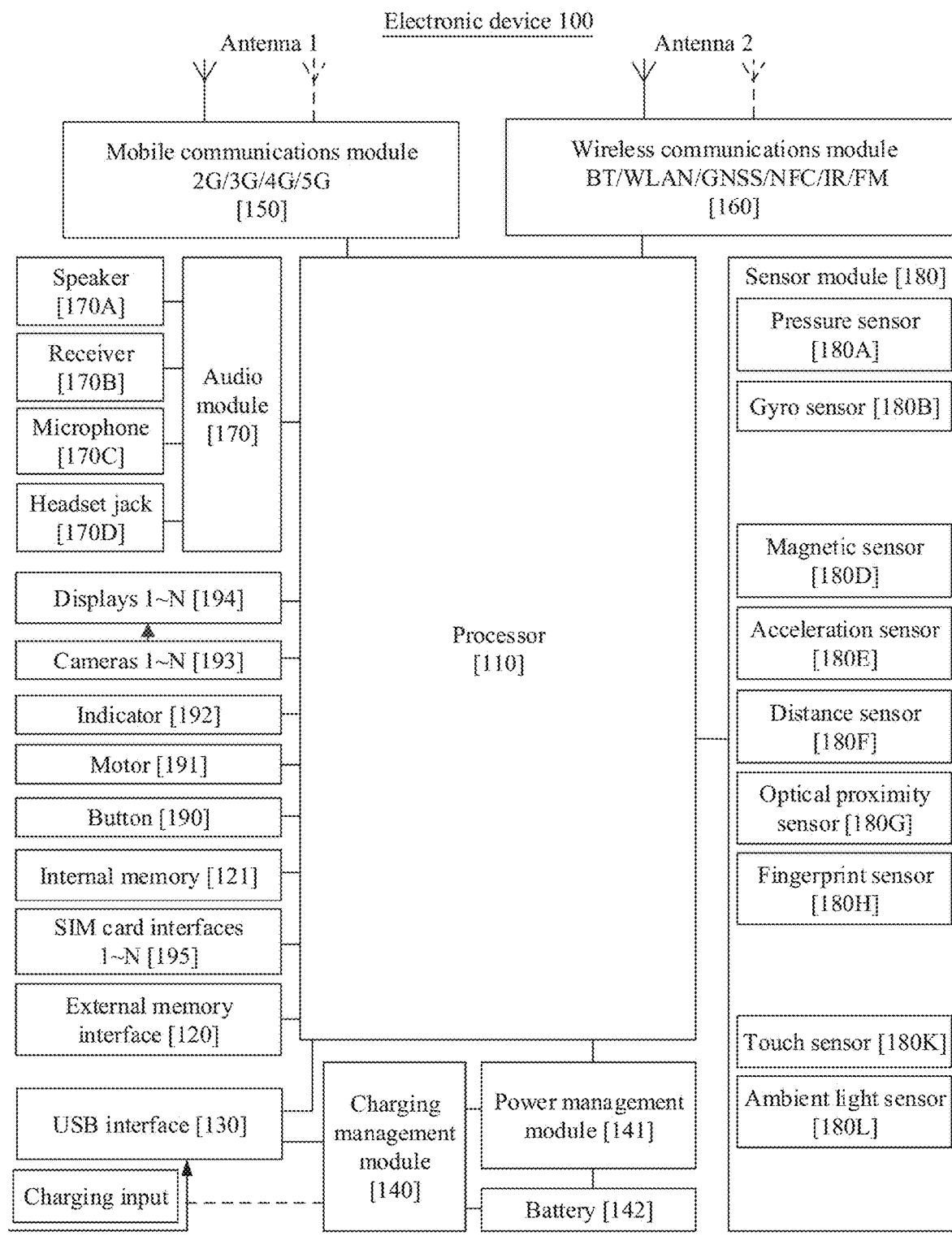
FIG. 1 is a schematic diagram of an electronic device according to an embodiment of this application.

To better understand the technical solutions of this application, the following describes embodiments of this application in detail with reference to the accompanying drawings.

It should be noted that the described embodiments are merely some but not all of embodiments of this application. Based on embodiments of this application, all other embodiments obtained by a person of ordinary skill in the art without creative efforts fall within the protection scope of this application. Terms used in embodiments of this application are merely for the purpose of describing specific embodiments, but are not intended to limit this application. Terms "a", "the", and "this" in singular forms in embodiments of this application and the appended claims are also intended to include plural forms, unless otherwise stated in the context clearly. It should be understood that the term "and/or" used in this specification is merely an association relationship for describing associated objects, and indicates that there may be three relationships. For example, A and/or B may indicate the following three cases: Only A exists, both A and B exist, and only B exists. In addition, the character "/" in this specification usually indicates an "or" relationship between the associated objects. It should be further understood that when being used in the specification and the appended claims of this application, the term "include" indicates the presence of a described feature, entirety, step, operation, element, and/or component, but does not exclude the presence or addition of one or more other features, entireties, steps, operations, elements, components, and/or sets thereof. In addition, in the description of the specification and the appended claims of this application, the terms "first", "second", "third", "fourth", and the like are merely used for distinguishing, but cannot be construed as indicating or implying relative importance.

When a user reads foreign literature, for example, browses English literature by using a read application, if the user has a requirement of querying a new word in the foreign literature, the user usually resorts to an installed translation application in an electronic device ("mobile phone" is used as an example below).

If a current application supports a translation function in the application, such as a chat application on the current market, to-be-translated chat content may be selected, and after the text is tapped or touched and held, a "translate" button is selected, to display a translation result of the chat content in real time. Usually, the translation result is presented near the chat content. When the user needs to translate chat content again, the foregoing operations need to be repeated to display a translation result.

If a current application does not support a translation function in the application, for example, a read application, the user needs to copy or memorize a text that needs to be translated, for example, an English word, switch out of the current application, open a translation application, paste or manually enter the English word into an input box, and tap a translate button, to display a translation result, so as to complete a translation operation. It is clear that steps in the foregoing operation manner are cumbersome, and translation efficiency is low, affecting user experience.

Further, an improvement manner is to capture a word on a screen by using a read application, a browser plug-in, or a plug-in provided by translation software, to perform text translation. In other words, the read application, the browser plug-in, or the plug-in provided by the translation software is enabled in the background, and when a user selects a text that needs to be translated, an immediate translation result is presented, and a translation web page or the translation software does not need to be opened. However, in the foregoing manner, the user still needs to install an extra plug-in. This increases a use threshold for the user. In addition, in an electronic device such as a mobile phone, implementation is difficult due to limitation of underlying control logic of a mobile phone system.

Further, another improvement manner is to actively monitor content on a clipboard of a system by using a translation application, so that when a user switches from a current read application to the translation application, the translation application can automatically obtain the content on the clipboard and display a translation result of the content, thereby avoiding manual input. However, in the foregoing operation manner, the user still needs to leave the current application and switch to the translation application to obtain the translation result. Therefore, the operation manner is relatively cumbersome, and translation efficiency is reduced.

Therefore, regardless of whether the current application supports the translation function in the application, or the current application does not support the translation function in the application and the translation result needs to be displayed by switching to the translation application, the foregoing manner is translation at an application level. To be specific, the former uses a translation plug-in integrated in an application, the latter uses a complete independent translation application, and neither the former nor the latter relates to translation implemented by using an underlying function of a mobile phone system, for example, translation implemented at an underlying mobile phone system level based on the Android system.

Based on this, embodiments of this application provide a translation method and an electronic device, to improve user experience through improvement at an underlying layer of a mobile phone system.

FIG. 1 is a schematic diagram of a structure of an electronic device according to an embodiment of this application. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a magnetic sensor 180D, an acceleration sensor 180E, a distance sensor 180F, an optical proximity sensor 180G, a fingerprint sensor 180H, a touch sensor 180K, an ambient light sensor 180L, and the like.

It may be understood that the structure shown in this embodiment of this application does not constitute a specific limitation on the electronic device 100. In some other embodiments of this application, the electronic device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors. For example, the processor 110 is configured to perform an ambient light detection method in embodiments of this application.

The controller may be a nerve center and a command center of the electronic device 100. The controller mar generate an operation control signal based on instruction operation code and a time sequence signal, to complete control of instruction fetching and instruction execution.

A memory may further be disposed in the processor 110, to store instructions and data. In some embodiments, the memory in the processor 110 is a cache. The memory may store instructions or data just used or cyclically used by the processor 110. If the processor 110 needs to use the instructions or data again, the instructions or data may be directly invoked from the memory. This avoids repeated access, and reduces waiting time of the processor 110, so that system efficiency is improved.

The electronic device 100 implements a display function by using the GPU, the display 194, the application processor, and the like. The GPU is a microprocessor for image processing, and is connected to the display 194 and the application processor. The GPU is configured to perform mathematical and geometric calculation and render graphics. The processor 110 may include one or more GPUs that execute program instructions to generate or change display information.

The display 194 is configured to display an image, a video, and the like. The display 194 includes a display panel. The display panel may use an organic light-emitting diode (organic light-emitting diode, MED), In some embodiments, the electronic device 100 may include one or N displays 194, where N is a positive integer greater than 1.

Figure 2A:
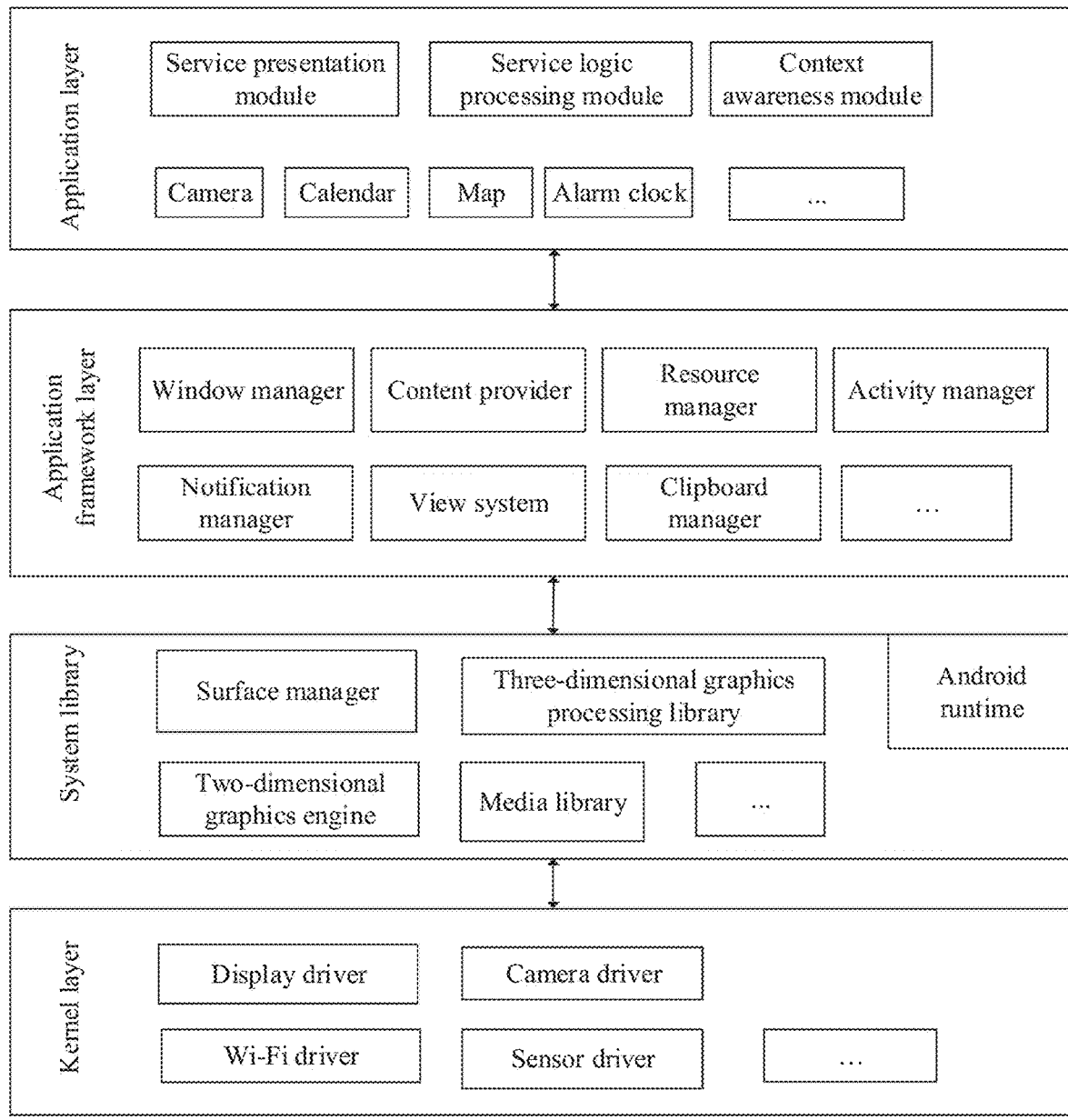
FIG. 2A is a block diagram of a software structure of an electronic device according to an embodiment of this application.

As shown in FIG. 2A, an Android system may be divided into five layers: an application (applications) layer, an application framework (application framework) layer, an Android runtime (Android runtime) and system library, a hardware abstraction layer (hardware abstract layer, HAL, not shown in the figure), and a kernel (kernel) layer.

The application layer may include a series of application packages. For example, the application layer may include application programs (the application program may be referred to as an application for short) such as Camera, Gallery, Calendar, Phone, Map, Navigation, WLAN, Bluetooth, Music, Video, and Messages. This is not limited in this embodiment of this application.

In this embodiment of this application, the application layer may further include a context awareness module, a service logic processing module, a service presentation module, and the like. The context awareness module, the service logic processing module, and the service presentation module may be independent APPs, or may be separately integrated into different APPs, or may be integrated into a same APP. This is not limited in this application.

The context awareness module is resident or runs in a form of low power consumption, and has a capability of perceiving an external fact or an environment. The context awareness module may detect a related event and obtain a status of the event from another application at the application layer, the application framework layer, the system layer, or the kernel layer by using an API (application interface), such as detecting a Bluetooth connection or a network connection, monitoring a user's SMS message, and customizing a timer. In this embodiment of this application, the context awareness module mainly monitors whether a clipboard has a copy event, and notifies the service logic processing module of a copy event when monitoring that the clipboard has the copy event. The context awareness module may be further configured to obtain a source application (APP) of cut content in the clipboard, that is, an application package name. That is, the context awareness module recognizes that the content in the clipboard is copied from a specific application. In addition, the context awareness module may further detect whether an operation of exiting the current page is performed. When an operation of exiting the current page is detected, the context awareness module notifies the service logic processing module.

The service logic processing module (for example, a computing engine) has a service logic processing capability, and is configured to display and disappear various floating balls or floating windows. For example, the service logic processing module receives a copy event triggered by the user and clipboard content sent by the context awareness module, and determines whether a translation condition is met, to determine whether to display a floating ball. The service logic processing module may further determine, based on a floating ball tap event triggered by the user and translation result content obtained from a third-party server, whether to display a floating window and display a translation result in the floating window. In addition, the service logic processing module may be further configured to determine, based on a floating ball or floating window disappear event triggered by the user, whether to display or disappear the floating ball or the floating window on the electronic device.

In addition, the service logic processing module may further recognize a copy text or a text extracted by using the OCR technology. For example, it may be identified that the text is at least one of a schedule, a to-be-shared link, a Taobao password, a web address, and the like. For another example, a language of a text may also be identified.

The service presentation module (for example, YOYO recommendation) is configured to display or disappear a floating ball or a floating window on a screen of the mobile phone. For example, the service presentation module receives a floating ball or floating window display command sent by the service logic processing module, and notifies the window manager to display the floating ball or the floating window on the electronic device. In addition, the service presentation module may further present, in the floating window, a text copied by the user and a translation result corresponding to the text. In addition, the service presentation module may be further configured to determine, based on a floating ball or floating window disappear event triggered by the user, the window manager to display or disappear the floating ball or the floating window on the electronic device.

As shown in FIG. 2A, the application framework layer may include a window manager, a content provider, a view system, a resource manager, a notification manager, an activity manager, a clipboard manager, and the like. This is not limited in this embodiment of this application.

The window manager is configured to manage a window program. The window manager may obtain a display size, determine whether there is a status bar, lock a screen, take a screenshot, and the like.

The clipboard manager is configured to manage the clipboard. The clipboard is a temporary storage region for temporarily storing exchanged information.

The activity manager is configured to manage a lifecycle of each application and a navigation fallback function, and is responsible for main thread creation of Android and maintenance of the lifecycle of each application.

The resource manager provides various resources for the application, such as a localized string, an icon, a picture, a layout file, and a video file.

The notification manager enables the application to display notification information in a status bar, and may be configured to transfer a message of a notification type. The information may automatically disappear after a short stay without user interaction. For example, the notification manager is configured to notify a download completion, a message reminder, and the like. The notification manager may alternatively be a notification that appears in a form of a graph or a scroll bar text in a status bar at the top of the system, for example, a notification of an application running in the background, or may be a notification that appears in a form of a dialog window on a screen. For example, the status bar shows text information, a prompt tone is made, the electronic device vibrates, and an indicator flickers.

The application layer and the application framework layer run in the virtual machine. The virtual machine executes a binary file of a Java file at the application layer and the application framework layer. The virtual machine is configured to perform functions such as object lifecycle management, stack management, thread management, security and abnormity management, and garbage collection.

As shown in FIG. 2A, the system library may include a plurality of function modules, for example, a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

As shown in FIG. 2A, the kernel layer is a layer between hardware and software. The kernel layer includes at least a display driver, a camera driver, an audio driver, and a sensor driver.

Figure 2B:
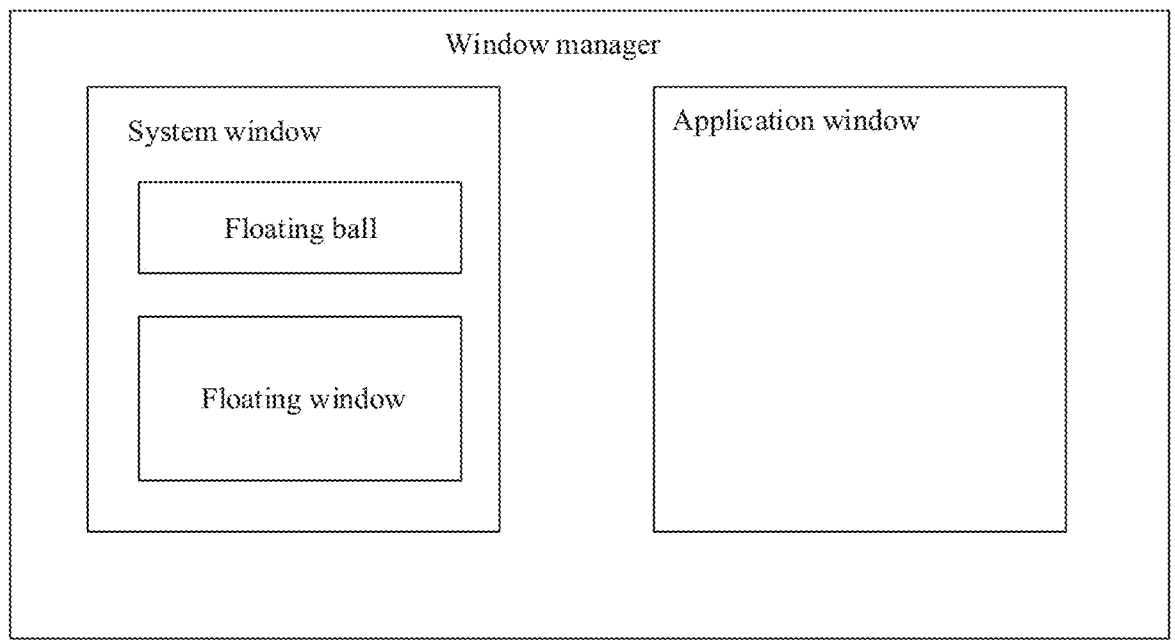
FIG. 2B is a block diagram of a software structure of a window manager of an electronic device according to an embodiment of this application.

With reference to FIG. 2B, specifically, the window manager includes an application window, a child window (not show and a system window.

The application window corresponds to an application window of an application, for example, an application window of a read application that is used to display content in the read application, an application window of a translation application that is used to display content in the translation application, or an application window of a memo application that is used to display content in the memo application. An interface of each application includes an activity, the activity includes a view, the view is the existence form of a window, and the window is the carrier of the view. When the activity is started, an application process is notified. Any activity belongs to the application process. That is, for example, the read application is corresponding to one activity, and the memo application is corresponding to another activity because the memo application and the read application are different applications. The default window type of all activities is base window (TYPE_BASE_APPLICATION), that is, all other types of application windows appear at an upper layer of the base window.

The child window is attached to a parent window; that is, cannot exist independently, and needs to rely on an application, for example, an application input method window or an application prompt box window. When the parent window is invisible, the child window is also invisible.

The system window is different from the application window, and does not need to correspond to the activity. Different from the child window, the parent window is not required. The system window does not belong to any application, is created by the system, belongs to only the system, and can be created only with permission, for example, a power-off dialog box window, a status bar window, a search bar window, an input method window, a warning dialog box, or a system volume bar.

It should be noted that a layer of the system window is usually higher than that of the application window and the child window.

With reference to FIG. 2B, in this embodiment of this application, a floating ball and a floating window are set in the system window. It can be learned from the foregoing analysis that the floating ball and the floating window are system windows and cannot be set in the application window.

The essence of the floating window and the floating ball is to deliver a view to the window manager for management. Due to the system limitation of the Android bottom layer, the z-axis range of the application window is 1~99, the range of the child window is 1001~1999, and the range of the system window is 2000~2999. Therefore, the floating window and floating ball can only be implemented in the system window range. If a customized system-level window needs to be popped up, permission needs to be applied for dynamically. The Z-axis is a concept of a layer of an Android window A window with a larger Z-axis is closer to a top layer.

Further, because an interface of each application includes an activity and any activity belongs to an application process, a floating ball and a floating window that are set in a system window do not have an activity function. To enable the floating ball and the floating window to obtain an effect similar to that of the activity in the application window, that is, display content, based on an operation performed by the user on the floating ball and the floating window, a slide operation, a slide conflict, and the like need to be additionally set in the system window, and a focus of a response window is determined based on an operation such as a tap of the user. Specifically, the following content is extended to be clearer.

In an implementation of this application, translation is performed as an example. For example, a default language set by a system in an electronic device (using "mobile phone" as an example) is simplified Chinese. For example, in some implementations, an option switch such as "copy to trigger translation" is set in a setting interface of the mobile phone. After a user chooses to enable the function, when the user copies a text in a non-system default language, the translation function in the implementation of this application is triggered to display a translation result. The translation result may be an original text (such as a copied text) and/or a translation. In this way, the mobile phone may directly present the translation result according to a recognized translation intention, so that the translation intention of the user can be quickly met. For example, in some other implementations, an option switch such as "copy to trigger translation" does not need to be set in a setting interface of the mobile phone. The mobile phone determines a possible intention of the user according to an operation of copying a text by the user, for example, one or more of adding a schedule, adding a memo, sharing to an application, adding to favorites, adding to a dictionary, and opening map navigation. In the implementation of this application, a type of the possible user intention determined by the mobile phone after the user copies the text is not limited.

Figure 3A:
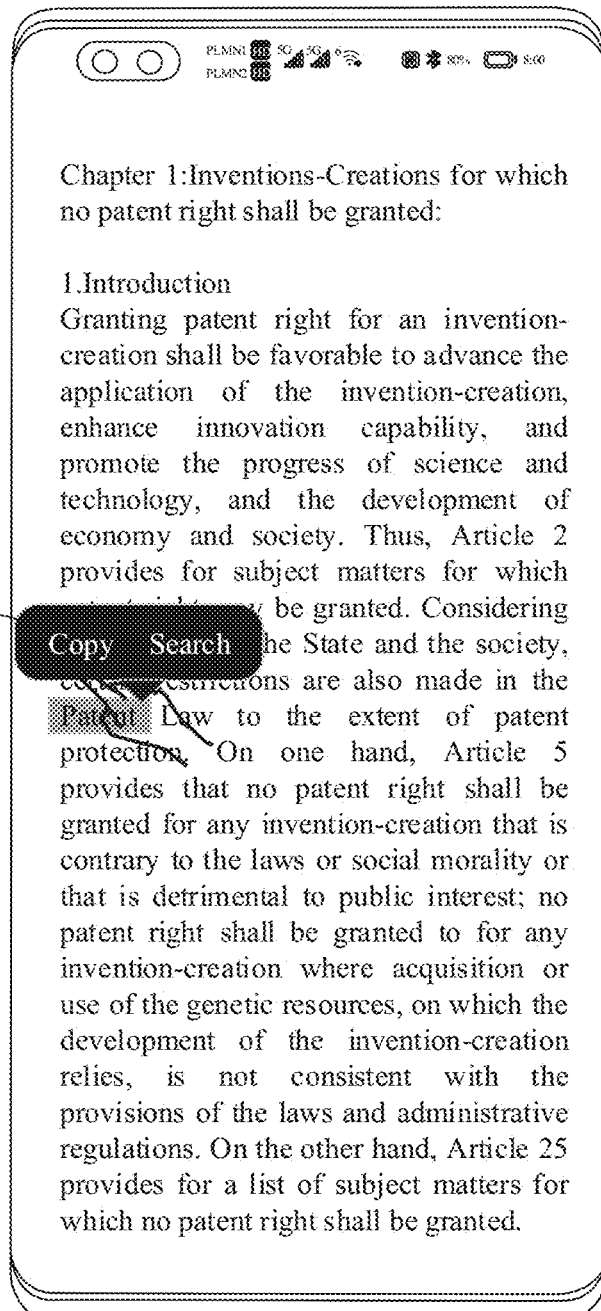
FIG. 3(a) to FIG. 3(d) are a schematic diagram of translation interface triggering according to an embodiment of this application.
Figure 3B:
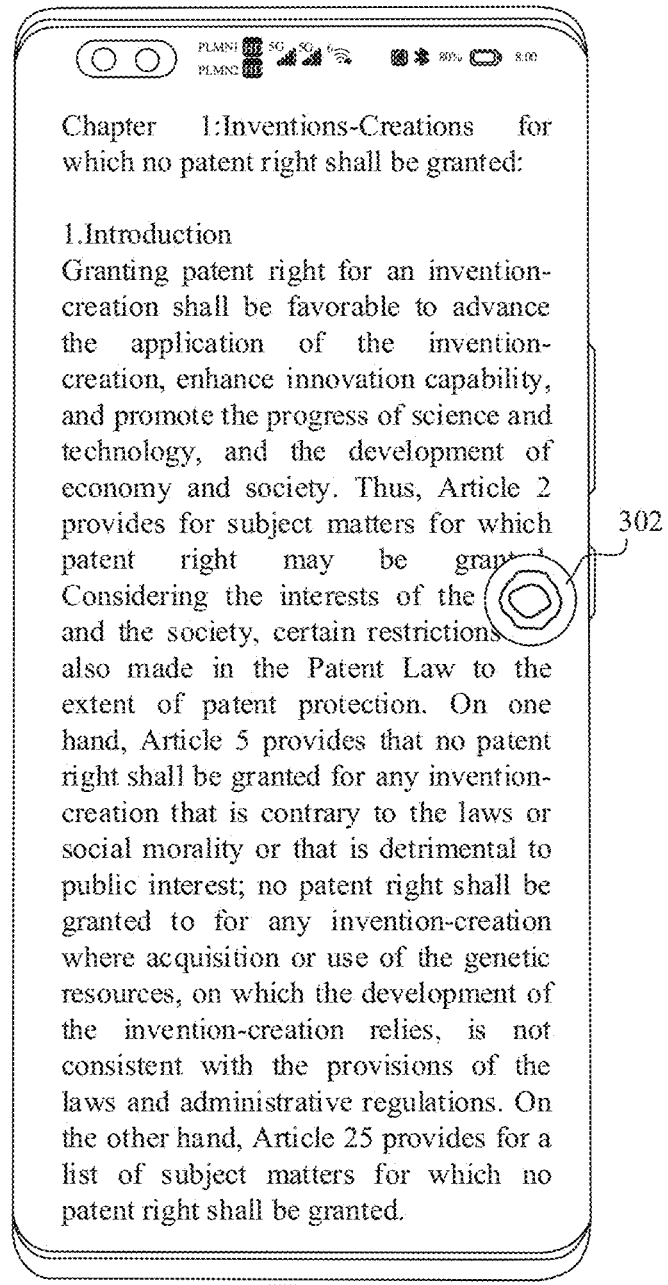
Figure 3C:
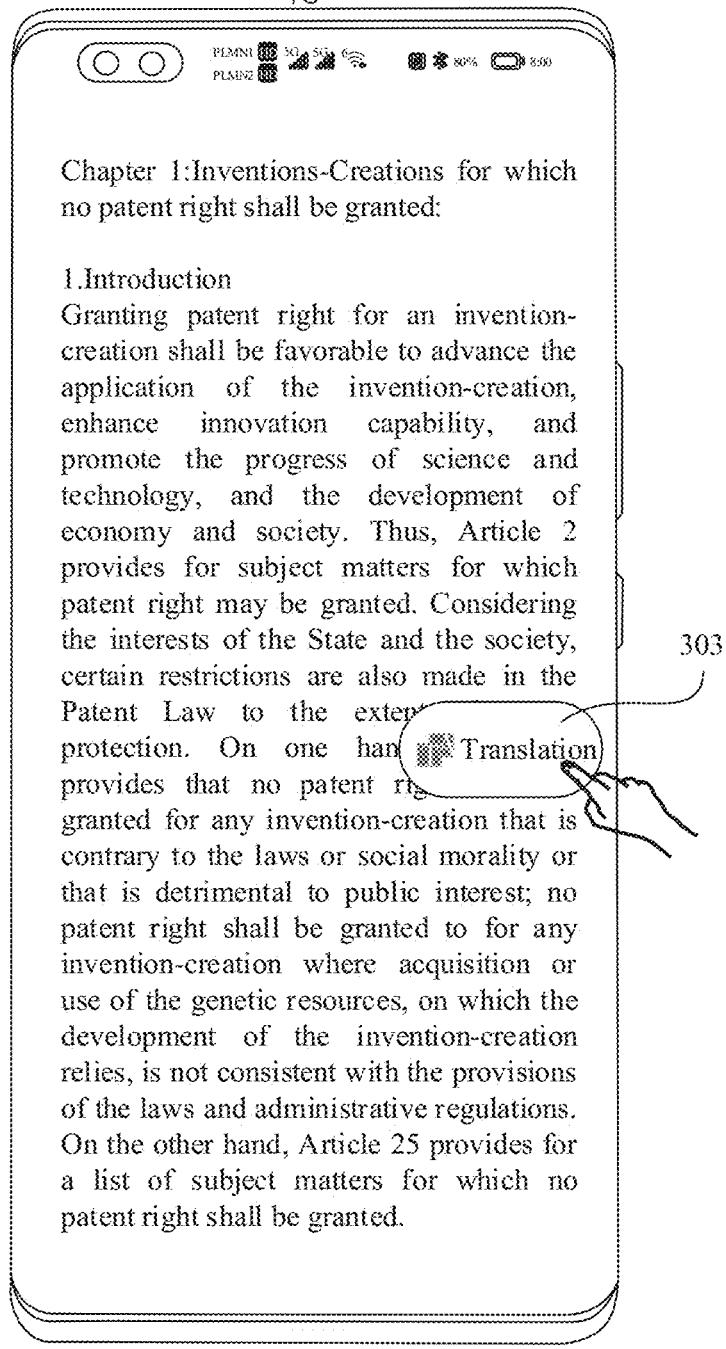

Referring to FIG. 3(a) to FIG. 3(d), for example, a read application is used as an example. The user opens a read page in the read application, and an English section is displayed. In FIG. 3(a), in a scenario in which translation needs to be performed, the user selects the word "patent", and the system pops up an option bar 301. The option bar 301 includes at least an operation option such as "copy", After the mobile phone monitors a change of content in the clipboard, recognition of a text copy intention of the user is triggered. It should be understood that, after the user performs a copy operation on a text, the copied text is stored in the clipboard, and then the content in the clipboard changes. Therefore, the content in the clipboard changes, that is, the user enters a copy operation. After the user taps the "copy" option, the mobile phone attempts to recognize an intention of the user after text copying, and therefore a floating ball sign 302 shown in FIG. 3(b) is popped up, to indicate that the mobile phone is recognizing the intention of the user. For example, the mobile phone may recognize the intention based on data such as text content of the copied text, a user picture, and the like. In a recognition process, the intention of the user can be recognized without an operation of the user, that is, without tapping any content on a page in FIG. 3(b) by the user. When the system recognizes that the user needs to translate the word "patent", a floating ball 303 in a first state in FIG. 3(c) is displayed. The floating ball 303 in the first state is used to provide the user with an entry for displaying a translation result. In response to a tap or touch operation performed by the user on the floating ball 303, a floating window 304 is displayed in FIG. 3(d) and the translation result of "patent" is displayed in the floating window 304. The translation result displayed in the floating window 304 includes the to-be-queried English word "patent" copied by the user, and a translation result of a Chinese meaning of the word, that is, "Zhuan Li". An interface displayed in the floating window 304 further includes voice reading, copying the text of the translation result, translation language switching, and the like. For example, an initial state displayed in the floating window 304, that is, a default form displayed after the user taps the floating ball 303, is a half-screen state, and a size is about half of a mobile phone screen. For example, because the floating window 304 is displayed, the floating ball 303 is not displayed, to achieve better user experience.

It should be noted that the floating ball 303 and the floating window 304 are two different types of windows on an Android mobile terminal. Floating is relative. For example, an upper-layer element may be referred to as a "floating" element, for example, a navigation bar and a label bar are floating relative to a content region at a lower layer. In an implementation of this application, the floating ball 303 is set to an entry linked to the floating window 304, to guide the user to tap the floating ball 303 in a scenario in which a translation result needs to be displayed, to present the translation result in the floating window 304. The floating window 304 is set to a content presentation window for displaying the translation result.

It should be noted that, the floating ball and the floating window in the implementation of this application are system windows, and cannot be set in an application window. In addition, Android has strict control over the floating ball and the floating window Therefore, permission needs to be applied for dynamically to pop to a customized system-level window.

When a default language set by the system in the mobile phone is simplified Chinese, if the mobile phone recognizes that a language of the text copied by the user is not a current system language of the mobile phone (that is, the default language set by the mobile phone), it can be recognized that an intention of the user includes translation. For example, when the language of the text copied by the user is a language other than simplified Chinese, such as English, Japanese, or French, the mobile phone recognizes a translation intention of the user, thereby displaying the floating ball sign 302, the floating ball 303, and the like. Usually, the default language set on the mobile phone is a language familiar to the user and does not need to be translated:

As described above, whether the text copied on the mobile phone triggers translation is related to the default language set by the system and the language of the copied text. If the mobile phone recognizes that the language of the text copied by the user is not a current system language of the mobile phone (that is, the default language set by the mobile phone), it can be recognized that an intention of the user includes translation. Specifically, for example, when the default language set by the system in the mobile phone is simplified Chinese, the following combinations may be included.

First combination: The copied text includes both a text in the system language and a text in a non-system language. For example, when the copied text includes both Chinese and French, because the mobile phone recognizes that the copied text includes a French text that is not Chinese, after the user copies the text, a translation operation is still triggered, that is, the pop-up floating ball sign 302 shown in FIG. 3(b) is displayed and the floating ball 303 in the first state in FIG. 3(c) is automatically displayed after a period of time.

Second combination: The copied text is a text in a non-system language set by the application. For example, when the application language set by the current application is English, and the user copies an English text in the application, because the mobile phone recognizes that the copied text includes a non-Chinese text, after the user copies the text, a translation operation is still triggered, that is, the pop-up floating ball sign 302 shown in FIG. 3(b) is displayed and the floating ball 303 in the first state in FIG. 3(c) is automatically displayed after a period of time.

Third combination: The copied text is a text in a non-system language that is entered by the user. For example, in an application in which the user can manually enter a text, such as a chat application or a memo, the user selects and copies an English text entered by the user. Because the mobile phone recognizes that the copied text includes a non-Chinese text, after the user copies the text, a translation operation is still triggered, that is, the pop-up floating ball sign 302 shown in FIG. 3(b) is displayed and the floating ball 303 in the first state in FIG. 3(c) is automatically displayed after a period of time.

In some implementations of this application, the mobile phone further needs to recognize that a language of the copied text is a preset language, where the preset language is a language in which the system of the mobile phone or a translation application on the mobile phone supports translation, so that it can be recognized that an intention of the user includes translation. If the mobile phone does not support translation of the language of the copied text, the translation result cannot be obtained. In this case, it is recognized that there is no translation intention. In some other implementations of this application, the mobile phone further needs to recognize that the copied text needs to meet a specific text type. For example, only when the copied text is not a character string that has a specific meaning, such as a web address link, an email address, or a password generated by a machine (such as a Taobao password), it can be recognized that the intention of the user includes translation. The foregoing character strings with a specific meaning are usually identifiers, for example, used to distinguish between different web pages, different mailboxes, or different Taobao commodities, but not having language meanings, Therefore, there is no translation requirement.

In some other implementations of this application, the mobile phone further needs to recognize that a source application of the current copied text needs to meet a specific application type. For example, only when the application is not a separate professional translation application such as a translation application, or is not a shopping and entertainment application such as Taobao or Tik Told, it can be recognized that the intention of the user includes translation. For example, when the user copies a text in a non-system default language in Taobao, the mobile phone determines that the user does not have a translation requirement in this case. Therefore, after the user copies the text, the floating ball sign 302 and the floating ball 303 are not displayed. Similarly, when the user copies a text in a non-system default language in professional translation software, for example, Youdao, the mobile phone determines that the user does not have a translation requirement in this case. Therefore, after the user copies the text, the floating ball sign 302 and the floating ball 303 are not displayed.

It should be noted that, in the implementation of this application, a specific manner in which the mobile phone performs intention recognition on an operation of the user is not limited. For example, the mobile phone may determine, based on a current application type, a type of the text copied by the user, and a context displayed by the current application, a translation intention existing after the user copies the text. For another example, the mobile phone may use natural language processing (Natural Language Processing, NLP) to comprehensively analyze and predict a behavior habit of the user, a status of using an APP, and the like.

It should be noted that in an implementation of this application, a copy operation is mainly used as an example to trigger the mobile phone to recognize an intention. However, actual implementation is not limited thereto. For example, an operation such as a selection operation, a touch and hold operation, a scribe operation, or a double-tap operation on the text may be used to trigger the mobile phone to recognize an intention.

Figure 4A:
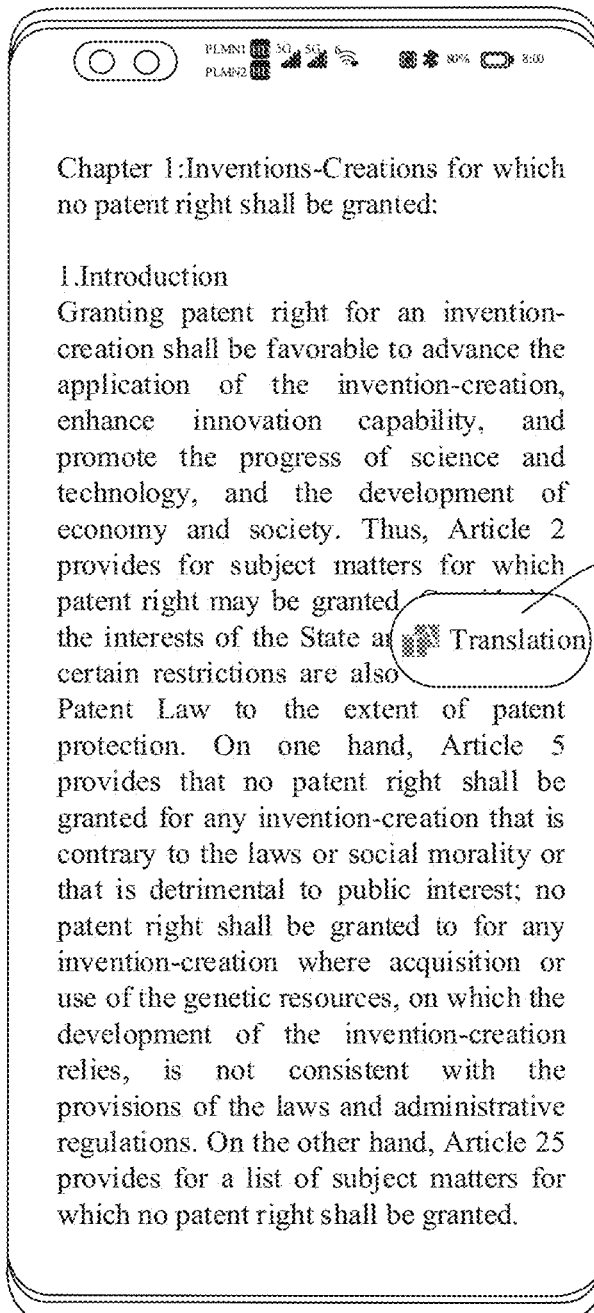
FIG. 4A(a) to FIG. 4A(d) are a schematic diagram of a floating ball in a translation interface according to an embodiment of this application.
Figure 4A:
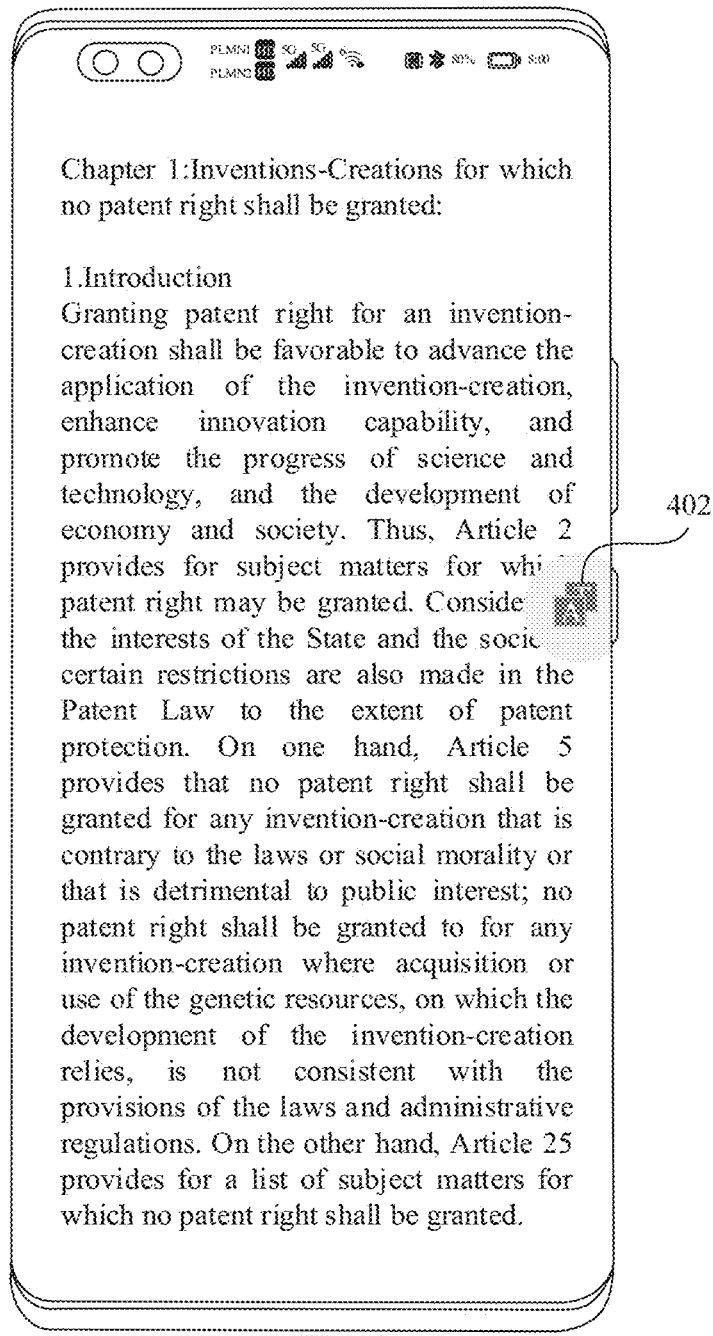
Figure 4A:
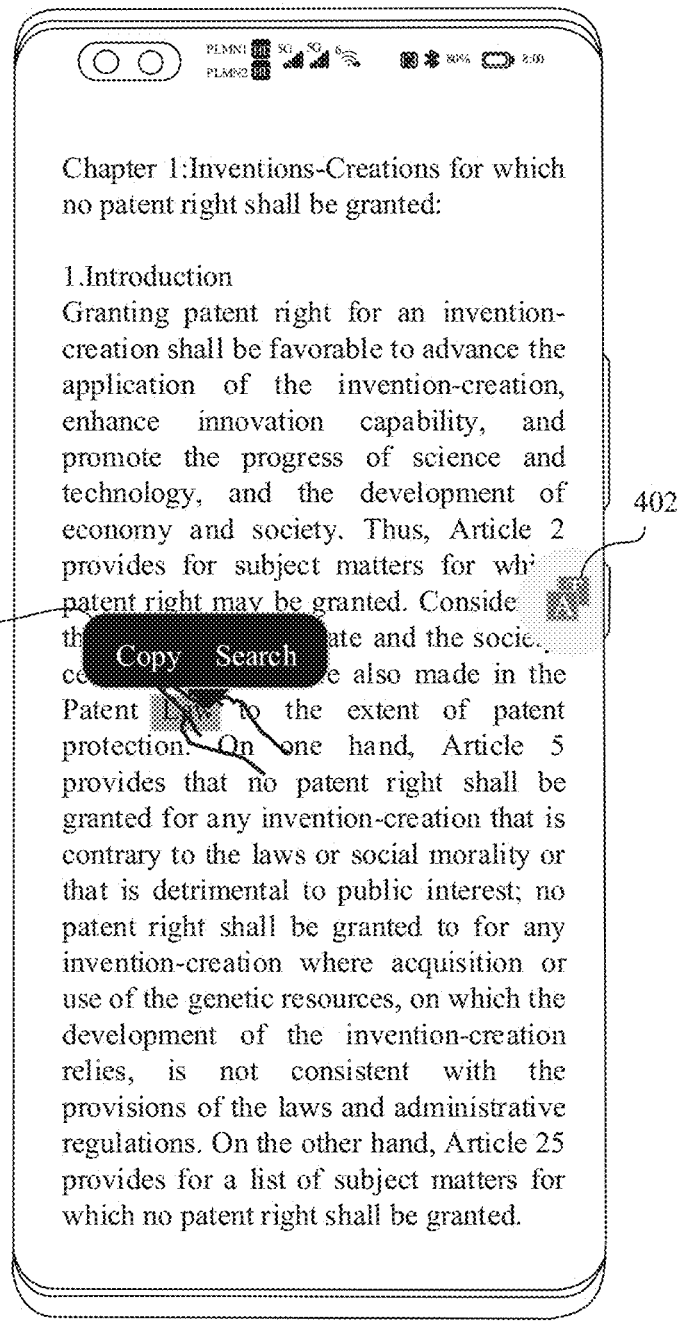
Figure 4A:
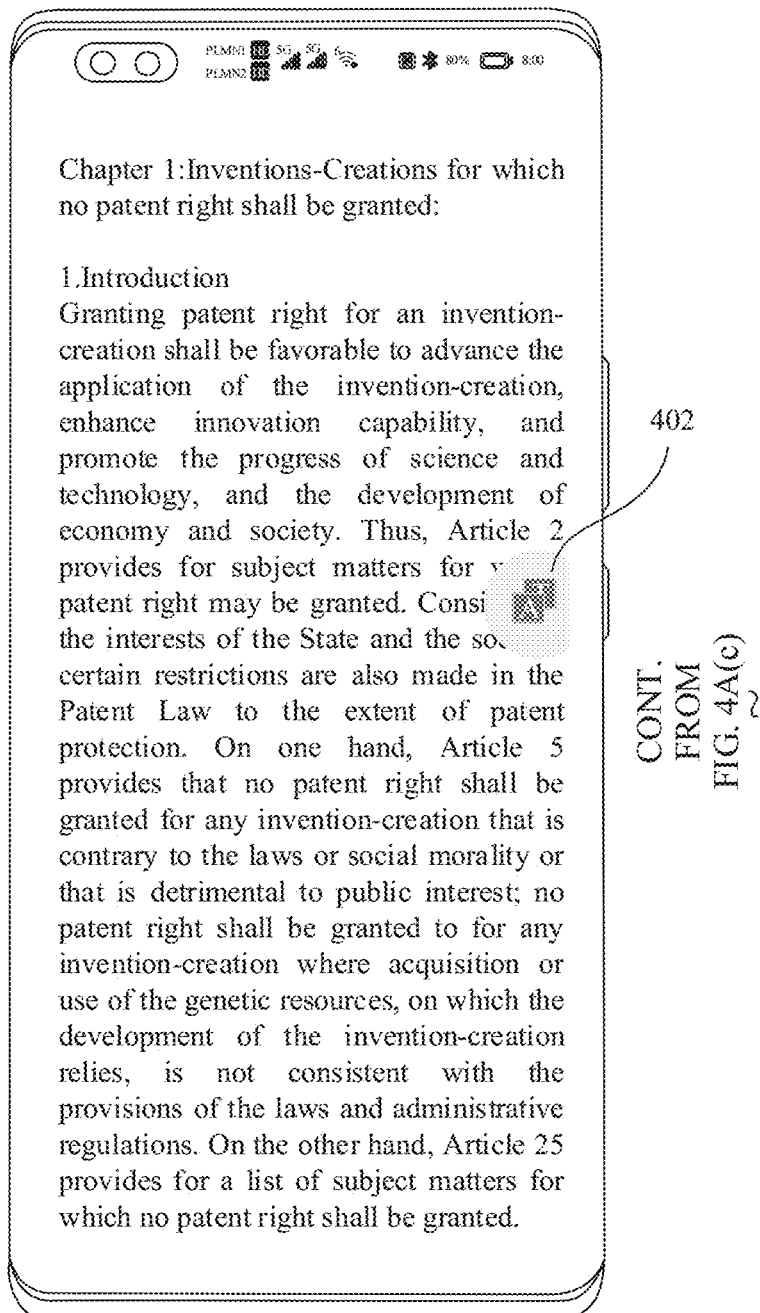

Referring to FIG. 4A(a) to FIG. 4A(d), in FIG. 4A(a), if the user does not trigger any, tap or touch operation on a floating ball 401 in a first state, that is, the floating ball 303 in FIG. 3(c), within a preset time period, it is determined that the user does not require a translation operation in this case, the floating ball 401 presents a second state, that is, a floating ball 402 in the second state in FIG. 4A(b), to improve user experience. The preset time period is a short period in a unit of second, and a specific time length is not limited in this application. In this case, the copy behavior of the user is determined as normal text copy behavior, and the floating ball 401 in the first state in FIG. 4A(a) is not displayed. That is, in this case, the copy behavior of the user does not trigger the translation operation. For example, after the user selects a word in FIG. 4A(c), for example, "law", and taps "copy", because the mobile phone determines that the user does not need to perform the translation operation in this case, the mobile phone does not display the floating ball 401 in the first state in FIG. 4A(a), and continues to display the floating ball 402 in the second state, as shown in FIG. 4A(d). That is, in FIG. 4A(a) to FIG. 4A(d), although the user copies the word "law", because the floating ball is in the second state, and it is determined that the user does not need to perform the translation operation, when the user triggers an operation of copying the word "law", a translation result is not requested, and the mobile phone performs a copy operation of the Android system.

It should be noted that the word selected by the user in FIG. 3(a) to FIG. 3(d) is "patent", and the word selected by the user in FIG. 4A(a) to FIG. 4A(d) is "law". It is clear that the words selected by the user are different, that is, words for which the user intends to perform translation are different.

Figure 3D:
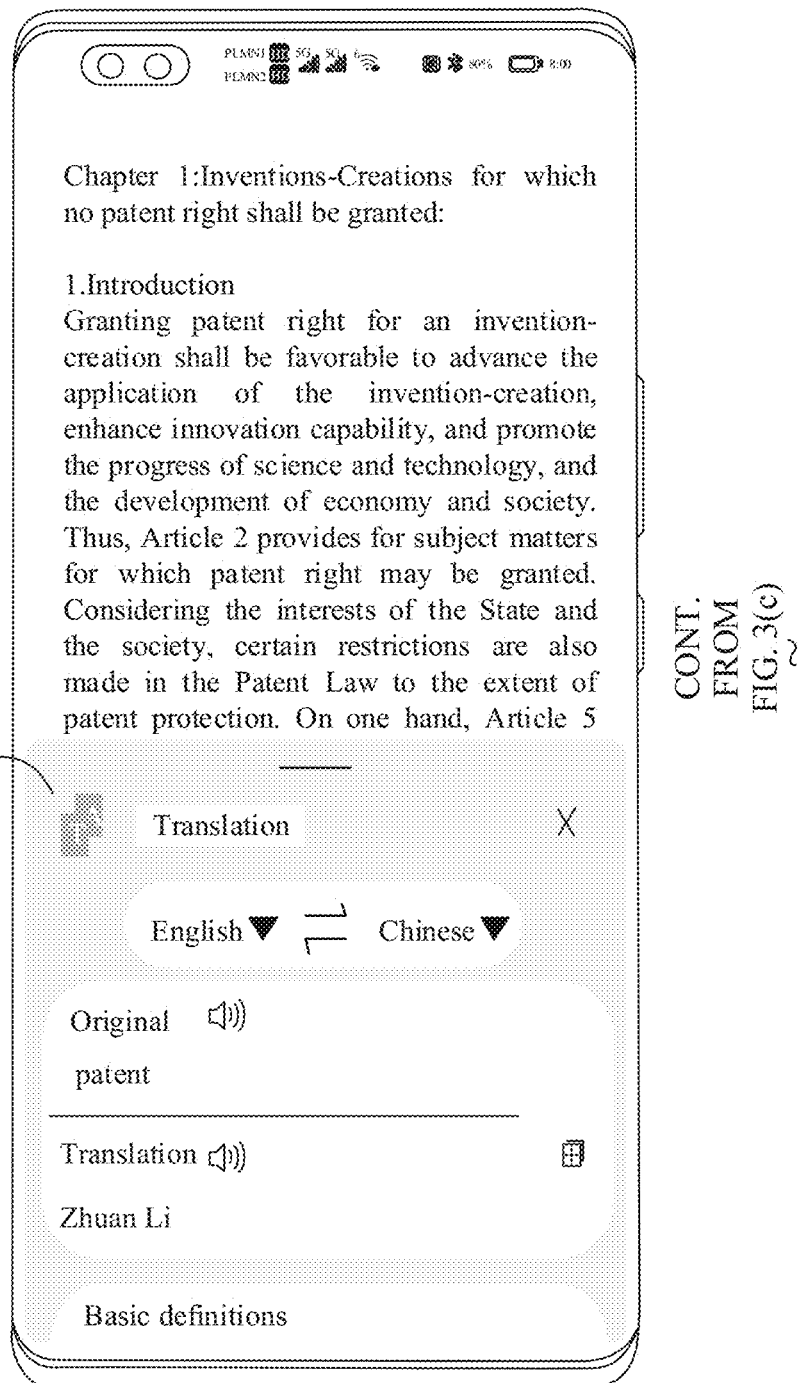

For example, the clipboard of the mobile phone stores the most recently copied word by default. Therefore, in FIG. 4A(c), if the user selects a word such as "law", taps "copy", and then taps the floating ball 402, because it is determined that the user has a translation intention, the floating window in FIG. 3(d) is displayed. However, the translated word changes from the original "patent" to "law" latest copied by the user, and a translation result of "law" is displayed in the floating window. That is, the clipboard of the mobile phone stores the most recently copied word by default. Therefore, in a state of the floating ball 402, if the user taps the floating ball 402 to perform a translation operation, the floating window displays a corresponding translation result of a text stored by the clipboard last time before the user taps the floating ball 402.

The floating ball in the first state is set to an entry for displaying a translation result to the user. After the user taps or touches the floating ball in the first state, a floating window with a translation result is displayed. Optionally, after the floating window is displayed, the floating ball in the first state disappears or continues to be displayed. This is not limited in this application.

The floating ball in the second state is set to display the floating ball in the second state when the user does not trigger any tap or touch operation on the floating ball in the first state within a preset time period. In this case, it is determined that the user does not need to perform the translation operation. Therefore, when the user triggers the copy operation, the copy behavior of the user is determined as normal text copy behavior, and the floating ball in the second state continues to be displayed.

For example, the first floating ball control corresponds to the floating ball in the second state, and the second floating ball control corresponds to the floating ball in the first state.

Figure 4B:
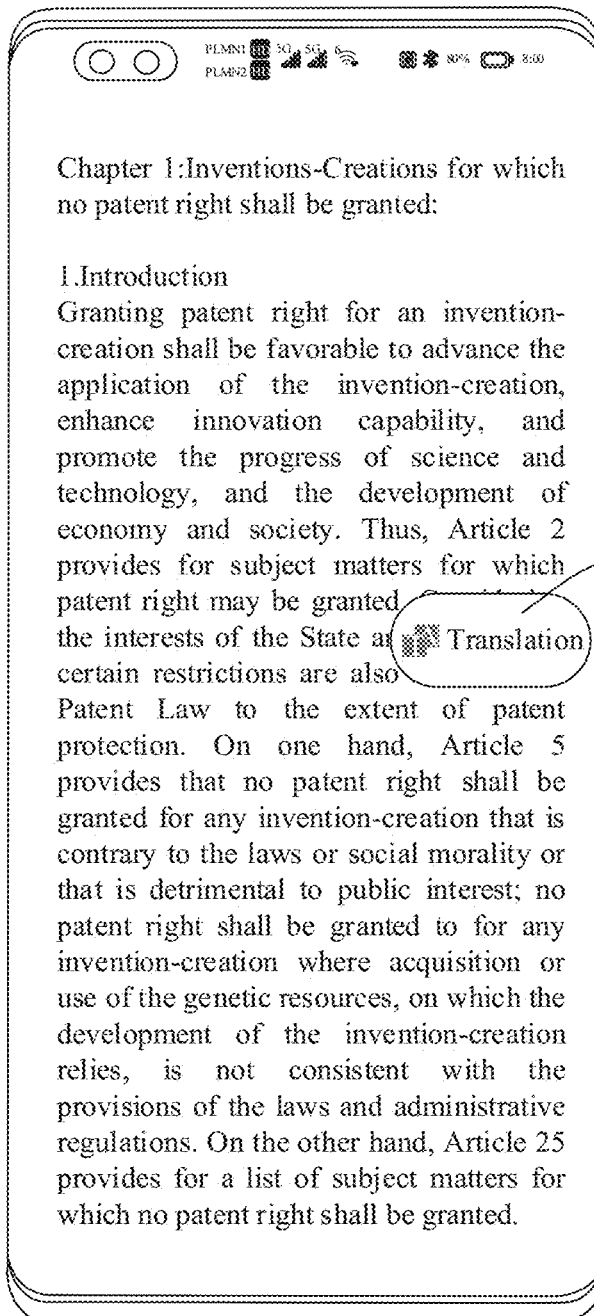
FIG. 4B(a) to FIG. 4B(d) are a schematic diagram of a floating ball in a translation interface according to an embodiment of this application.
Figure 4B:
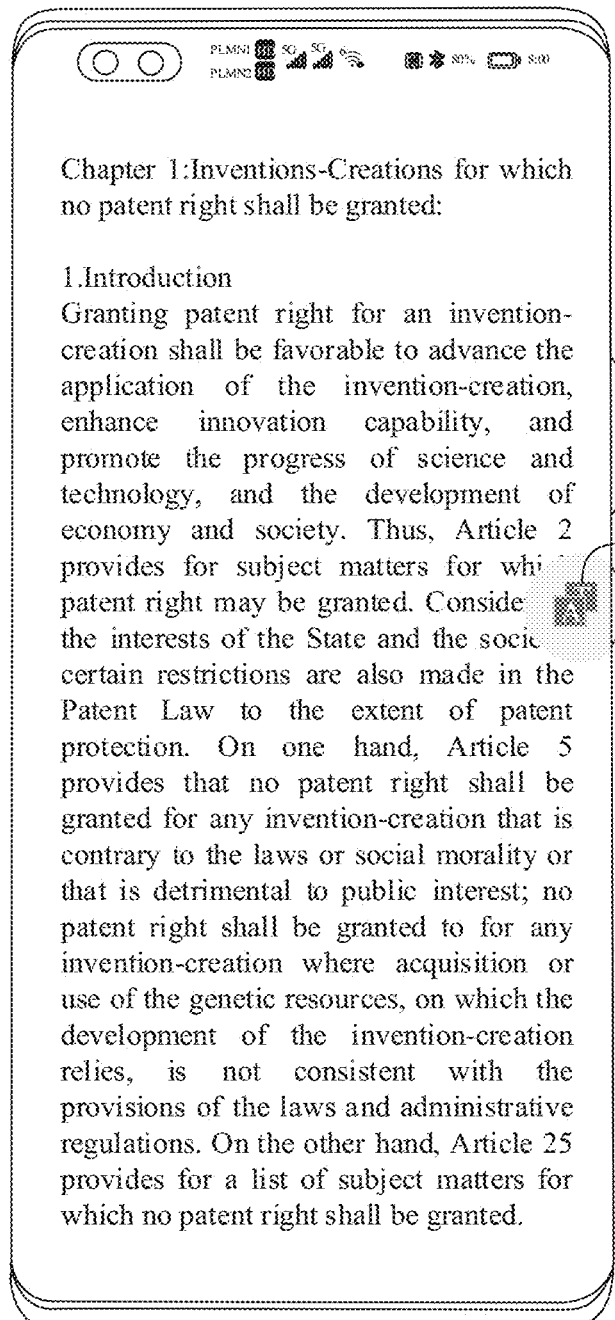
Figure 4B:
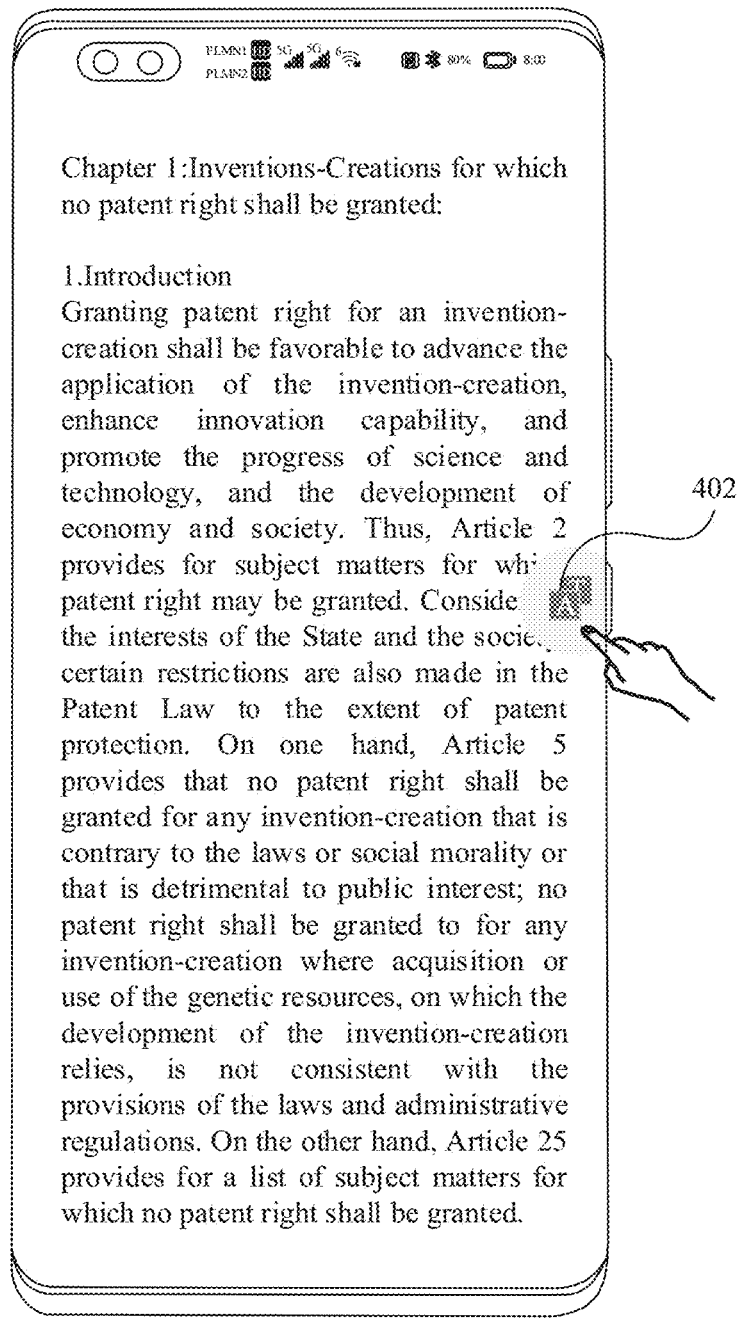
Figure 4B:
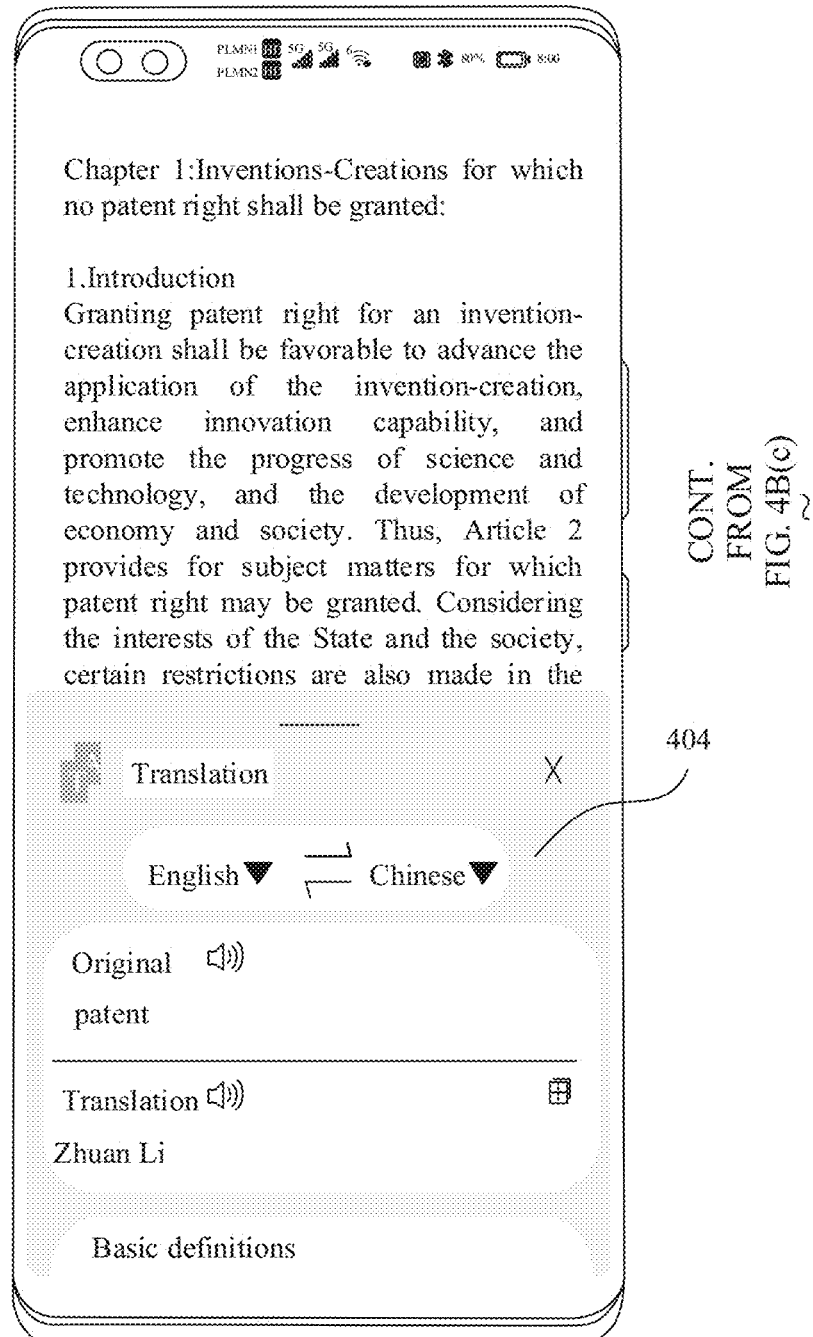

As shown in FIG. 4B(a) to FIG. 4B(d), the user does not trigger any tap or touch operation on the floating ball 401 in the first state within a preset time period in FIG. 4B(a), and the floating ball 402 in the second state in FIG. 4B(b) is displayed. If the user needs to perform the translation operation in the state of displaying the floating ball in the second state, as shown in FIG. 4B(c), the user needs to trigger an operation of tapping or touching the floating ball 402 in the second state. In this case, the mobile phone has buffered the translation result of the word "patent" selected by the user in FIG. 3(a), and because the clipboard of the mobile phone stores the latest copied word by default and a change of the clipboard content is not detected, after the user triggers an operation of tapping or touching the floating ball 402 in the second state, a floating window 404 in FIG. 4B(d) is displayed, and the translation result of the word "patent" is presented.

The following describes an example of a sliding effect of the floating window provided in the foregoing implementation of this application. It may be learned from the foregoing description that, because the floating ball and the floating window in the implementation of this application are system windows, the floating ball and the floating window cannot be disposed in the application window. The floating ball and the floating window do not belong to any application, are created by the system, and belong to only the system. In addition, because an interface of each application includes an activity and any activity belongs to an application process, a floating ball and a floating window that are set in a system window have no fixed container for processing sliding or a sliding conflict, and do not have an activity function. To enable the floating ball and the floating window to obtain an effect similar to that of the activity in the application window, that is, display content, based on an operation performed by the user on the floating ball and the floating window, a slide operation, a slide conflict, and the like need to be additionally set in the system window, and a focus of a response window is determined based on an operation such as a tap of the user.

For example, in this embodiment of this application, the floating window has three forms based on different screen occupation heights, that is, a bottom state, a half-screen state, and a full-screen state. The floating window in the bottom state is located at the bottom of the screen of the current application, and does not display any translation result content. This helps the user continue to access content in the current application, to improve user experience. The floating window in the half-screen state occupies about half of the size of the screen of the current application, and displays a part of translation result content. For example, the floating window in the half screen state may also be used as a default floating window form, that is, a floating window in a first form displayed after the user copies a text. For example, the floating window in the full-screen state may occupy the entire screen of the current application, is expanded based on a drag operation of the user, and is used to display more translation result content than the floating window in the half-screen state, to improve user experience.

Figure 5A:
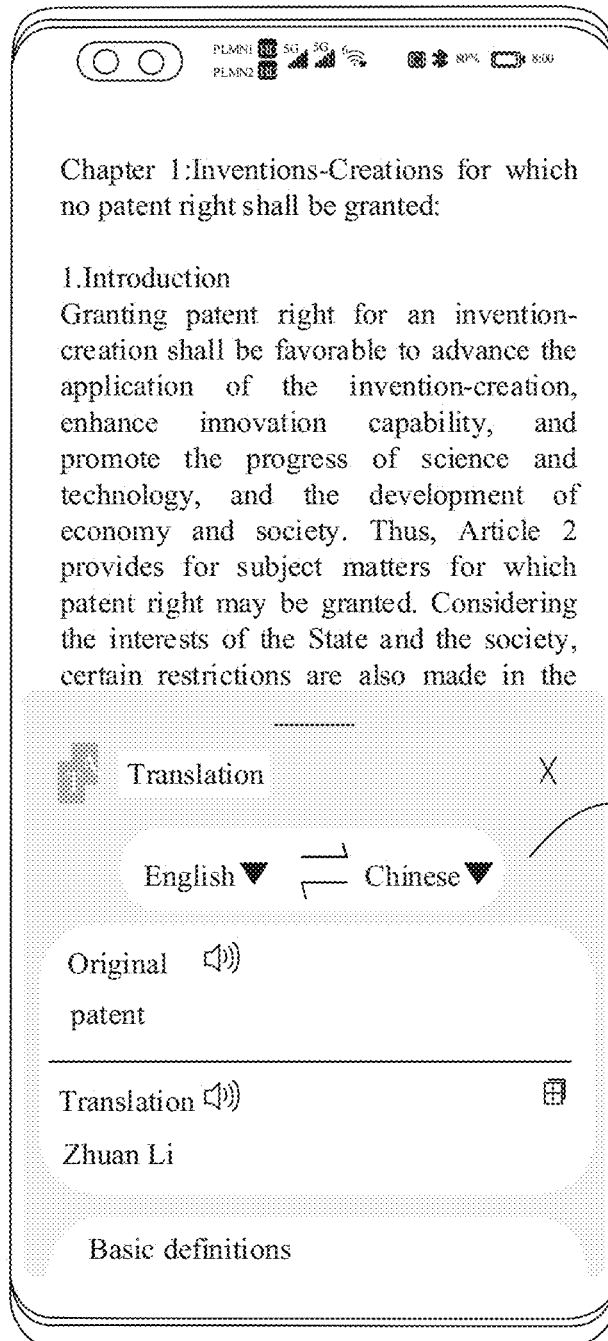
FIG. 5A(a) to FIG. 5A(c) are a schematic diagram of a status change of a floating window according to an embodiment of this application.
Figure 5A:
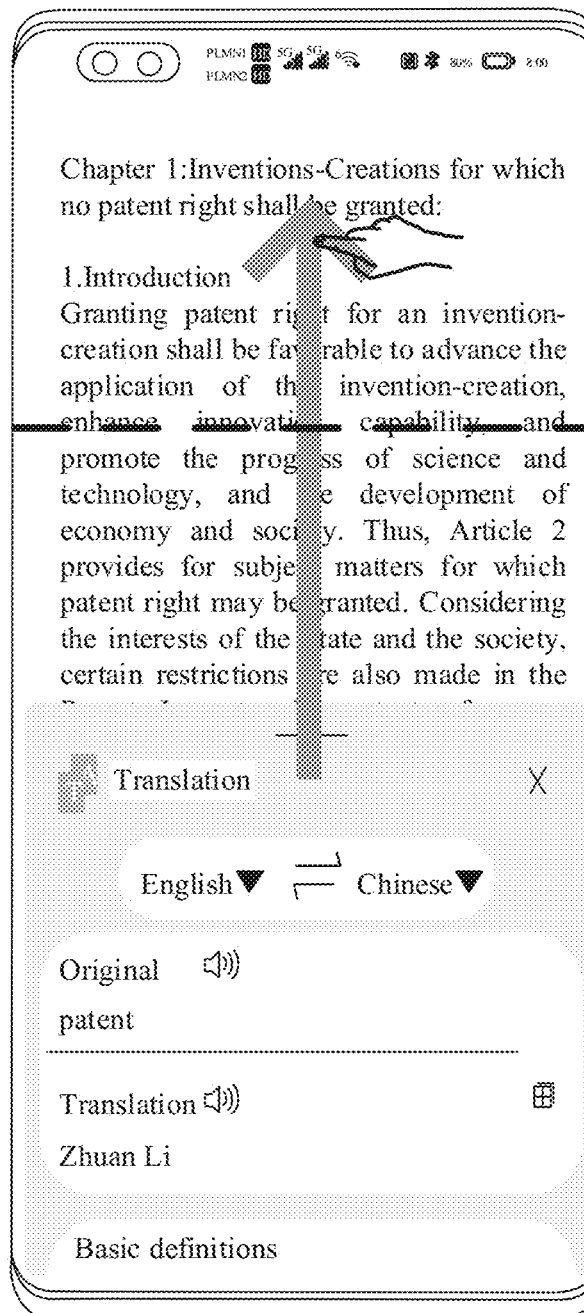
Figure 5A:
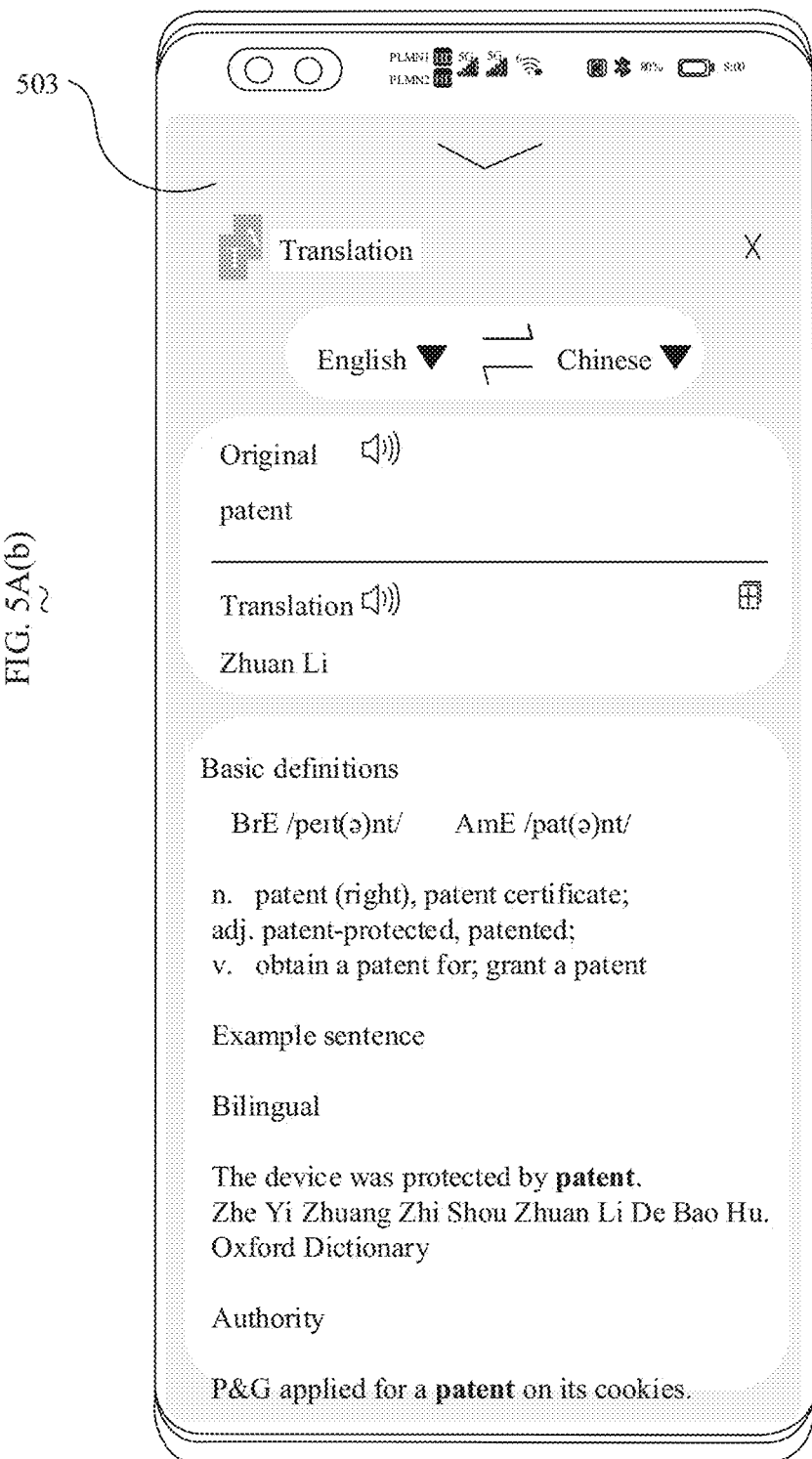
Figure 9A:
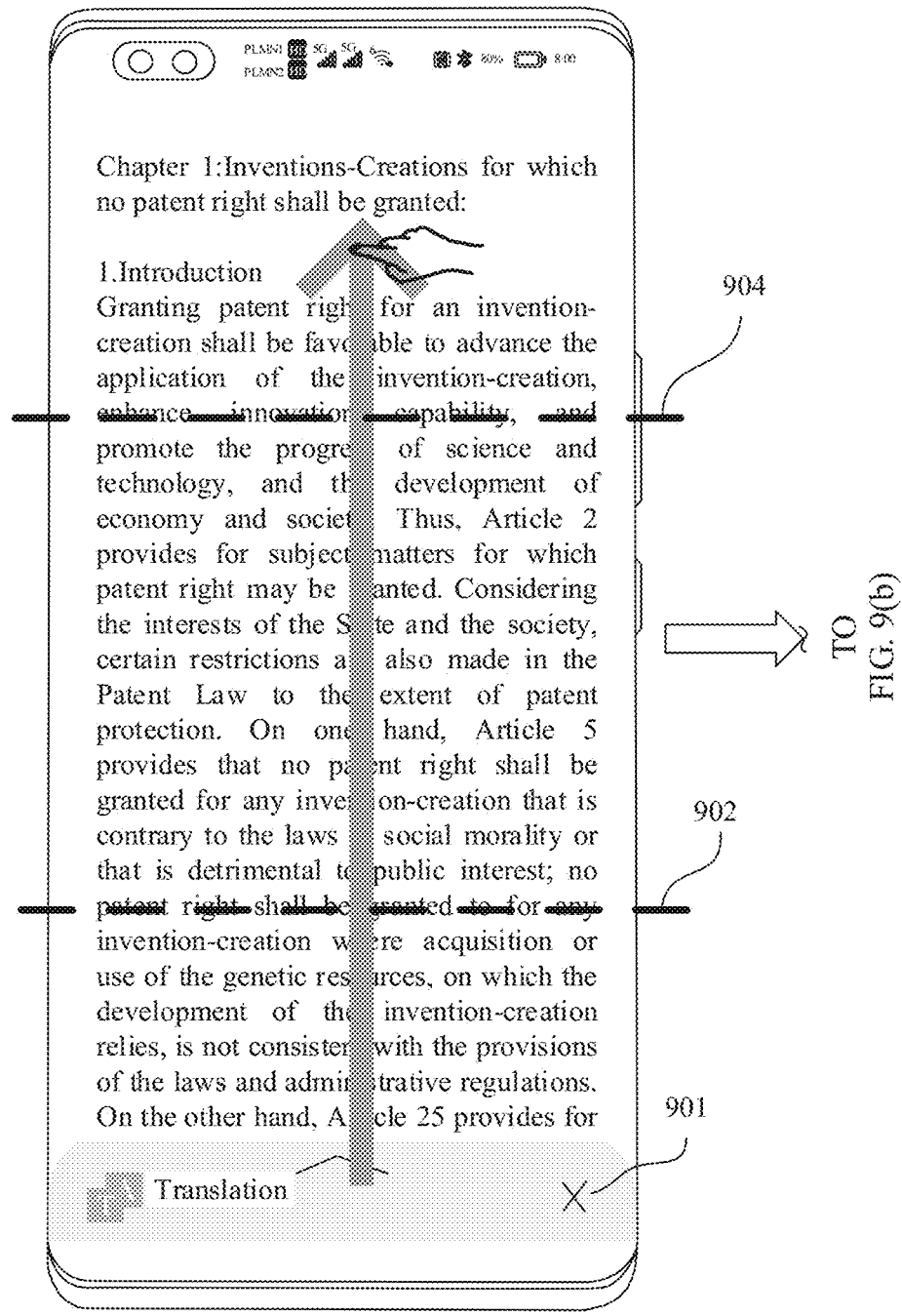
FIG. 9(a) and FIG. 9(h) are a schematic diagram of a status change of a floating window according to an embodiment of this application.
Figure 9B:
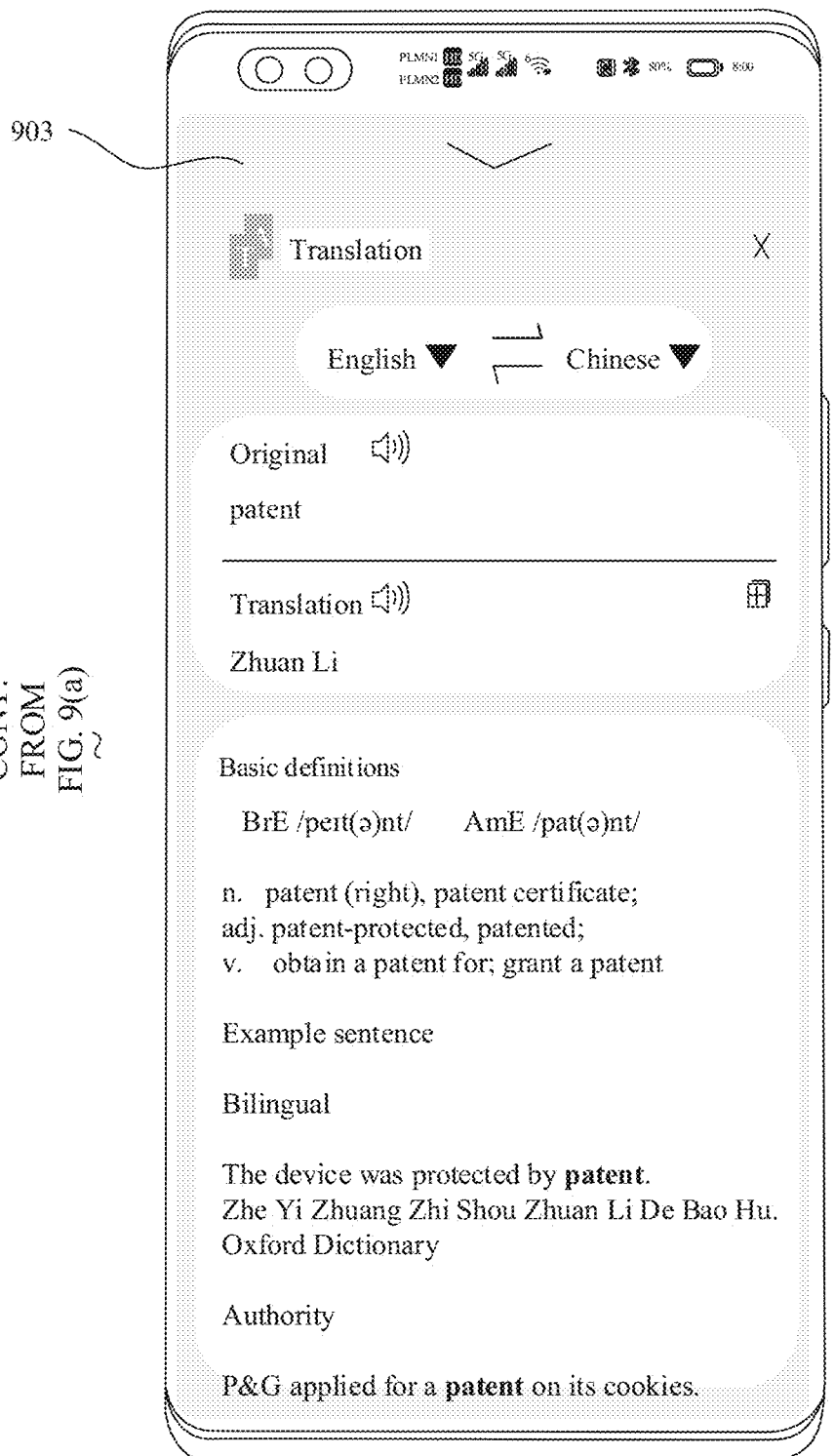

FIG. 5A(a) to FIG. 5A(c) to FIG. 9(a) and FIG. 9(b) show a sliding effect of the floating window and change logic of the floating window between three different forms in the implementation of this application. The following describes the implementation of this application.

(1) Specifically, a form change of the floating window is related to a sliding speed and a sliding distance of the user. The floating ball and the floating window are implemented by the window manager. The form control and switching of the bottom state, the half-screen state, and the full-screen state of the floating window are controlled by an attribute parameter y in the window manager, that is, heights of the floating window in different forms are controlled.

(2) Specifically, the floating ball and the floating window in the implementation of this application do not preempt a focus of a current application. For example, in FIG. 3(a) to FIG. 3(d), when the user copies a text, a focus event is on an original text of the current read application. After the user taps the "copy" option, the floating ball sign 302 is displayed and the floating ball 303 in the first state in FIG. 3(c) is automatically displayed after a period of time. In this case, the focus event is still on the original text of the current application, and the floating ball does not preempt the focus. After the user taps or touches the floating ball 303, the floating window 304 is displayed in FIG. 3(d). In this case, the user can still slide the original text of the current application, and the floating window does not preempt the focus.

A focus window is a window that is currently interacting with a user, and the window is responsible for receiving a key event and a touch event. When a new activity is started, a new window is added, an old window is removed, and a split-screen operation is performed back and forth, update of the focus window is related. Usually, in one window, there may be one window with a focus in one time period. That is, if focus control of the floating window is not processed, after the floating window 304 is displayed in FIG. 3(d), the user cannot slide the original text of the current application. Only after the user closes the current floating window 304, the user can return to the original text of the current application, and continue to slide the original text.

To implement that the floating ball and the floating window do not preempt the focus of the current application, in an implementation of this application, window attributes of the floating ball and the floating window are processed. Specifically, when the floating window is in the half-screen state and the full-screen state, the window attribute of the floating window is set to FLAG_NOT_TOUCH_MODAL to control focus event processing. When the floating window is in the bottom state, the window attribute of the floating window is set to FLAG_NOT_FOCUSABLE to deliver the focus event to processing of the original text of the current application. The current application is a read application that is being used by the user in the implementation of this application.

FLAG_NOT_FOCUSABLE indicates that the current window does not need to obtain the focus or receive various input events. FLAG_NOT_TOUCH_MODAL is enabled for this flag at the same time, and the final event is directly transferred to the window of the specific focus at a lower layer.

FLAG_NOT_TOUCH_MODAL indicates that in this mode, the system transfers a touch/tap event outside the current window region to an underlying window, and a tap event in the current window region is processed in the current window. This flag is important. Usually, this mark needs to be enabled. Otherwise, another window cannot receive a touch/tap event.

(3) Specifically, the floating ball and the floating window in the implementation of this application are system windows, and do not have an activity function. To enable the floating ball and the floating window to obtain an effect similar to that of the activity in the application window, that is, display content, based on an operation performed by the user on the floating ball and the floating window, a slide operation, a slide conflict, and the like need to be additionally set in the system window.

In an implementation of this application, to implement the foregoing sliding effect of the floating window, ontouch and oninterceptTouch events of a content container of the window manager need to be rewritten, to control sliding and specific event distribution.

In the Android architecture, the activity of the application window is encapsulated by Android, and the corresponding activity may be directly invoked during use. However, the floating ball and the floating window in the implementation of this application are system windows, and the Android architecture does not provide a corresponding activity for management and invoking. Therefore, to achieve, in the system window, an effect similar to the activity in the application window, an additional set of sliding logic implementation needs to be designed, which specifically includes:

a. monitoring a touch event of a user on a mobile phone screen;

b. monitoring a slide speed and direction of the user's finger on the screen, where this is specifically determined based on a touch point of the user's finger on the screen and a relative location of the touch point on the screen;

c. updating a floating window location based on an offset of the user's finger on the screen; and d. when the user's finger leaves the screen, processing a floating window sliding result, and releasing monitoring on a gesture speed and direction.

(4) Specifically, a sliding effect in the implementation of this application has different response events based on different sliding speeds of the user on the screen. Specific implementation logic is disclosed in the following descriptions of FIG. 5A(a) to FIG. 5A(c) and FIG. 5B(a) to FIG. 5B(c), and details are not described herein again.

(5) Specifically, an implementation of this application provides implementation of preventing an accidental touch. When the user's finger touches the screen, the user's finger jitters when touching the screen, Therefore, it is necessary to distinguish whether an operation of the user is a slide, touch, or tap event.

In the Android architecture, the activity of the application window has a function of preventing an accidental touch. However, the floating ball and the floating window in the implementation of this application are system windows, and the Android architecture does not provide a corresponding function implementation. Therefore, to implement, in the system window, an accidental touch prevention effect similar to that of the activity in the application window, an additional set of sliding logic implementation needs to be designed, which specifically includes: setting a movement threshold, and when the user's finger touches the floating window, determining whether a move event is triggered. To be specific, if a movement distance of the user's finger on the mobile phone screen is less than the movement threshold, it is determined that this operation is a tap event. If a movement distance of the user's finger on the mobile phone screen exceeds the movement threshold, it is determined that this operation is a slide event.

With reference to FIG. 5A(a) to FIG. 5A(c), a change implementation of switching the floating window from the half-screen state to the full-screen state is specifically described. The change of the state of the floating window is related to a speed at which the user drags the floating window to slide and whether the dragging exceeds a division line. For example, in FIG. 5A(a), a floating window 501 in the half-screen state is presented. In FIG. 5A(b), a division line 502 is an intermediate division line of a region outside the floating window 501 on the mobile phone screen, that is, the division line 502 is a division line between a half-screen height and a full-screen height of the floating window. When the user's finger drags the floating window 501 upward beyond the division line 502, a floating window 503 in the full-screen state in FIG. 5A(c) is presented.

The division line 502 may be a division line between the half-screen height and the full-screen height, or may be a division line between the half-screen height and a bottom-state height. Different division lines are selected based on different current heights of the floating window and different directions in which the user drags the floating window to slide.

The state of the floating window is related to a speed of dragging the floating window by the user in addition to whether the user drags the floating window beyond a middle line between two states.

For example, when the user drags the floating window 501 to slide upward rapidly, the floating window 501 presents the full-screen state in FIG. 5A(c), In a case of fast sliding, optionally, the user may drag the floating window 501 to slide upward rapidly without exceeding the division line 502, and the full-screen state in FIG. 5A(c) can be presented, provided that a fast sliding condition is met.

Optionally, only when the user drags the floating window 501 to slide upward, and fast sliding is met and the division line is exceeded, the full-screen state in FIG. 5A(c) can be presented.

Figure 5B:
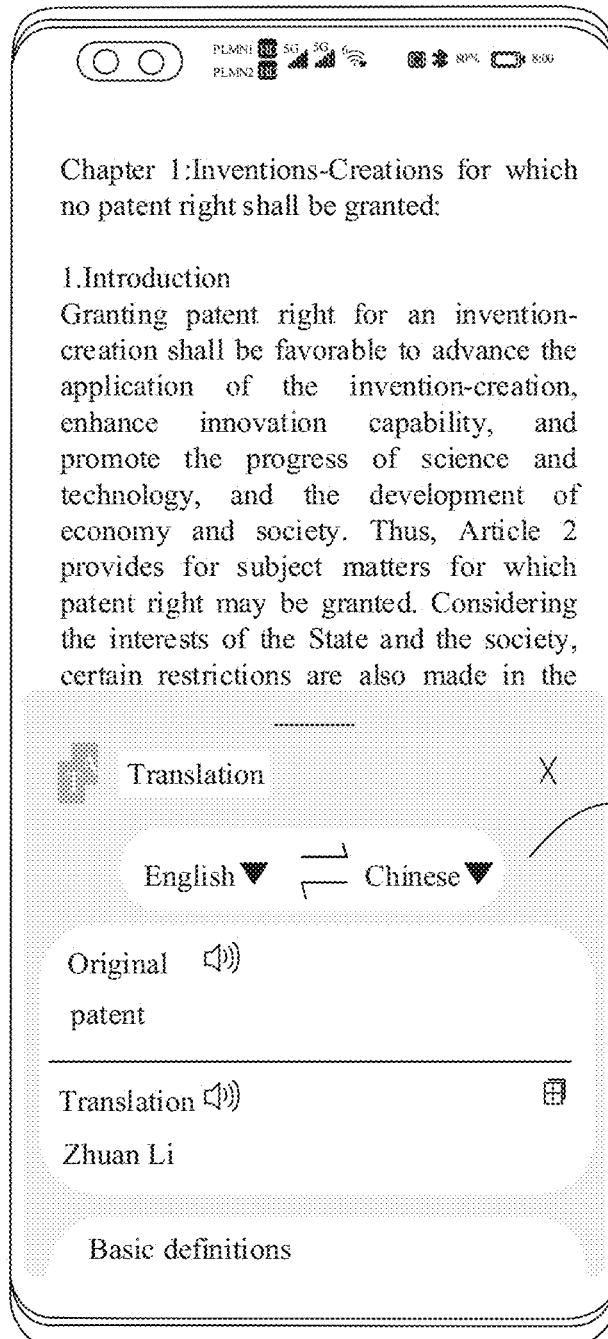
FIG. 5B(a) to FIG. 5B(c) are a schematic diagram of a status change of a floating window according to an embodiment of this application.
Figure 5B:
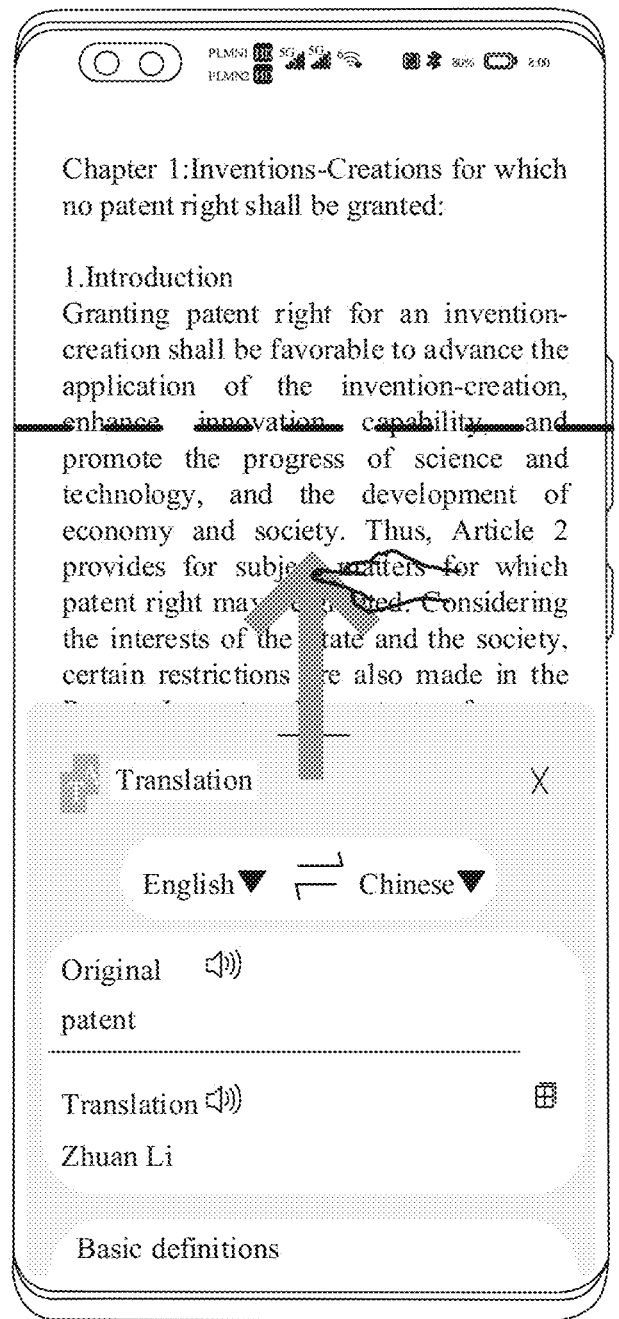
Figure 5B:
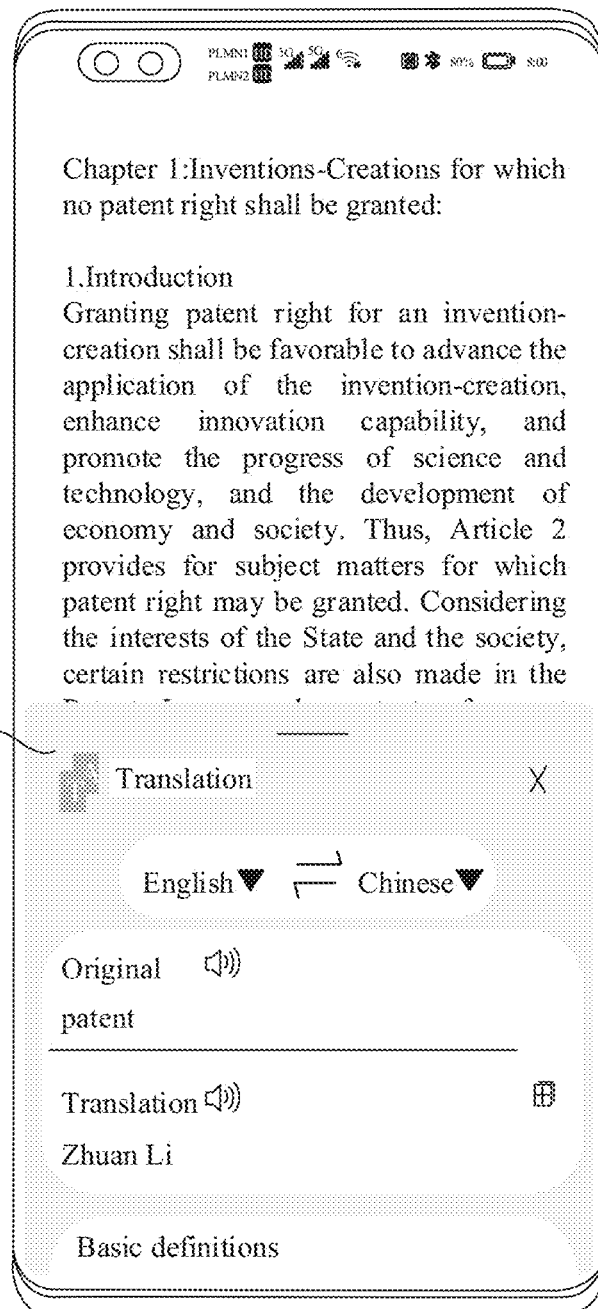

For example, as shown in FIG. 5B(a) to FIG. 5B(c), when the user drags the floating window 501 in 5B(a) to slide upward slowly, if the user drags the floating window 501 upward beyond the division line 502, the floating window presents the full-screen state in FIG. 5A(c). In this case, if the user does not drag the floating window 501 upward beyond the division line 502, that is, the state in FIG. 5B(b), the floating window maintains or restores to the half-screen state in FIG. 5B(c).

Figure 6A:
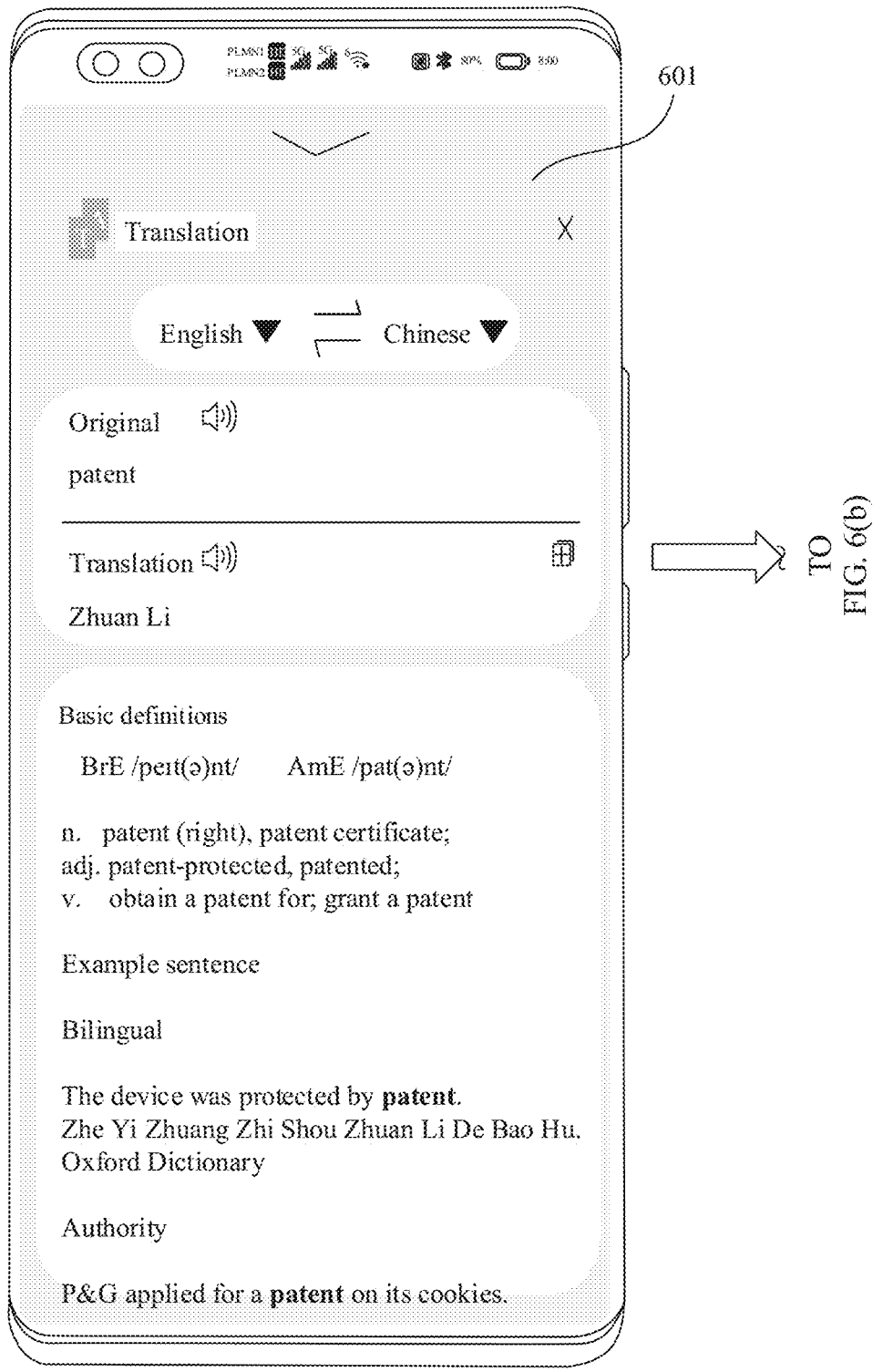
FIG. 6(a) to FIG. 6(e) are a schematic diagram of a status change of a floating window according to an embodiment of this application.
Figure 6B:
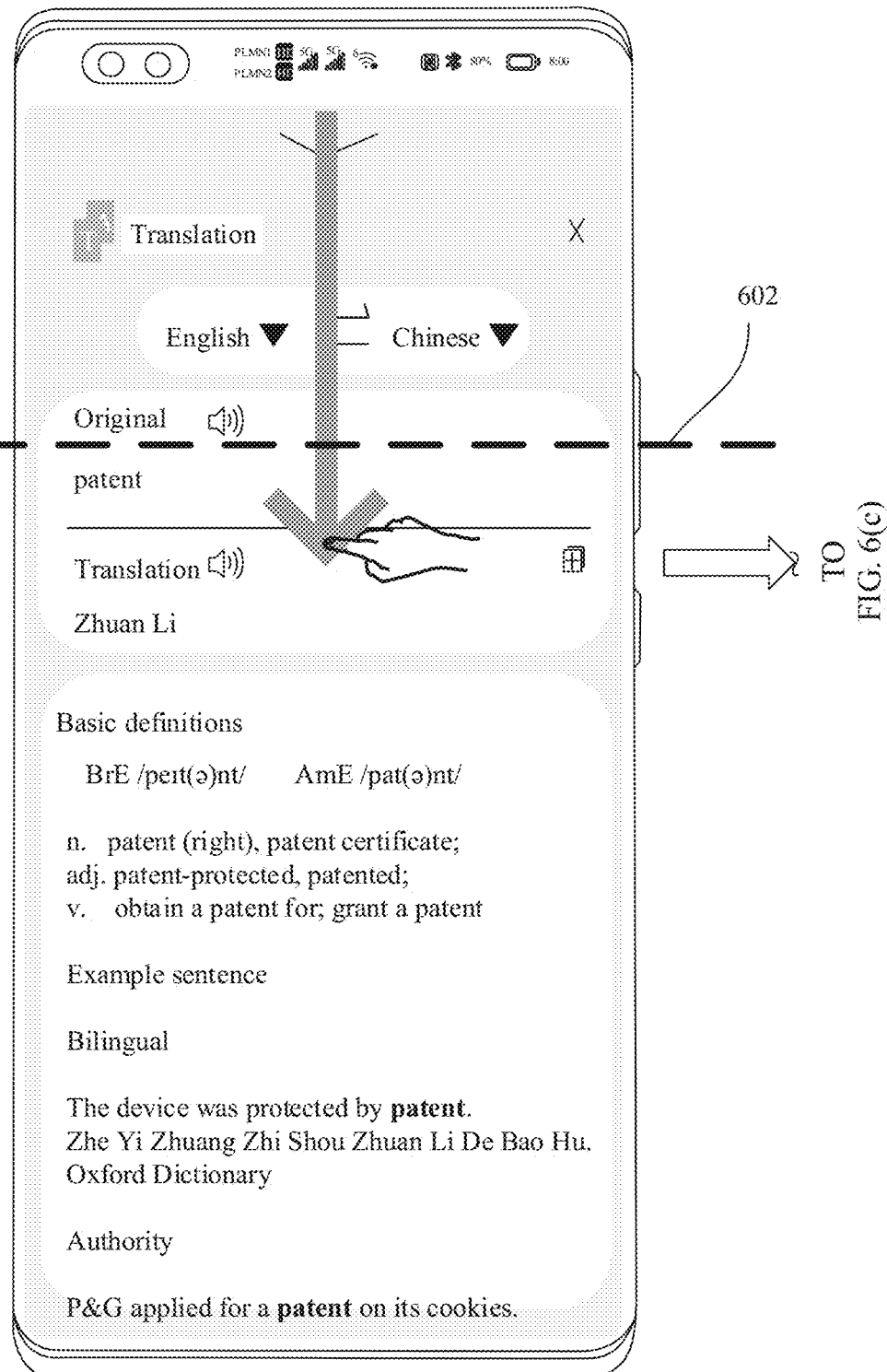
Figure 6C:
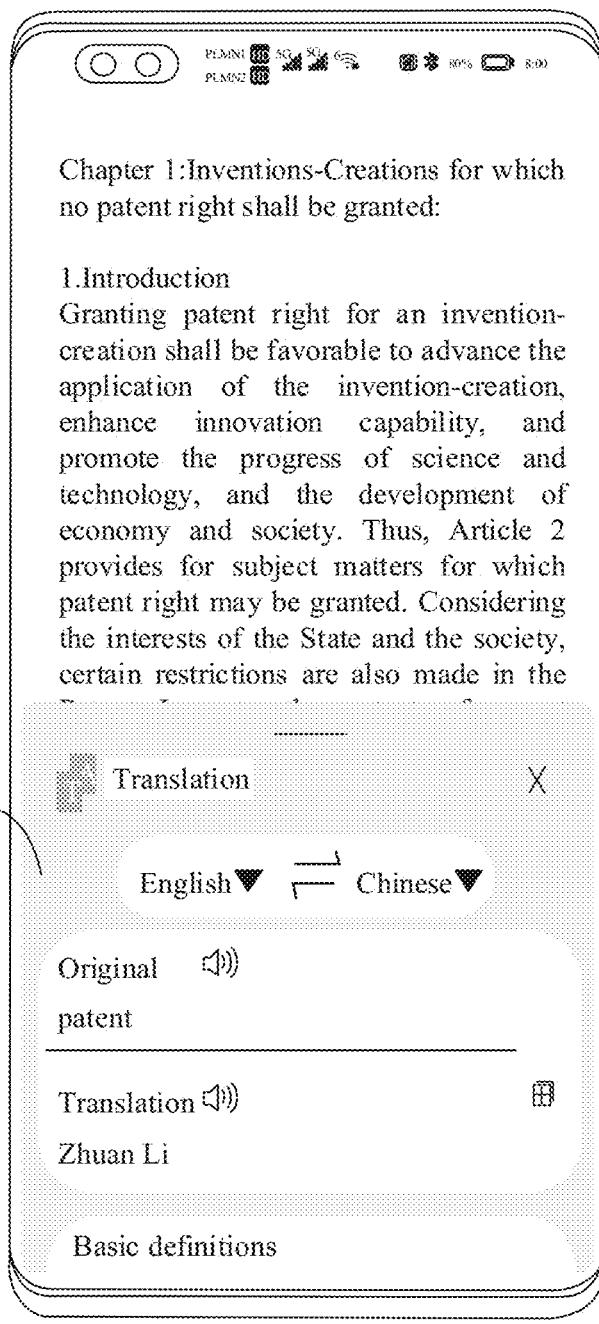
Figure 6D:
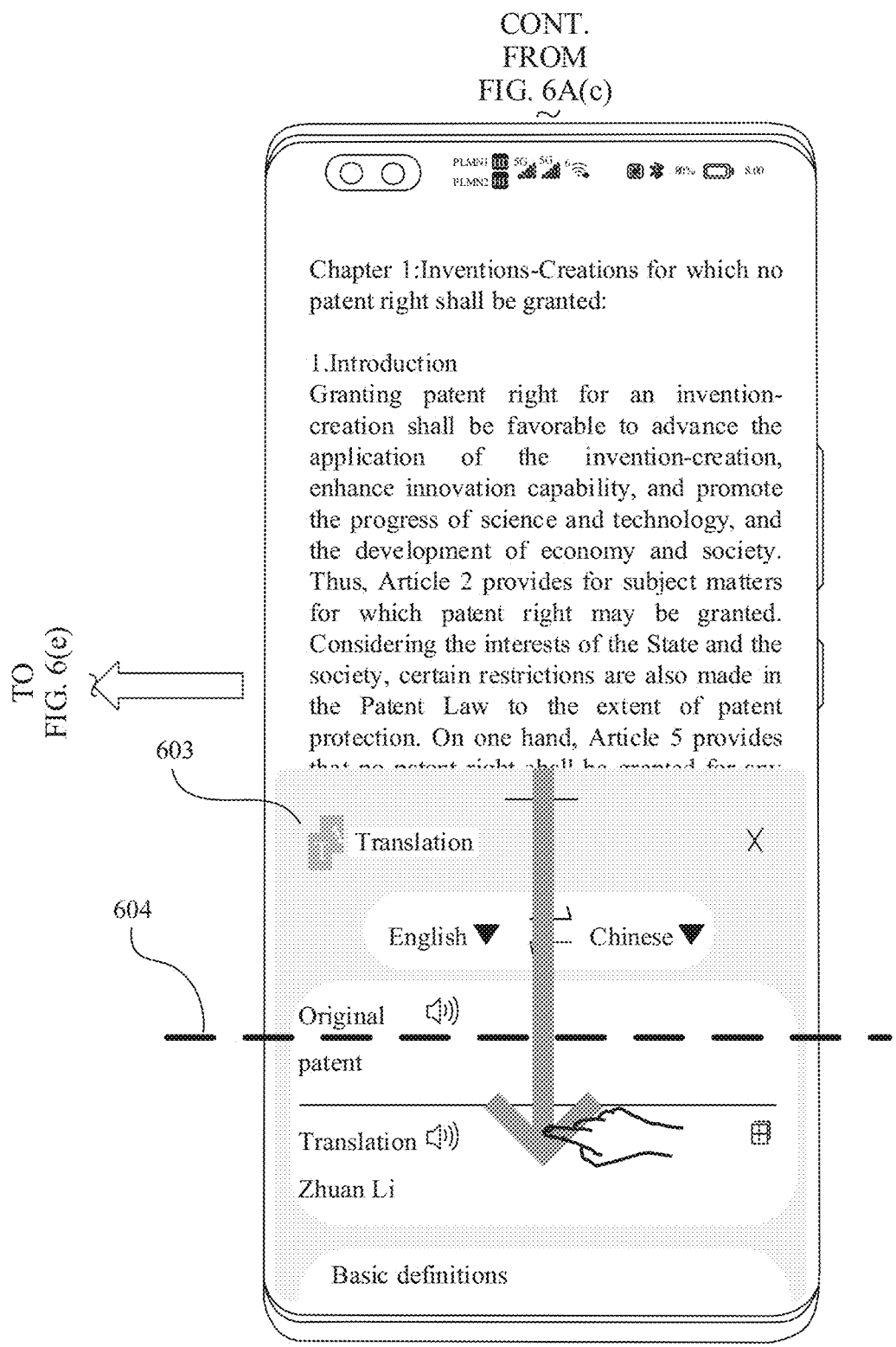
Figure 6E:
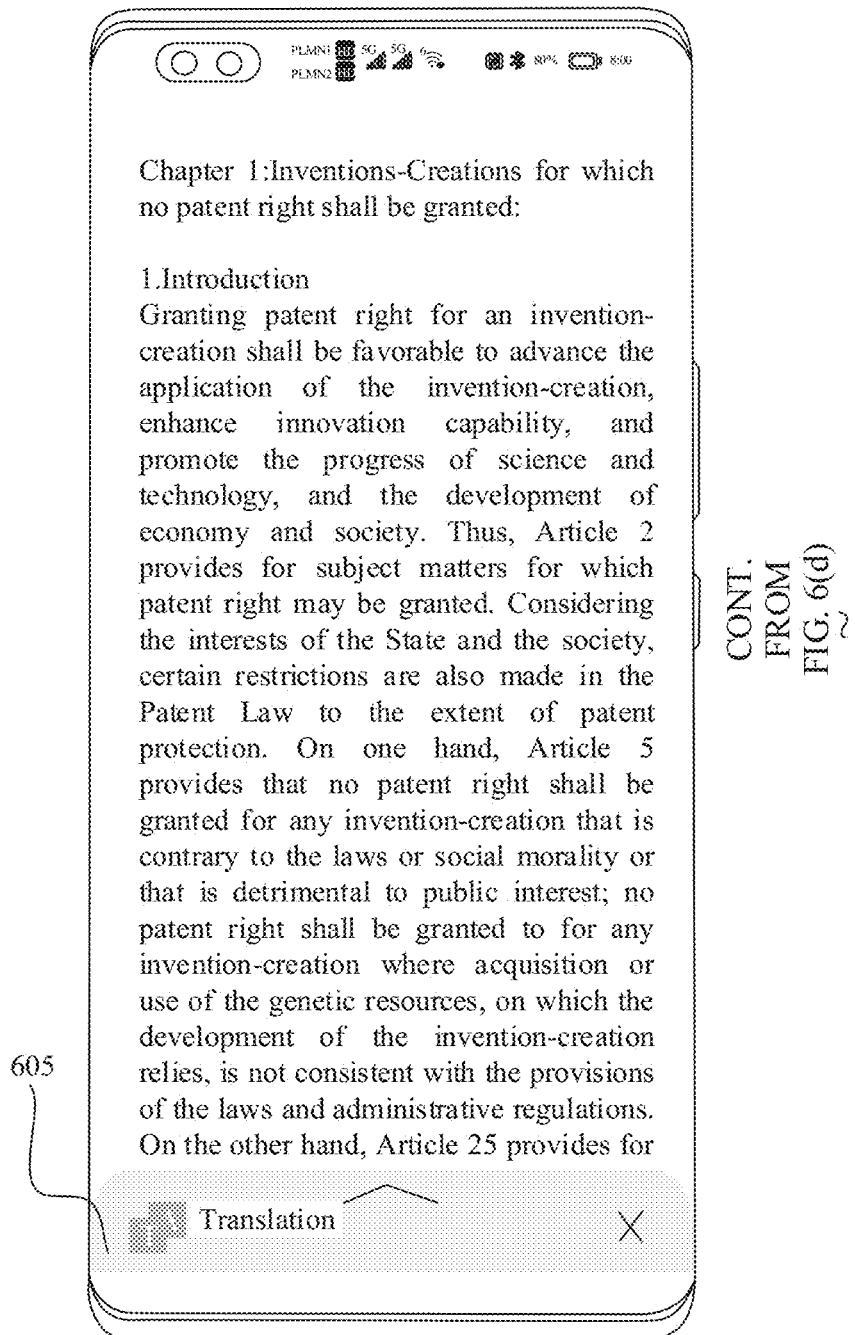

With reference to FIG. 6(a) to FIG. 6(e), a continuous change implementation of switching the floating window from the full-screen state to the half-screen state and then switching to the bottom state is specifically described. The change of the state of the floating window is related to a speed at which the user drags the floating window to slide and whether the dragging exceeds a division line. For example, in FIG. 6(a), a floating window 601 in the full-screen state is presented. In FIG. 6(b), the division line 602 is a division line between the half-screen height and the full-screen height of the floating window. When the user's finger drags the floating window 601 in the full-screen state downward beyond the division line 602, a floating window 603 in the half-screen state in FIG. 6(c) is presented. In this case, the user may further continue to drag the floating window 603 in the half-screen state downward to present the floating window in different states. In FIG. 6(d), a division line 604 is a division line between the half-screen height and the bottom-state height of the floating window. When the user's finger drags the floating window 603 in the half-screen state downward beyond the division line 604, a floating window 605 in the bottom state in FIG. 6(e) is presented.

The state of the floating window is related to a speed of dragging the floating window by the user in addition to whether the user drags the floating window beyond a middle line be Teen two states. An implementation is similar to the foregoing implementation process in FIG. 5A(a) to FIG. 5A(c) and FIG. 5B(a) to FIG. 5B(c), and details are not described herein again.

Figure 7A:
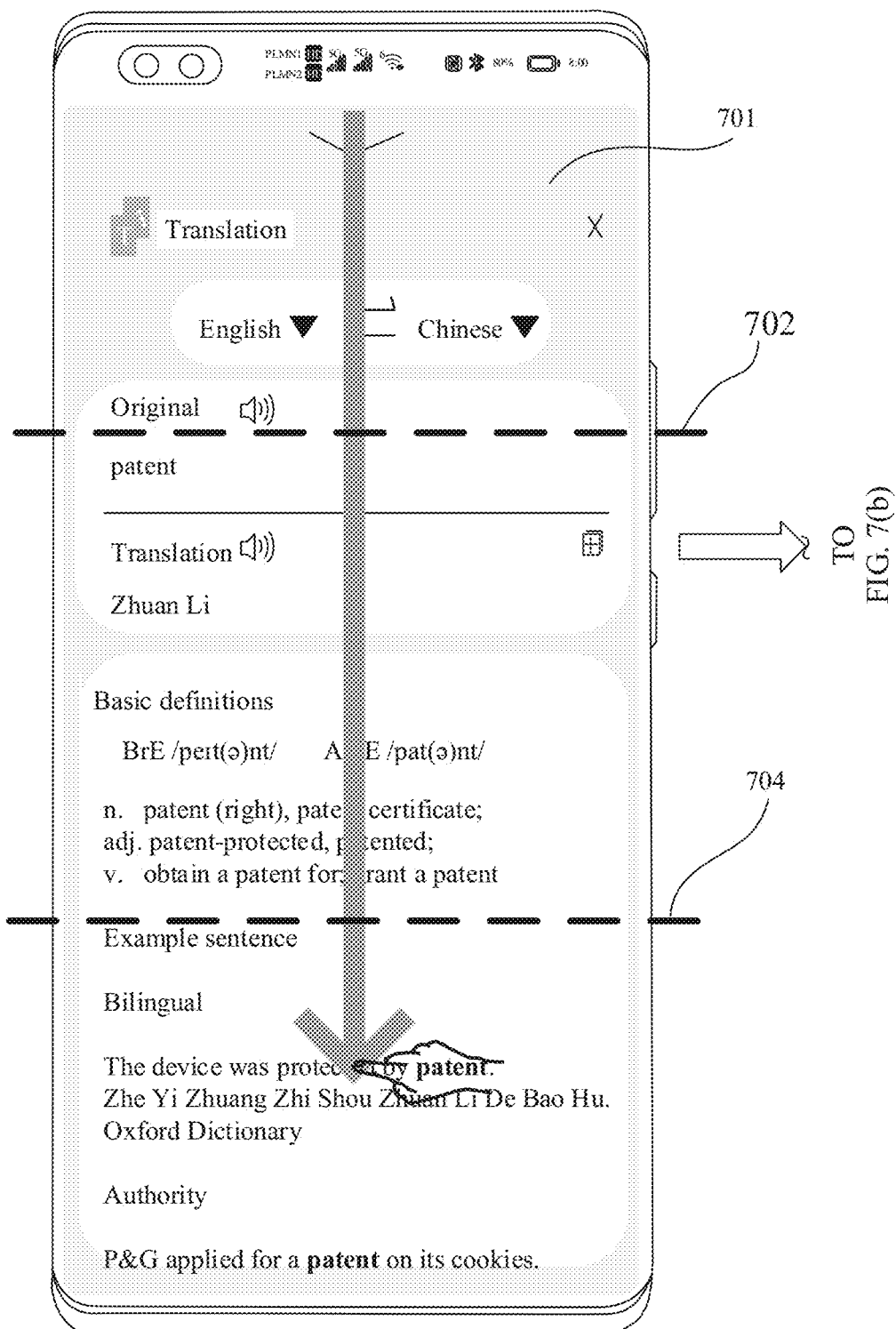
FIG. 7(a) and FIG. 7(b) are a schematic diagram of a status change of a floating window according to an embodiment of this application.
Figure 7B:
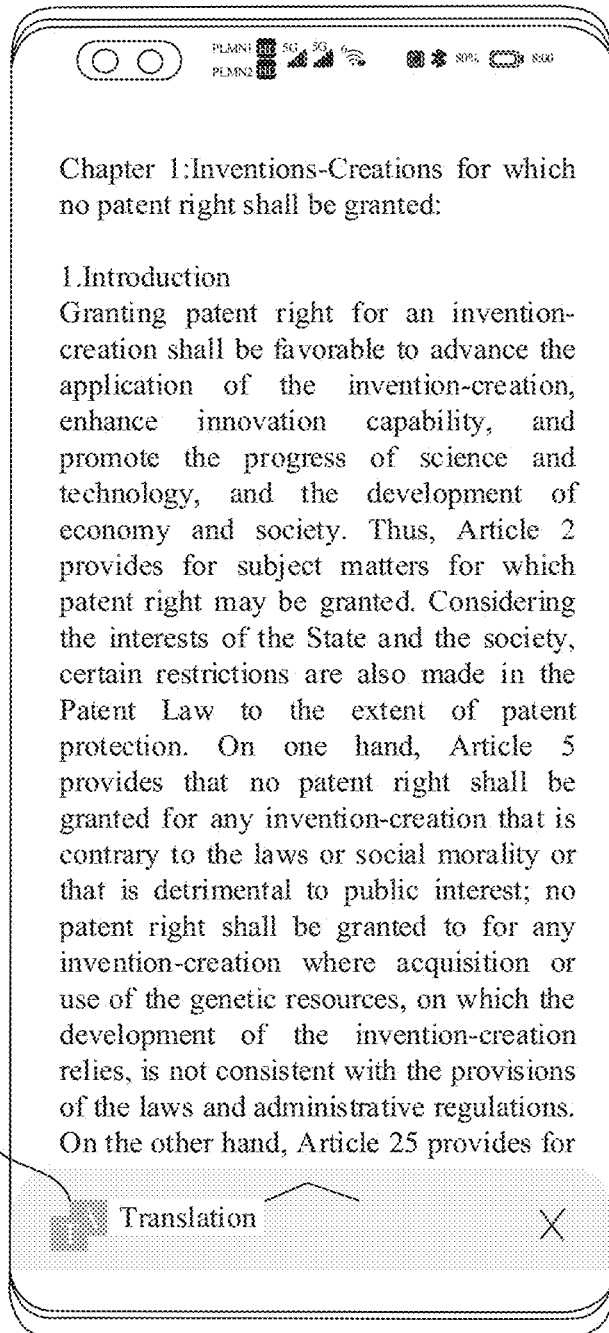

With reference to FIG. 7(a) and FIG. 7(b), a change implementation of directly switching the floating window from the full-screen stale to the bottom state is specifically described. In this implementation, a process of switching from the full-screen state to the half-screen state and then switching from the half-screen state to the bottom state is not required, but the full-screen state is directly switched to the bottom state based on a user operation. The change of the state of the floating window is related to a speed at which the user drags the floating window to slide and whether the dragging exceeds a division line. For example, in FIG. 7(a), a floating window 701 in the full-screen state is presented. A division line 702 is a division line between the half-screen height and the full-screen height of the floating window. A division line 704 is a division line between the half-screen height and the bottom-state height of the floating window. When the user's finger drags the floating window 701 in the full-screen state downward beyond the division line 702 and the division line 704, a floating window 703 in the bottom state in FIG. 7(b) is presented.

The state of the floating window is related to a speed of dragging the floating window by the user in addition to whether the user drags the floating window beyond a middle line between two states. An implementation is similar to the foregoing implementation process in FIG. 5A(a) to FIG. 5A(c) and FIG. 5B(a) to FIG. 5B(c), and details are not described herein again.

Figure 8A:
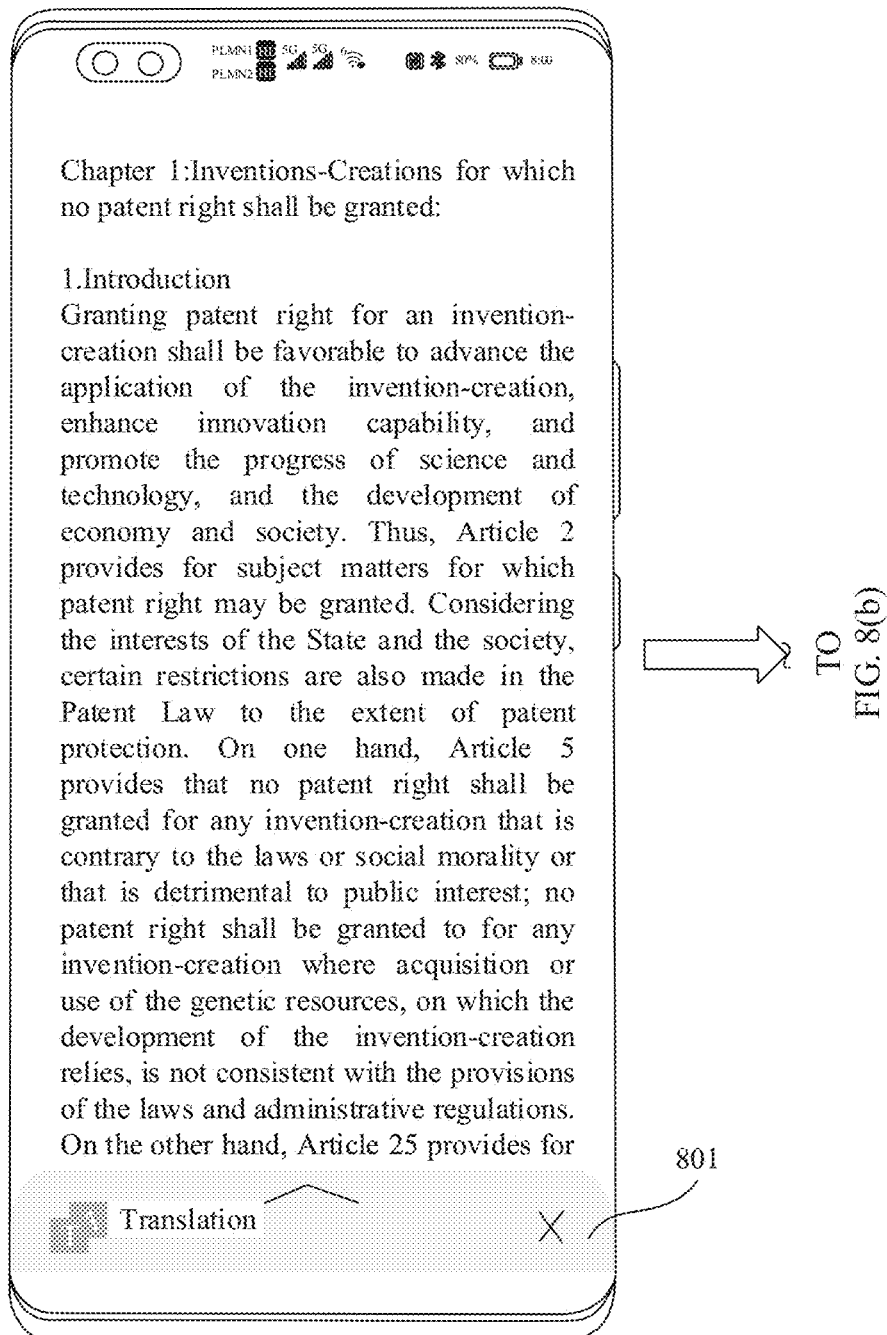
FIG. 8(a) to FIG. 8(e) are a schematic diagram of a status change of a floating window according to an embodiment of this application.
Figure 8B:
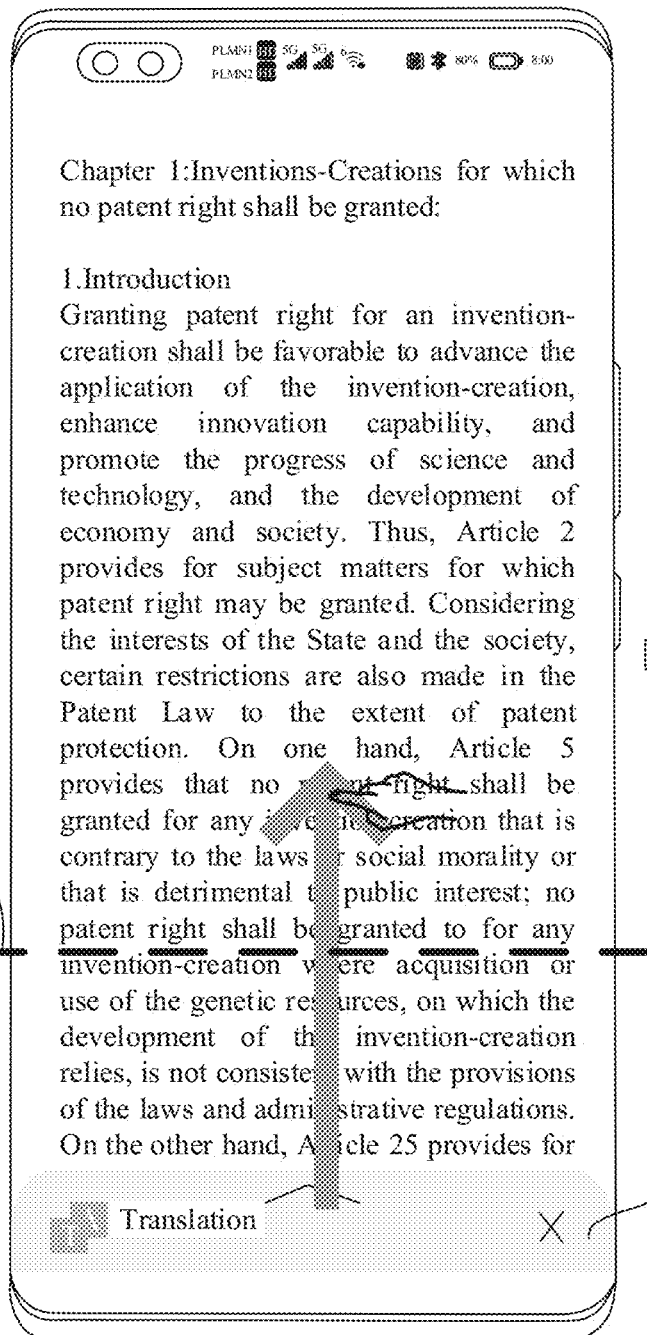
Figure 8C:
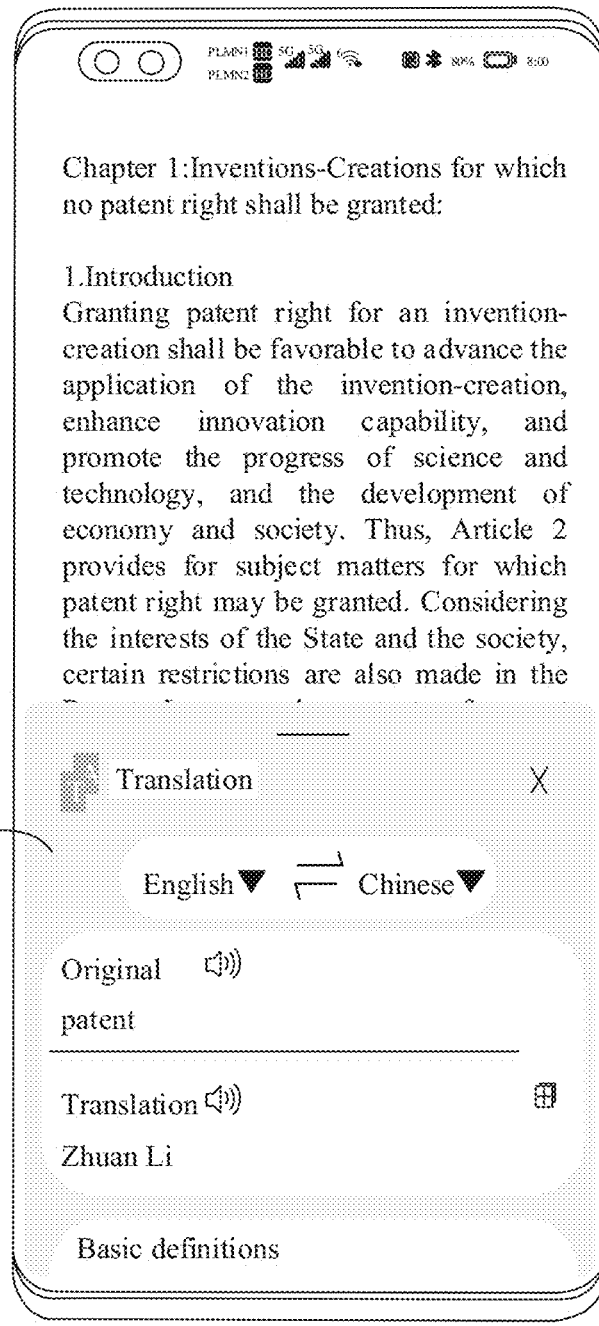
Figure 8D:
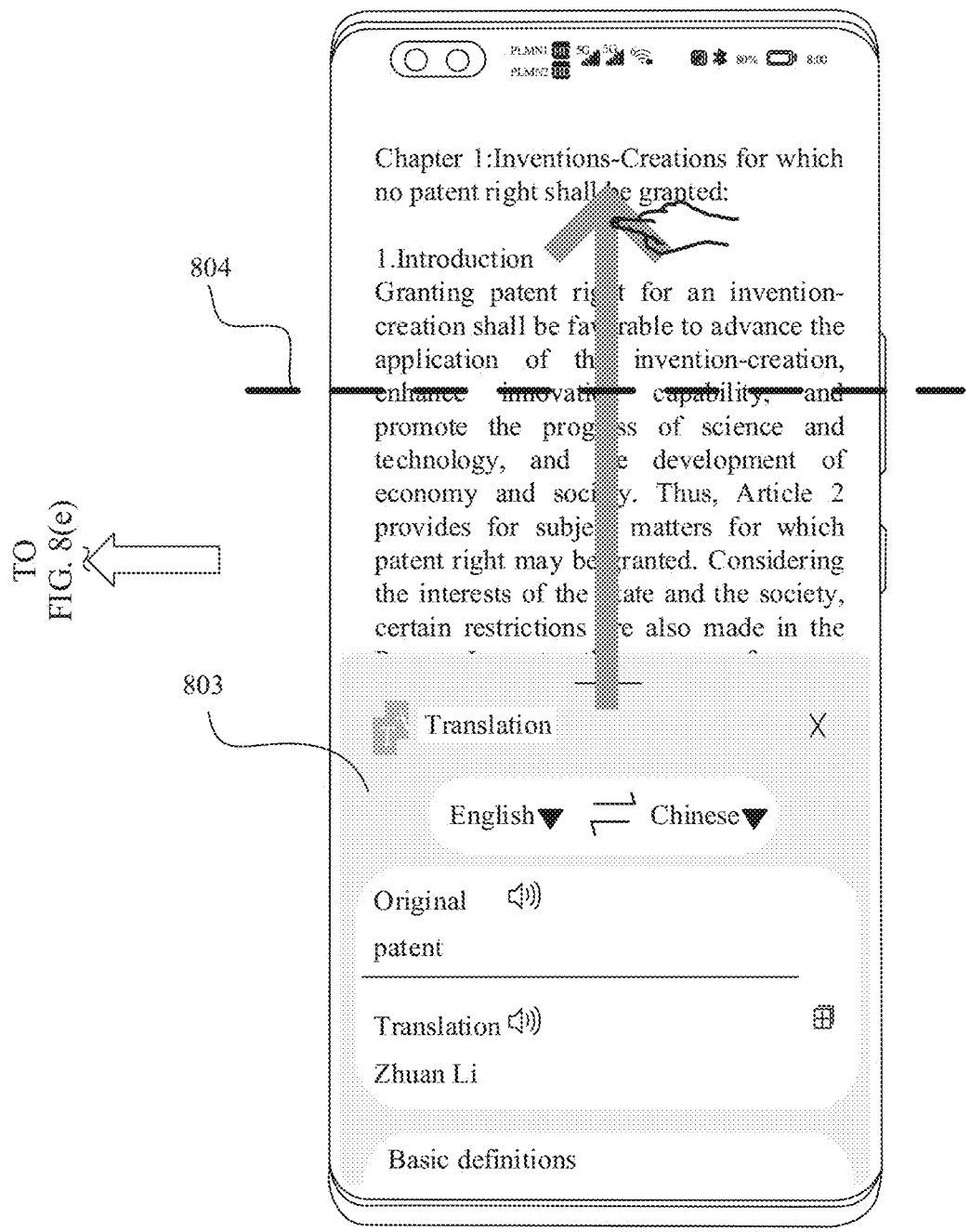
Figure 8E:
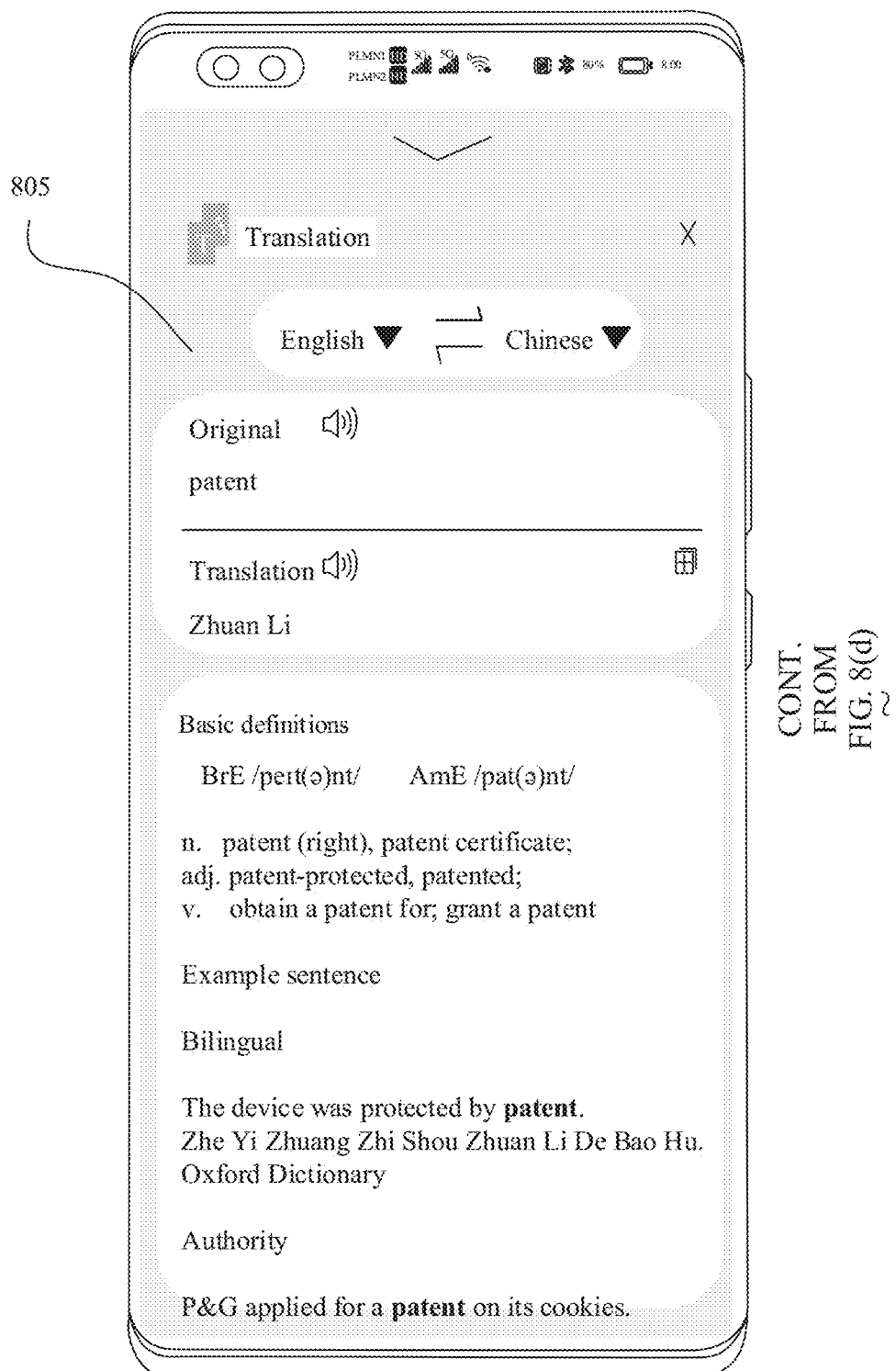

With reference to FIG. 8(a) to FIG. 8(e), a continuous change implementation of switching the floating window from the bottom state to the half-screen state and then switching to the full-screen state is specifically described. The change of the state of the floating window is related to a speed at which the user drags the floating window to slide and whether the dragging exceeds a division line. For example, in FIG. 8(a), a floating window 801 in the bottom state is presented. In FIG. 8(b), a division line 802 is a division line between the half-screen height and the bottom-state height of the floating window. When the user's finger drags the floating window 801 in the bottom state upward beyond the division line 802, a floating window 803 in the half-screen state in FIG. 8(c) is presented. In this case, the user may further continue to drag the floating window 803 in the half-screen state upward to present the floating window in different states. In FIG. 8(d), a division line 804 is a division line between the half-screen height and the full-screen height of the floating window. When the user's finger drags the floating window 803 in the half-screen state upward beyond the division line 804, a floating window 805 in the bottom state in FIG. 8(e) is presented.

The state of the floating window is related to a speed of dragging the floating window by the user in addition to whether the user drags the floating window beyond a middle line between two states. An implementation is similar to the foregoing implementation process in FIG. 5A(a) to FIG. 5A(c) and FIG. 5B(a) to FIG. 5B(c), and details are not described herein again.

With reference to FIG. 9(a) and FIG. 9(h), a change implementation of directly switching the floating window from the bottom state to the full-screen state is specifically described. In this implementation, a process of switching from the bottom state to the half-screen state and then switching from the half-screen state to the full-screen state is not required, but the bottom state is directly switched to the full-screen state based on a user operation. The change of the state of the floating window is related to a speed at which the user drags the floating window to slide and whether the dragging exceeds a division line. For example, in FIG. 9(a), a floating window 901 in the bottom state is presented. A division line 902 is a division line between the half-screen height and the bottom-state height of the floating window. A division line 904 is a division line between the half-screen height and the full-screen height of the floating window. When the user's finger drags the floating window 701 in the bottom state upward beyond the division line 902 and the division line 904, a floating window 903 in the bottom state in FIG. 9(h) is presented.

The state of the floating window is related to a speed of dragging the floating window by the user in addition to whether the user drags the floating window beyond a middle line between two states. An implementation is similar to the foregoing implementation process in FIG. 5A(a) to FIG. 5A(c) and FIG. 5B(a) to FIG. 5B(c), and details are not described herein again.

Figure 10A:
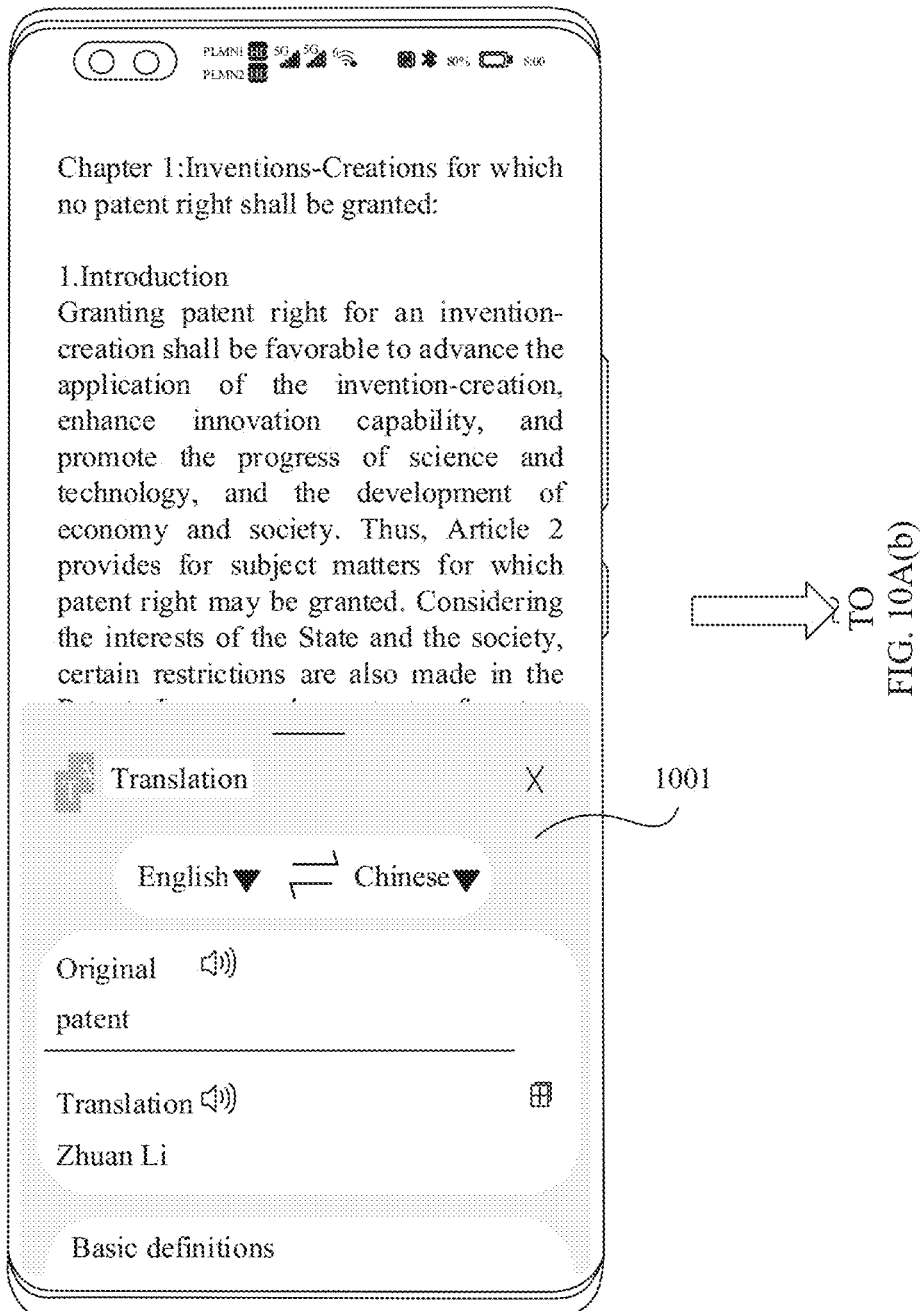
FIG. 10A(a) to FIG. 10A(e) are a schematic diagram of a status change of a floating window in a continuous copying scenario according to an embodiment of this application.
Figure 10A:
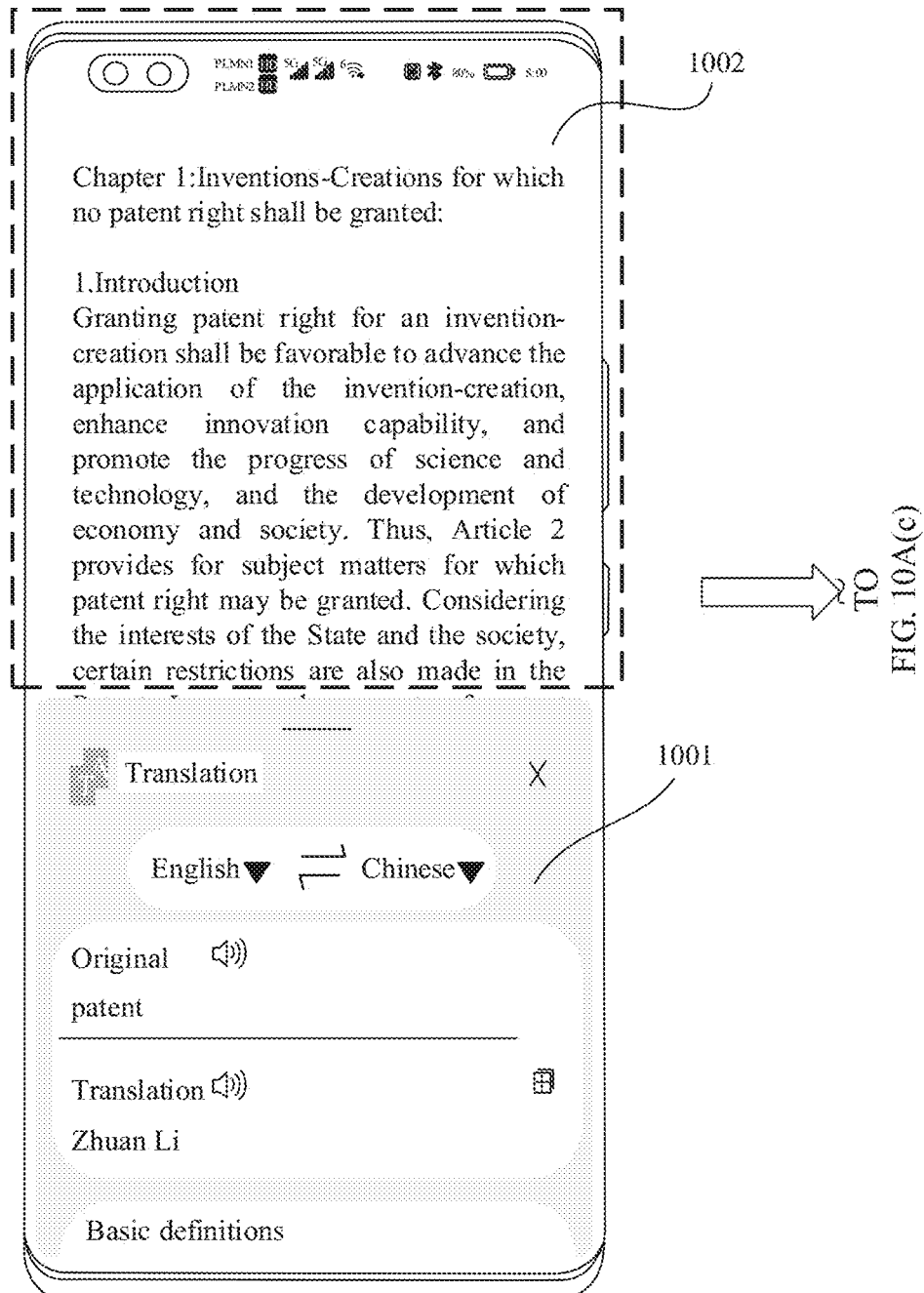
Figure 10A:
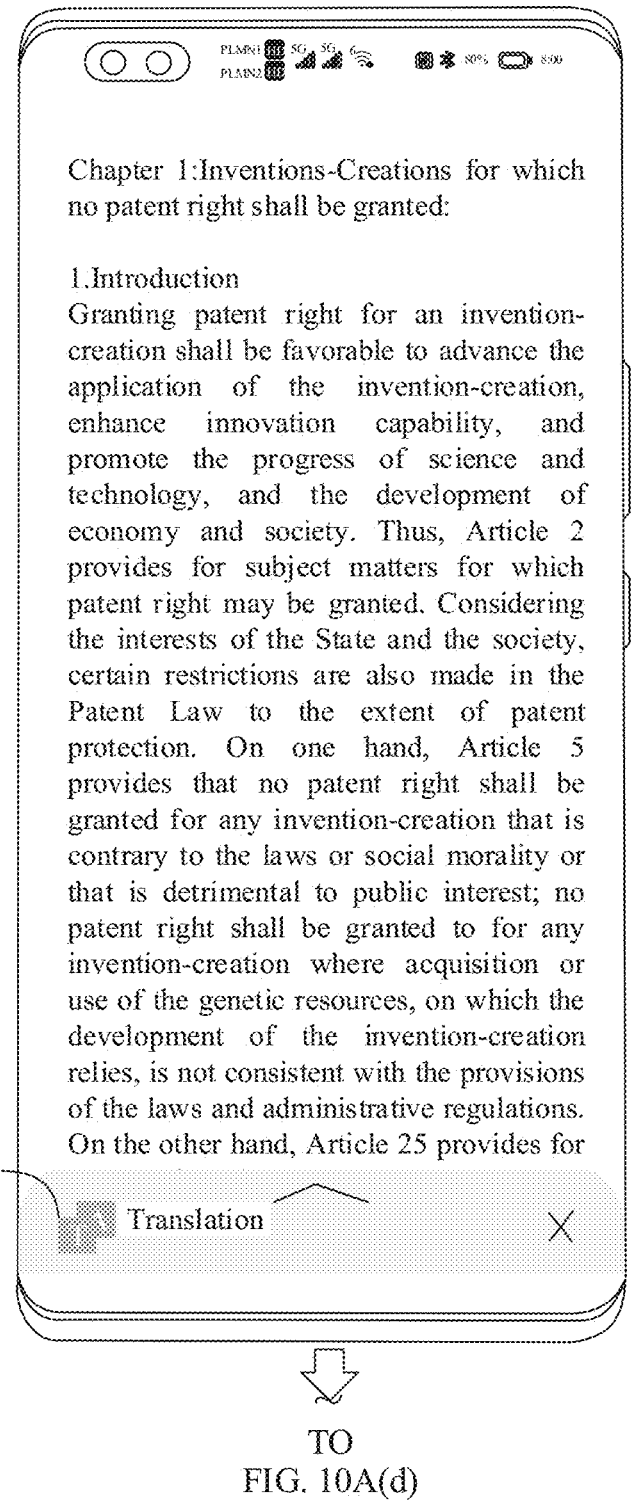
Figure 10A:
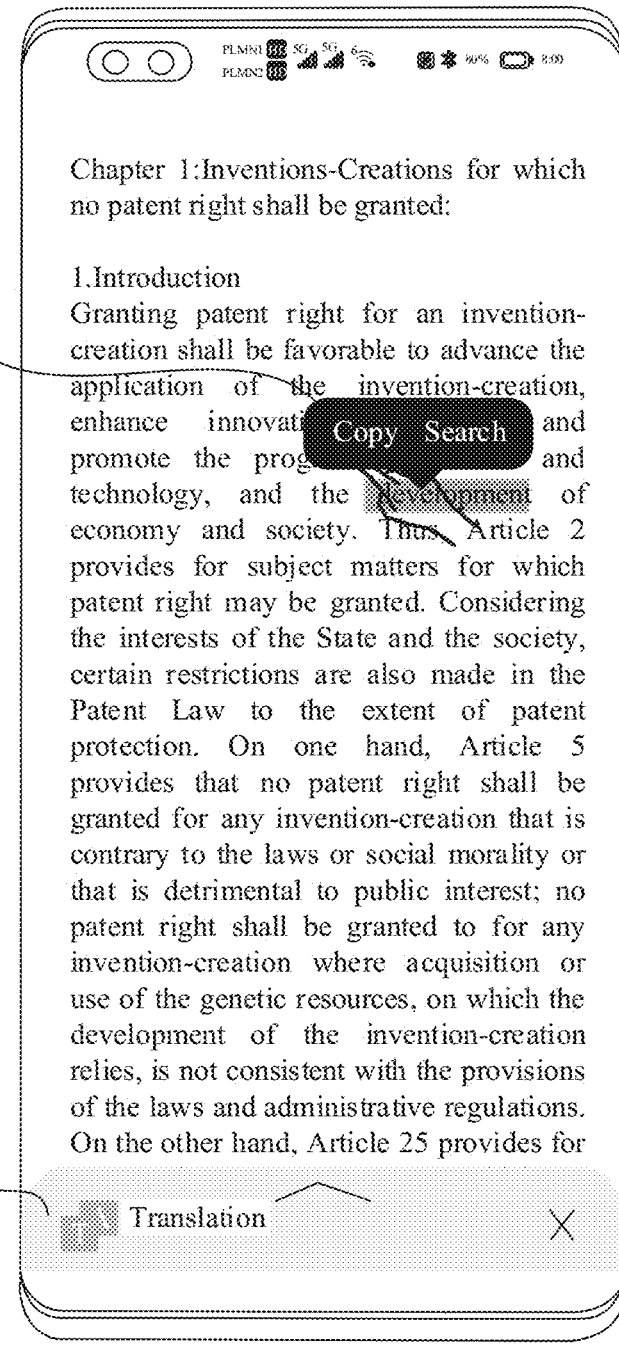
Figure 10A:
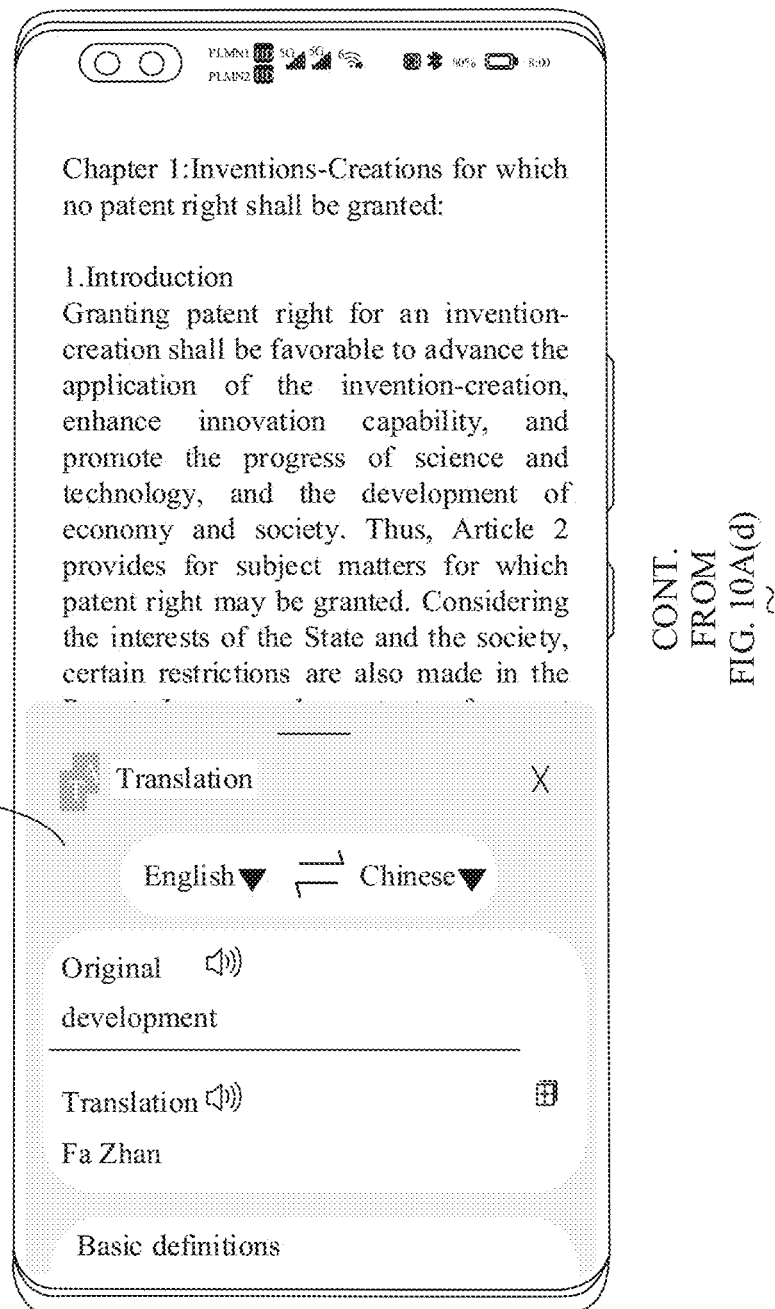
Figure 10B:
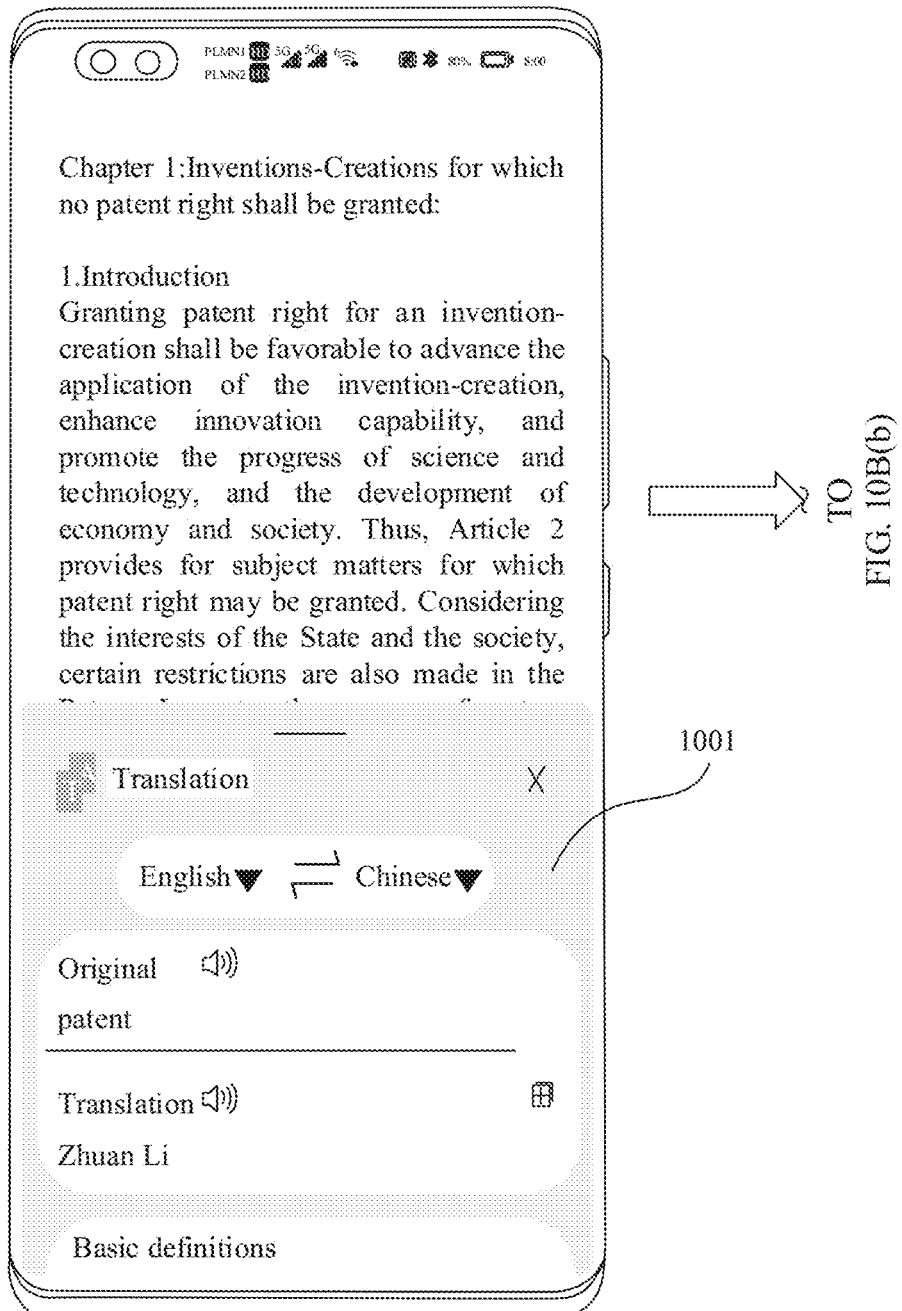
FIG. 10B(a) to FIG. 10B(c) are a schematic diagram of a status change of a floating window in a continuous copying scenario according to an embodiment of this application.
Figure 10B:
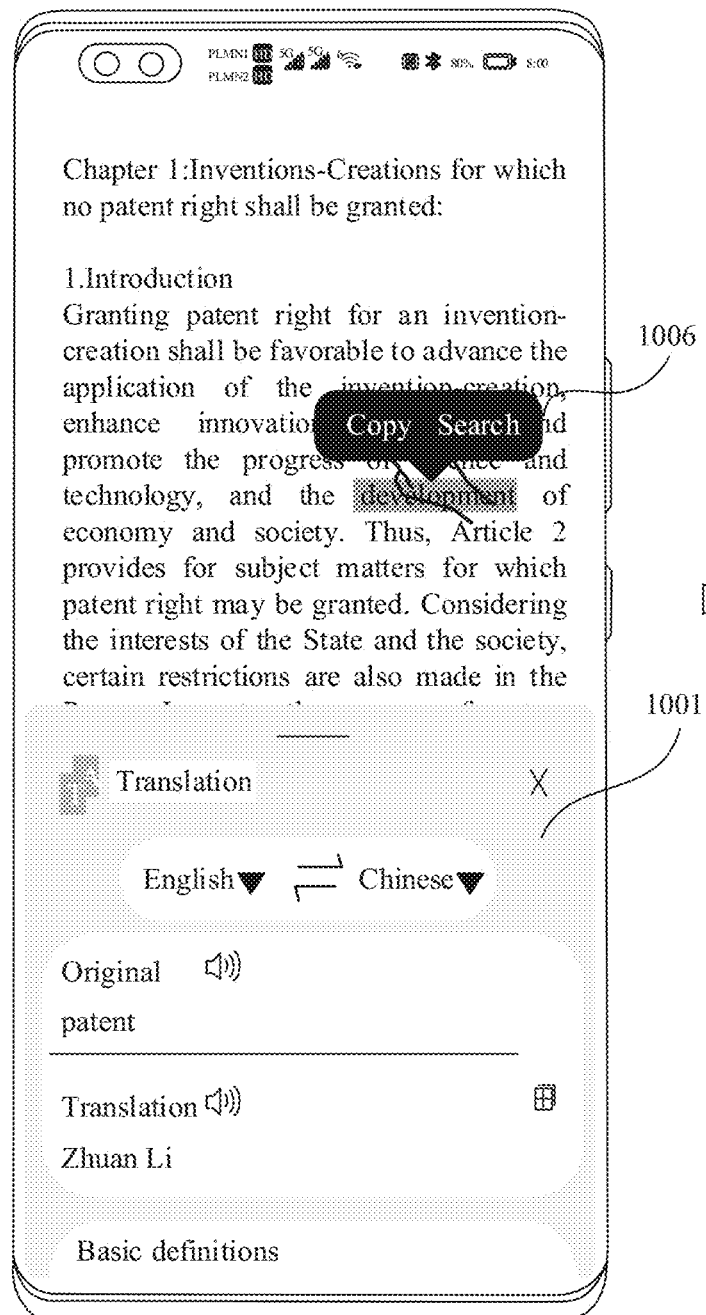
Figure 10B:
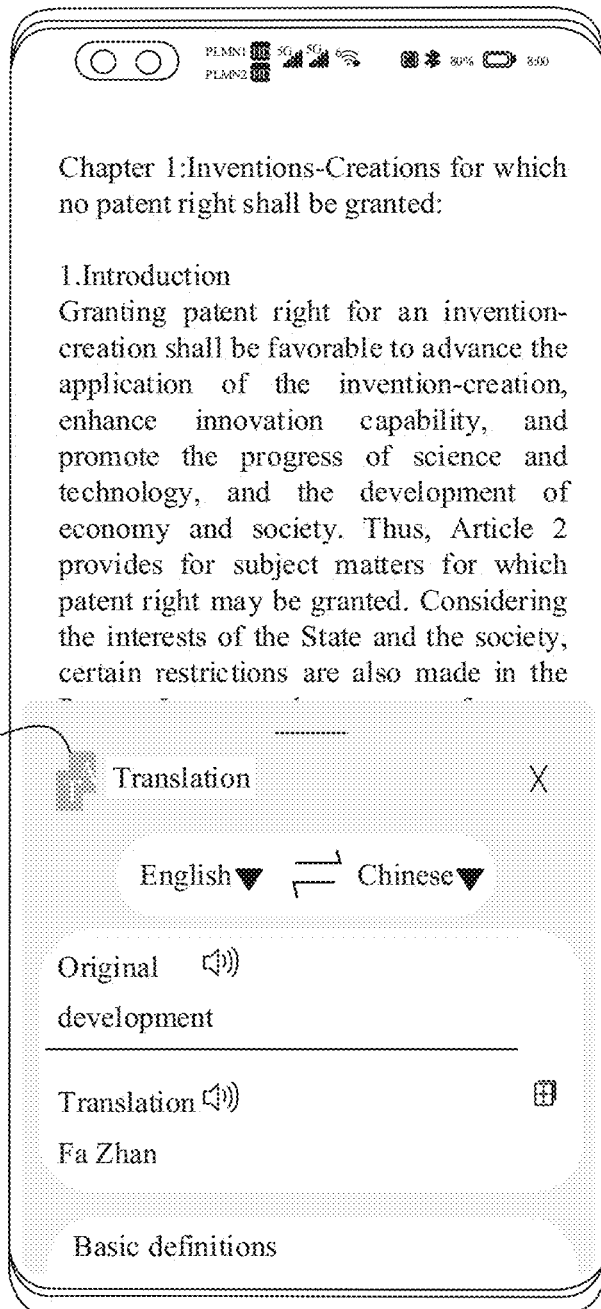

With reference to FIG. 10A(a) to FIG. 10A(e) and FIG. 10B(a) to FIG. 1013(c), the following describes a scenario in which a user continuously performs copy in the implementation of this application. For example, the following also describes an implementation of a modeless floating window that does not preempt a focus in the implementation of this application.

With reference to FIG. 10A(a) to FIG. 10A(e), a floating window 1001 in FIG. 10A(a) presents the half-screen state. In FIG. 10A(b), a region 1002 outside the floating window is a region on the mobile phone screen other than the floating window 1001. As described above, the floating window in the implementation of this application does not preempt the focus of the current application, and the user can still slide the original text of the current application. Therefore, when a touch or tap operation of the user is detected in the region 1002 outside the floating window, it is determined that an intention of the user in this case is to browse the original text of the current application rather than to translate, and the floating window displays the bottom state in FIG. 10A(c), so that the user can browse the original text of the current application. When the user needs to continue to translate a new word, as shown in FIG. 10A(d), after the user selects the word "development", an option bar 1004 pops up, where the option bar 1004 includes at least an operation option such as "copy". After the mobile phone monitors a change of content in the clipboard, recognition of a text copy intention of the user is triggered. It should be understood that, after the user performs a copy operation on a text, the copied text is stored in the clipboard, and then the content in the clipboard changes. Therefore, the content in the clipboard changes, that is, the user enters a copy operation. After the user taps the "copy" option, the mobile phone attempts to recognize the intention of the user after text copying. Therefore, a floating window 1005 in the half-screen state shown in FIG. 10A(e) pops up to display a translation result of "development". The translation result displayed in the floating window 1005 includes the to-be-queried English word "development" copied by the user, and a translation result of a Chinese meaning of the word, that is, "Fa Than". The floating window 1005 further displays other additional content. The content is similar to the content displayed in the floating window 304 in FIG. 3(d). Details are not described herein again. For example, an initial state displayed in the floating window 1005 is a half-screen state, and a size is about half of a mobile phone screen. For example, because the floating window 1005 is displayed, the floating ball may be displayed at the same time, or the floating ball may not be displayed, to achieve better user experience.

It should be noted that, in FIG. 10A(b), when a touch or tap operation of the user is detected in the region 1002 outside the floating window, it is determined that an intention of the user in this case is to browse the original text of the current application rather than to translate, and the floating window displays the bottom state in FIG. 10A(c), so that the user can browse the original text of the current application, Specifically, an ACTION_OUTSIDE event is triggered by monitoring a touch or tap operation performed by the user in the region 1002 outside the floating window, so that the half-screen state is switched to the bottom state. This process does not conflict with a process in which the user operates the original text of the current application.

It should be noted that the floating window 1001 that does not preempt the focus in FIG. 10A(b) is also referred to as a modeless dialog box. The modeless dialog box has the advantage of not preempting the focus of the window. When using the floating window in the implementation of this application, the user may return the floating window to the bottom state by touching or tapping a region outside the floating window, to continue to browse content of the current application, thereby improving user experience. To be specific, if the focus of the floating window 1001 in FIG. 10A(b) is not processed as in the implementation of this application, that is, if the floating window is a modal dialog box, the floating window 1001 preempts the focus of the current read application. Only after closing the floating window, the user can continue to browse the original text of the read application. In this case, each time the user completes translation, the user needs to close the translation result (step 1), then select a new text (step 2) and copy the text (step 3), and then tap a shortcut entry of the translation function again (step 4) to complete next translation. In other words, at least four operations are required to complete the next translation. This leads to a complex continuous translation process.

The mode dialog box means that when the mode dialog box is displayed, the program is suspended, and another task in the program can be executed only after the mode dialog box is closed. For example, the dialog box is closed by tapping a button such as OK. Cancel, or Close.

When the modeless dialog box is displayed, another task in the program is allowed to be executed without closing the dialog box.

As described above, in an implementation of this application, the window attribute of the floating window is set to FLAG_NOT_TOUCH_MODAL. Therefore, in this mode, the system transfers a touch/tap event outside the current window region to an underlying window and a tap event in the current window region is processed in the current window. Continuing to use FIG. 10A(b) as an example, when the mobile phone detects a touch or tap event in the region 1002 outside the floating window, the mobile phone transfers the window to the current read application, so that the user can continue to browse the page of the current read application. When the mobile phone detects a touch or tap event in the floating window region 1001, the floating window 1001 continues to be used to process the touch or tap event of the user.

With reference to FIG. 1013(*a*) to FIG. 10B(c), for example, in a continuous translation scenario, when the floating window 1001 is in the half-screen state in FIG. 10B(a), the user can still continue to trigger a copy and translation operation. Different from that in the continuous copy scenario in FIG. 10A(a) to FIG. 10A(e), when the user copies a new text in FIG. 10A(d), the floating window 1003 presents the bottom state. In the continuous copy scenario in FIG. 1013(*a*) to FIG. 10B(c), the floating window 1001 is always in the half-screen state.

Figure 13A:
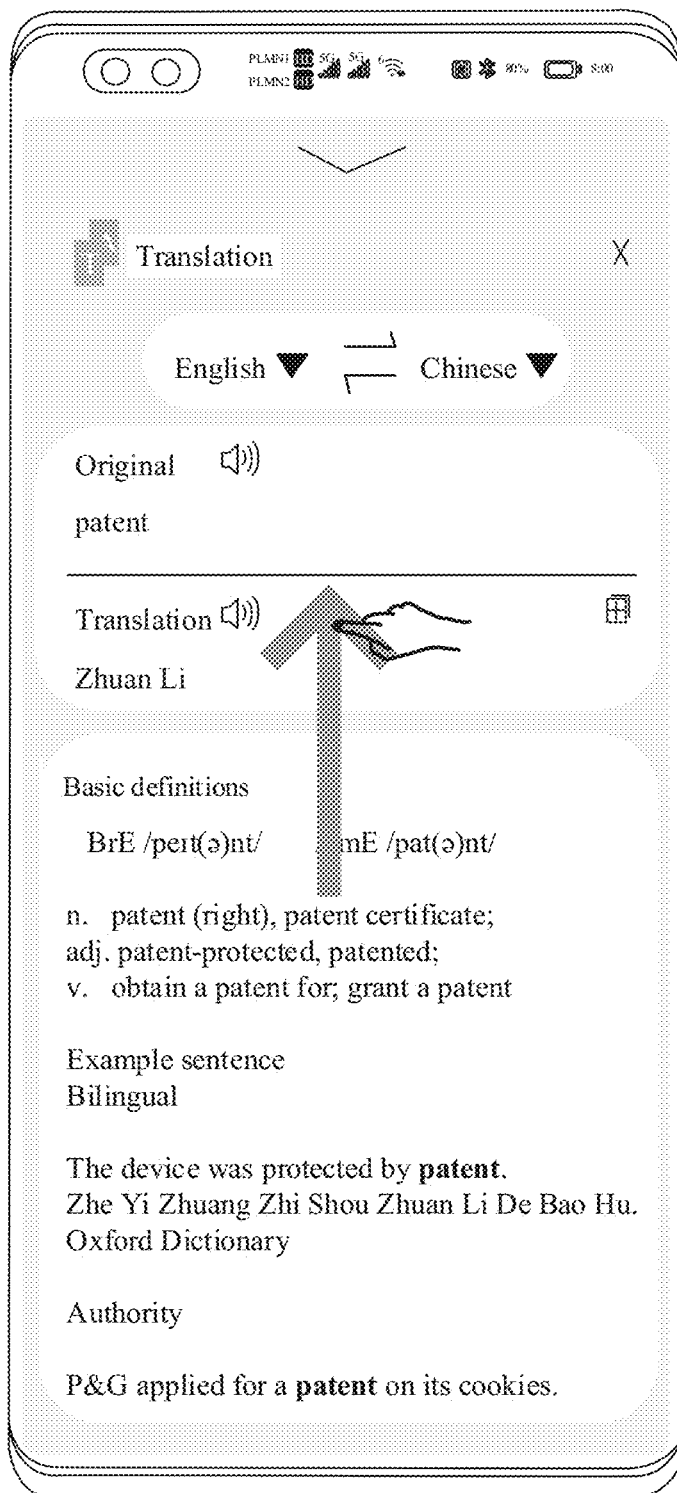
FIG. 13(a) to FIG. 13(c) are a schematic diagram of sliding inside a floating window according to an embodiment of this application.
Figure 13B:
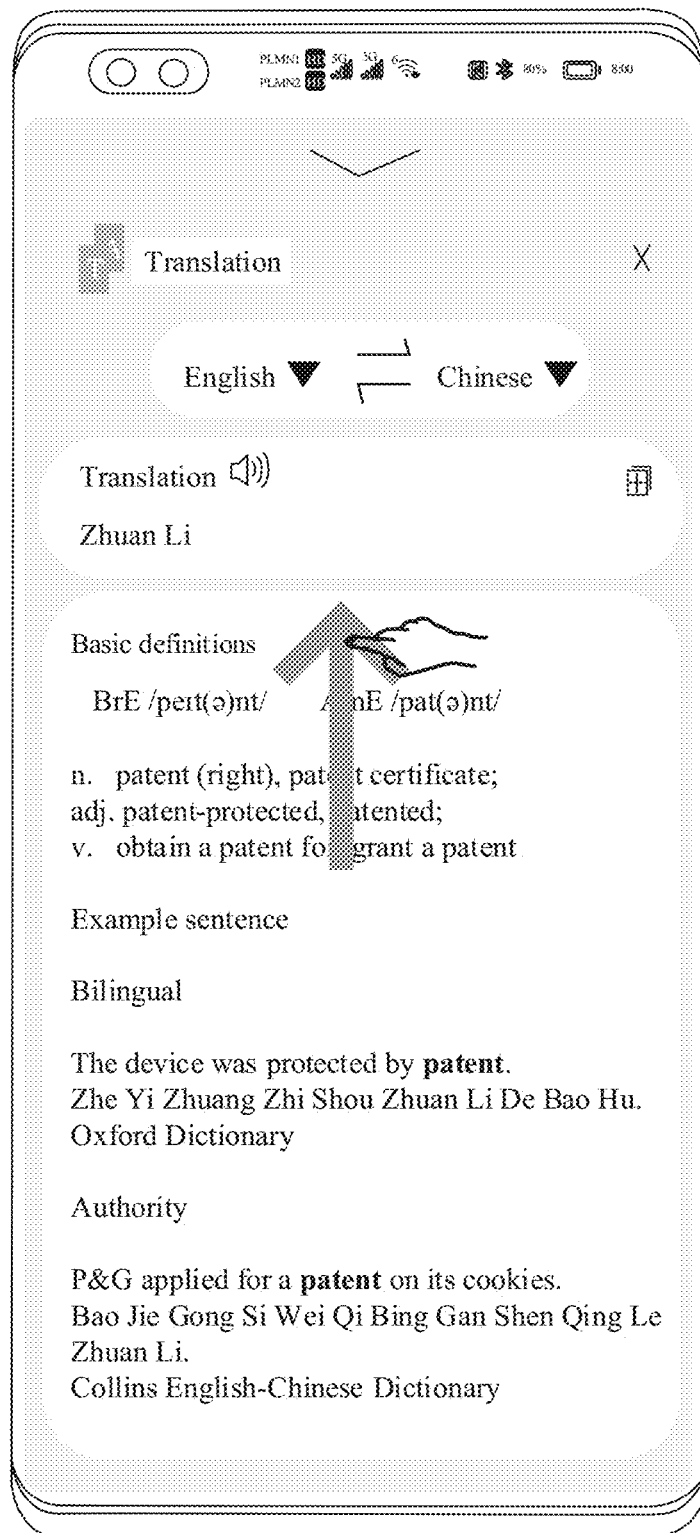
Figure 13C:
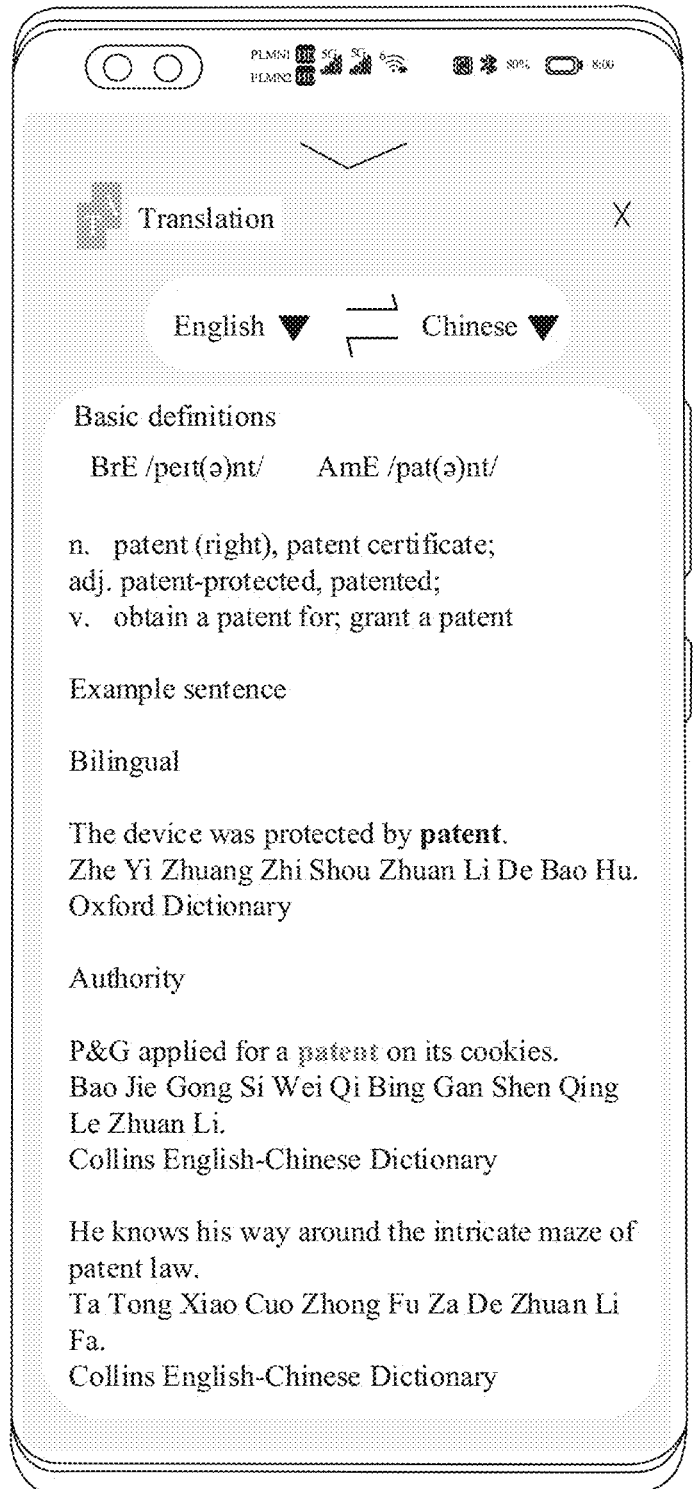

When the user needs to continue to translate a new word, as shown in FIG. 013(*b*), after the user selects the word "development", an option bar 1006 pops up, where the option bar 1006 includes at least an operation option such as "copy", and the floating window 1001 keeps in the half-screen state. After the mobile phone monitors a change of content in the clipboard, recognition of a text copy intention of the user is triggered. It should be understood that, after the user performs a copy operation on a text, the copied text is stored in the clipboard, and then the content in the clipboard changes. Therefore, the content in the clipboard changes, that is, the user enters a copy operation. After the user taps the "copy" option, the mobile phone attempts to recognize the intention of the user after text copying. Therefore, a floating window 1007 in the half-screen state shown in FIG. 1013(*c*) is displayed to display a translation result of "development". The translation result content displayed in the floating window 1007 is consistent with that in the floating window 1005 in the half-screen state shown in FIG. 10A(e). Details are not described herein again.

It should be noted that the foregoing describes only two consecutive translation processes. If there is a requirement for more than two consecutive translations, the mobile phone may repeatedly perform the processes in FIG. 10A(a) to FIG. 10,040 and FIG. 10B(a) to FIG. 1013(*c*), to complete more than two consecutive translations.

In this way, after a translation is completed, the mobile phone may directly trigger another translation in response to a user's continuous copy operation on a same or different text. If the floating window is in the bottom state in FIG. 10A(d), the floating window is displayed in the half-screen state in FIG. 10A(e), to display a translation result of the new text. If the floating window is in the half-screen state in FIG. 1013(*a*), a translation result of the new text is directly displayed in the half-screen state. That is, compared with a conventional technology, in the solution of this application, in a process of a plurality of consecutive translations, if the floating window is not closed, after copying the new text, the user may directly trigger the mobile phone to translate the new text and display the translation result. The user does not need to manually trigger translation again after copying the new text. Therefore, convenience of continuous translation can be improved.

With reference to FIG. 11(*a*) and FIG. 1(*b*), a floating window 1101 in FIG. 11(*a*) presents the half-screen state. A region 1102 outside the floating window is a region on the mobile phone screen other than the floating window 1101, As described above, the floating window in the implementation of this application does not preempt the focus of the current application, and the user can still slide the original text of the current application. Therefore, when a touch or tap operation of the user is detected in the region 1102 outside the floating window, it is determined that an intention of the user in this case is to browse the original text of the current application rather than to translate, and the floating window displays the bottom state in FIG. 11(*h*), so that the user can browse the original text of the current application. An implementation is shown in FIG. 10A(b), and details are not described herein again.

Figure 12A:
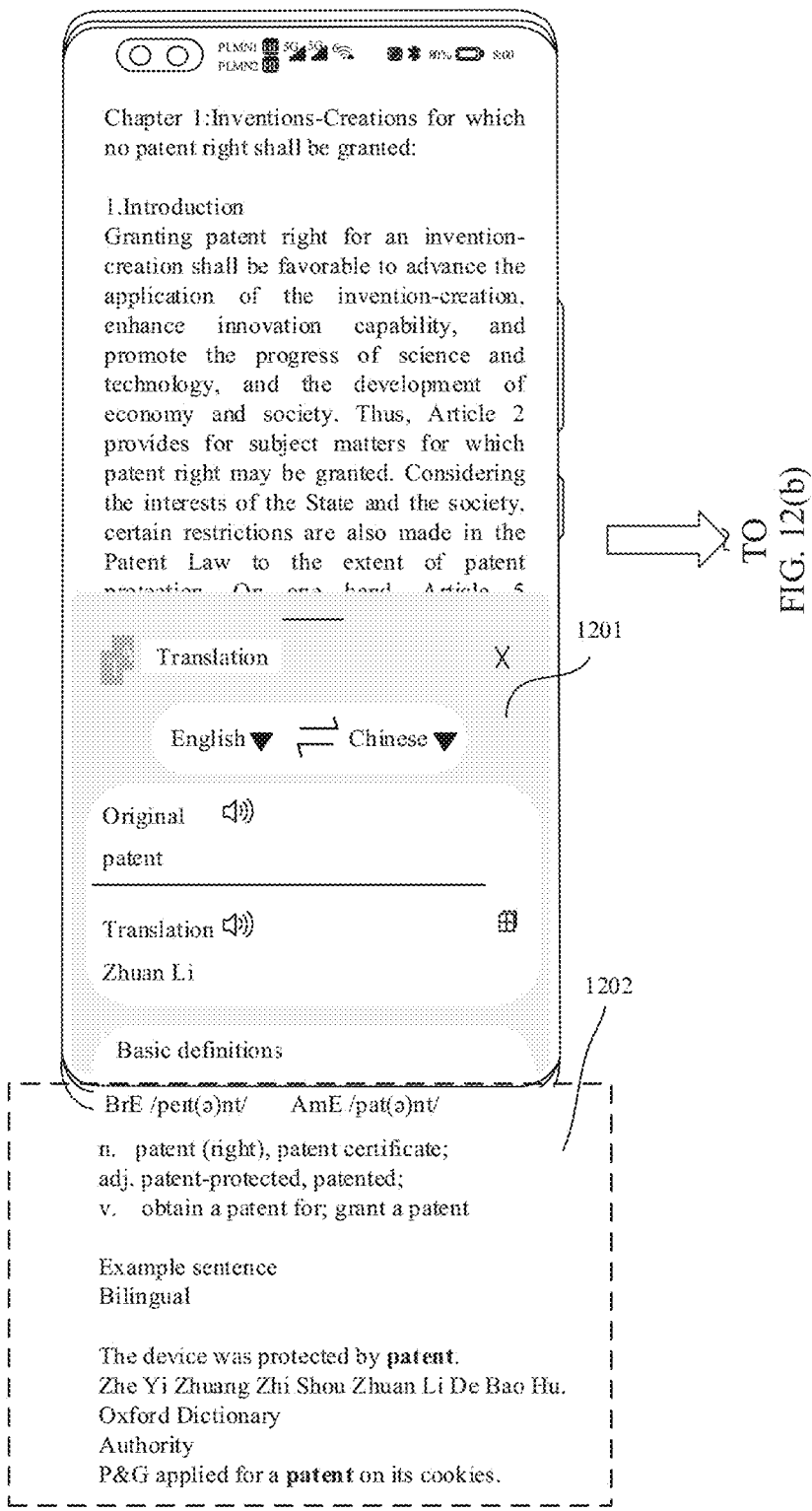
FIG. 12(a) to FIG. 12(c) are a schematic diagram of a content pre-loading change of a floating window according to an embodiment of this application.
Figure 12B:
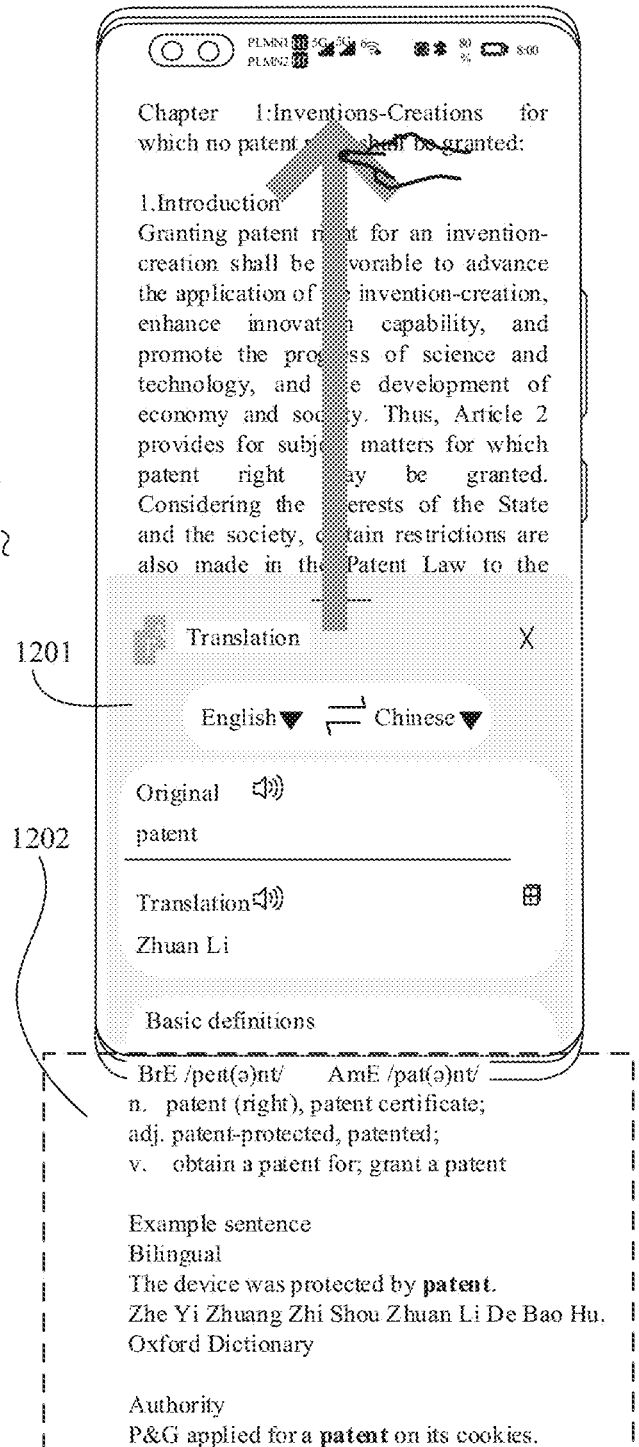
Figure 12C:
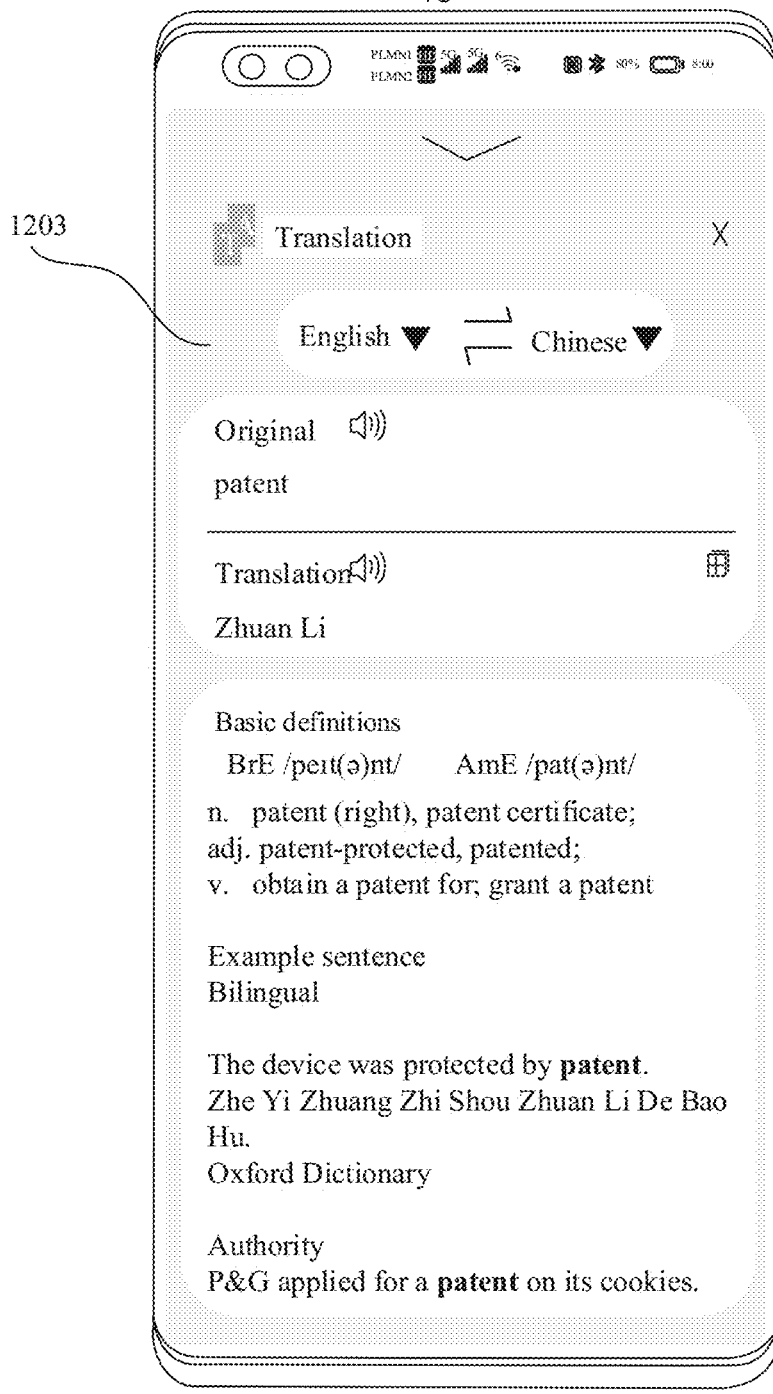

Referring to FIG. 12(*a*) to FIG. 12(*c*), to achieve a fine sliding effect a window attribute FLAG_LAYOUT_NO_LIMIT is set to implement an effect of pre-loading translation result content. NO_LIMIT represents that content can be drawn outside the screen and the content is directly displayed when the floating window is dragged. When a floating window 1201 displays the half-screen state in FIG. 12(*a*), an additional floating window bottom region 1202 is drawn at the bottom of the floating window outside the screen. The region is used to pre-load remaining translation content in the floating window 1201, and the floating window bottom region 1202 is invisible to the user in the half-screen state of the floating window. As shown in FIG. 12(*b*), when the user drags the floating window 1201 from the half-screen state to the fill-screen state shown in FIG. 12(*c*), because the floating window bottom region 1202 is additionally drawn at the bottom of the floating window outside the screen in advance, the remaining translation content outside the floating window 1201 does not need to be additionally drawn, so that an effect such as sawteeth or jump does not occur in a process in which the user drags the floating window, a display effect is finer, and user experience is improved.

Referring to FIG. 13(*a*) to FIG. 13(*c*), when the floating window in the full-screen state shown in FIG. 13(*a*) is displayed, the user may drag translation result content in the floating window to obtain more complete translation result content. Translation result content shown in FIG. 13(*a*), FIG. 13(*b*), and FIG. 13(*c*) is in a progressive relationship, that is, more translation result content is displayed in the floating window based on a slide operation of a user.

As described above, because the floating ball and the floating window in the implementation of this application are system windows, and do not have an activity function, a page in the floating window does not have a sliding function.

In the Android architecture, a touch/tap event and an oninterceptTouch event of the window are intercepted by the viewglobal event. A view displayed by Viewglobal to the user is a single or entire view which is controlled by oninterceptTouch. After the mobile phone receives a touch/tap event, the outouch event determines that the touch/tap is in or outside the floating window. In an implementation of this application, to implement the foregoing sliding effect of the floating window, ontouch and oninterceptTouch events of a content container of the window manager need to be rewritten, to control sliding and specific event distribution.

To achieve an effect similar to that of the activity in the application window, that is, to enable the user to achieve a sliding effect in the floating window, an additional set of sliding logic implementation needs to be designed. When it is determined that the touch/tap is in the floating window, sliding logic implementation in the floating window is added, that is, a sub-view, so that more translation result content is displayed in the floating window through sliding. There are specifically the following steps:

a, monitoring a touch event of a user on a mobile phone screen;

b. monitoring a slide event of a user's finger on the screen; and if a slide event is detected and it is determined that a sub-view does not need to be slid, determining that the floating window slides; or if a slide event is detected and it is determined that a sub-view needs to be slid, processing the slide event by using the sub-view;

c. updating a floating window location based on an offset of the user's finger on the screen; and d. when the user's finger leaves the screen, processing a floating window sliding result.

Optionally, in this case, sliding in the floating window is the same as or different from sliding logic implementation in the bottom state, the half-screen state, and the full-screen state of the foregoing floating window.

Figure 14A:
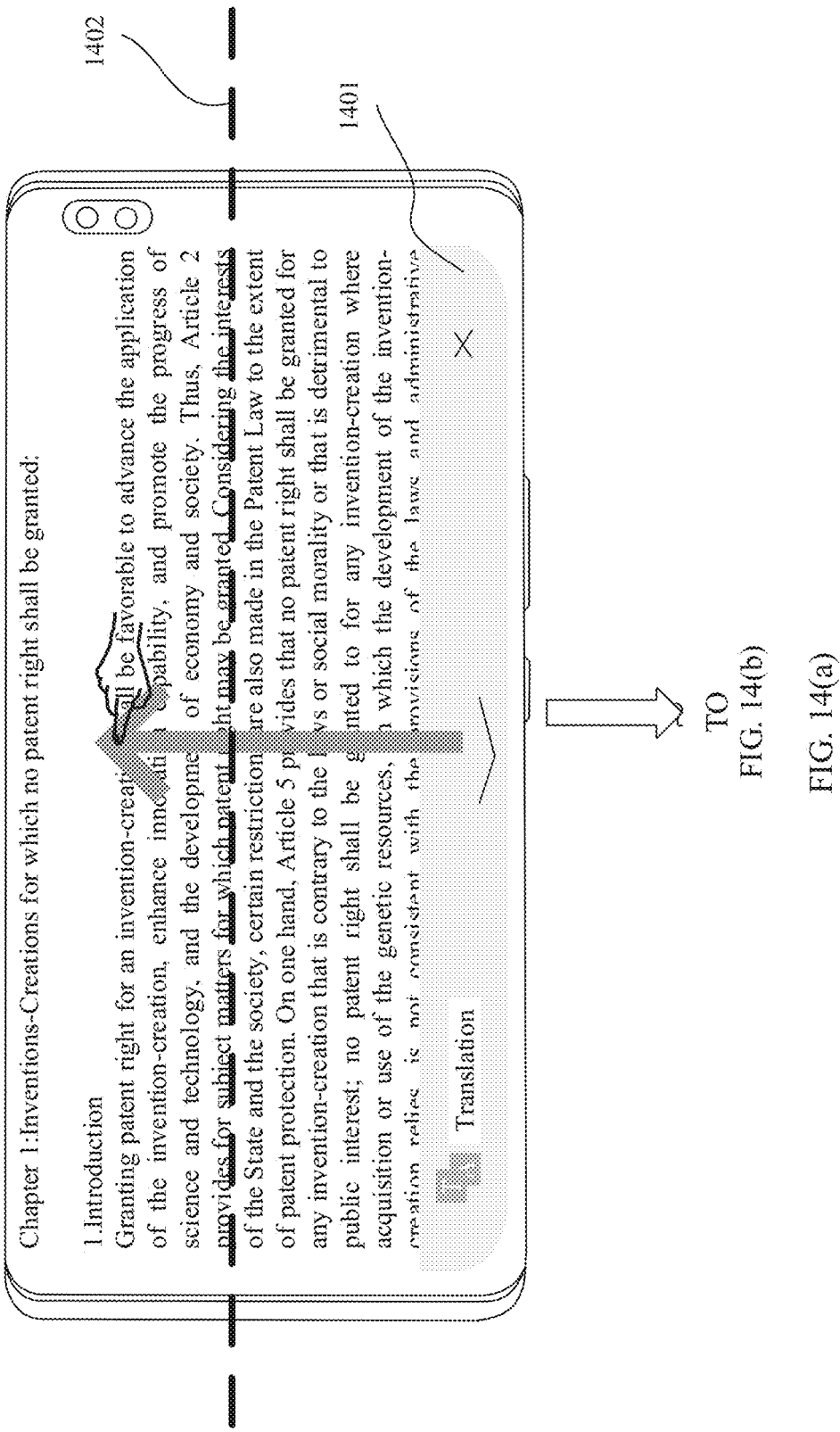
FIG. 14(a) and FIG. 14(h) are a schematic diagram of a status change of a floating window in a flip state according to an embodiment of this application.
Figure 14B:
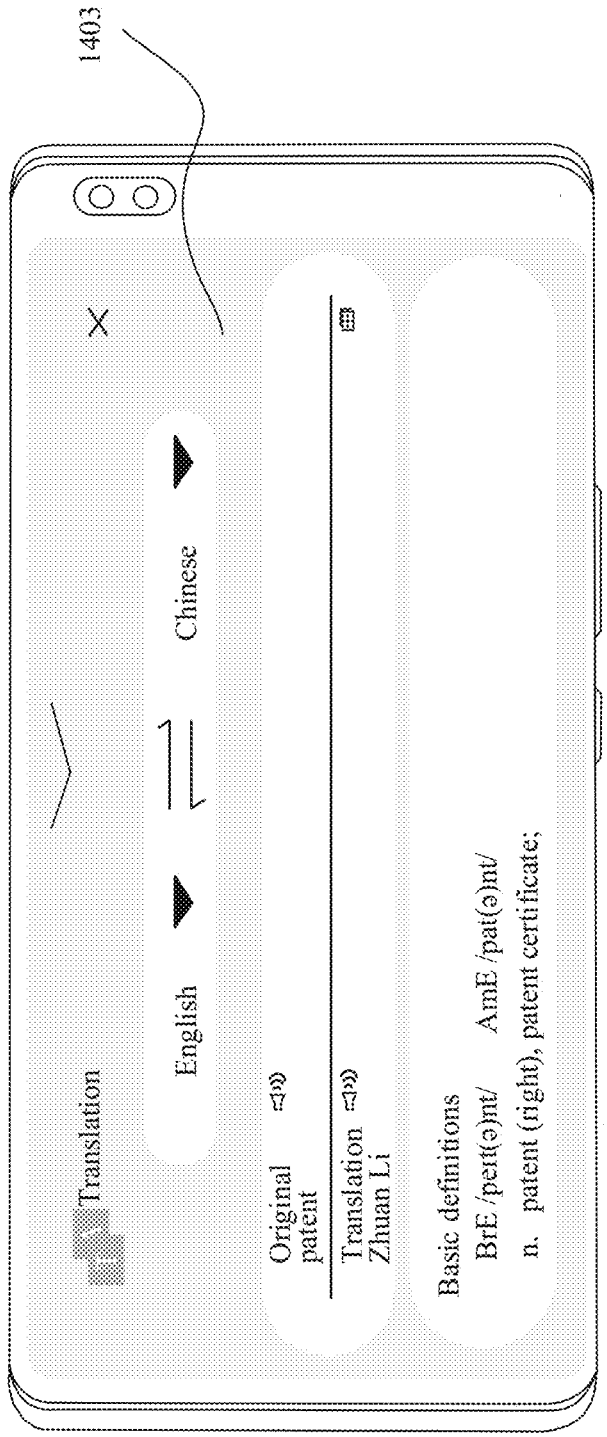

FIG. 14(a) and FIG. 14(h) show a floating window display form on a mobile phone screen in a flip state, that is, a landscape mode. Different from that in FIG. 1 to FIG. 13(a) to FIG. 13(c) in which the mobile phone is in a portrait mode, and the floating window has three presentation manners: a bottom state, a half-screen state, and a full-screen state, for example, in the landscape mode, the floating window has two presentation manners: a bottom state 1401 and a full-screen state 1403. A division line 1402 is a division line between the bottom-state height and the full-screen height of the floating window. When the user's finger drags the floating window 1401 in the bottom state in FIG. 14(a) upward beyond the division line 1402, a floating window 1403 in the full-screen state in FIG. 14(b) is presented. A trigger manner is described in FIG. 1 to FIG. 4B(a) to FIG. 4B(d), and sliding logic and implementation are described in FIG. 5A(a) to FIG. 5A(c) to FIG. 9(a) and FIG. 9(b). Details are not described herein again.

Figure 15A:
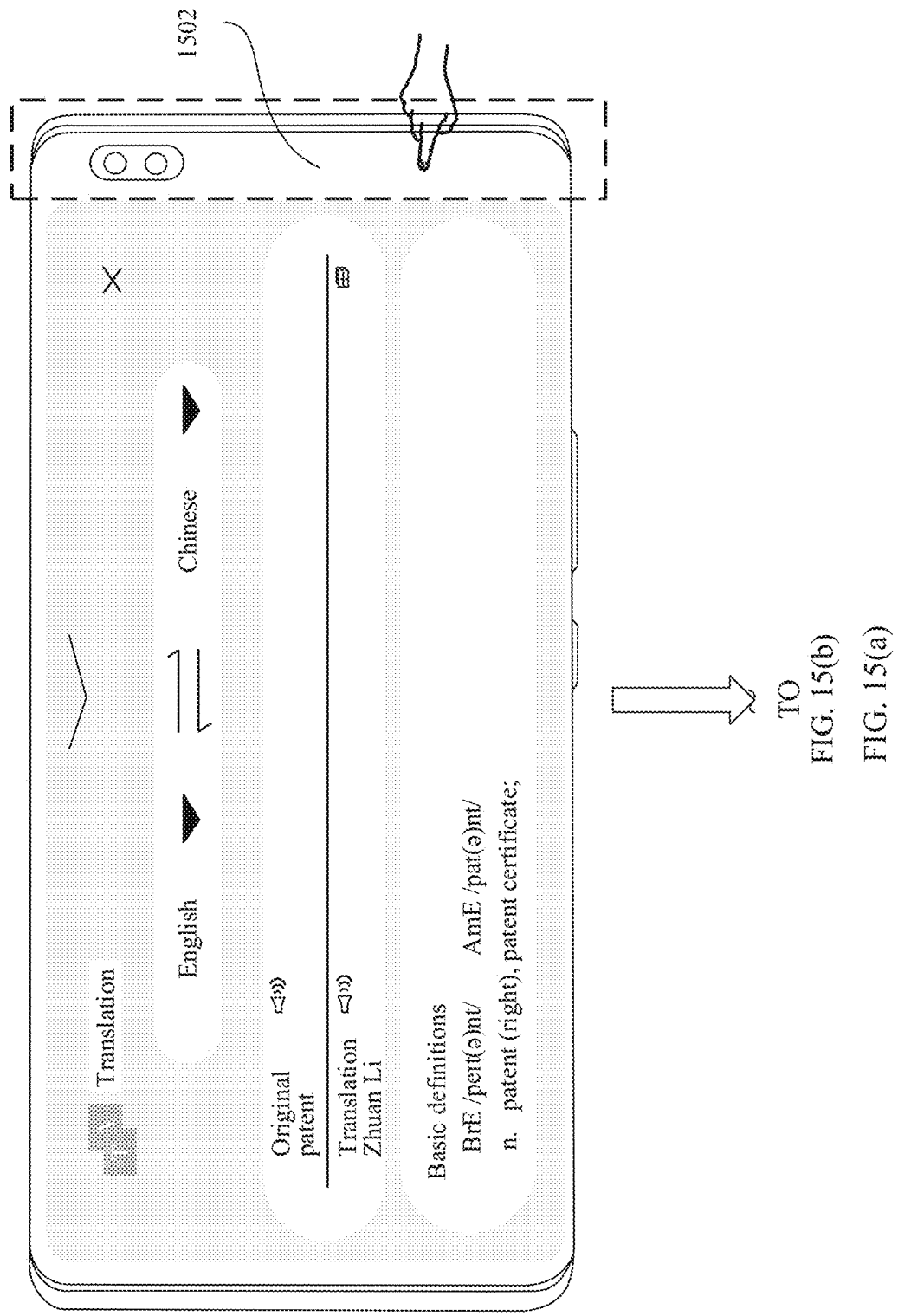
FIG. 15(a) and FIG. 15(b) are is a schematic diagram of a status change of a modeless floating window in a flip state according to an embodiment of this application.
Figure 15B:

FIG. 15(a) and FIG. 15(b) show a modeless floating window that does no preempt a focus in an implementation of this application when a mobile phone screen is in a flip state, that is, in a landscape mode. An implementation is described in FIG. 10A(a) to FIG. 10A(e) to FIG. 11(a) and FIG. 11(b), and details are not described herein again.

Figure 11A:
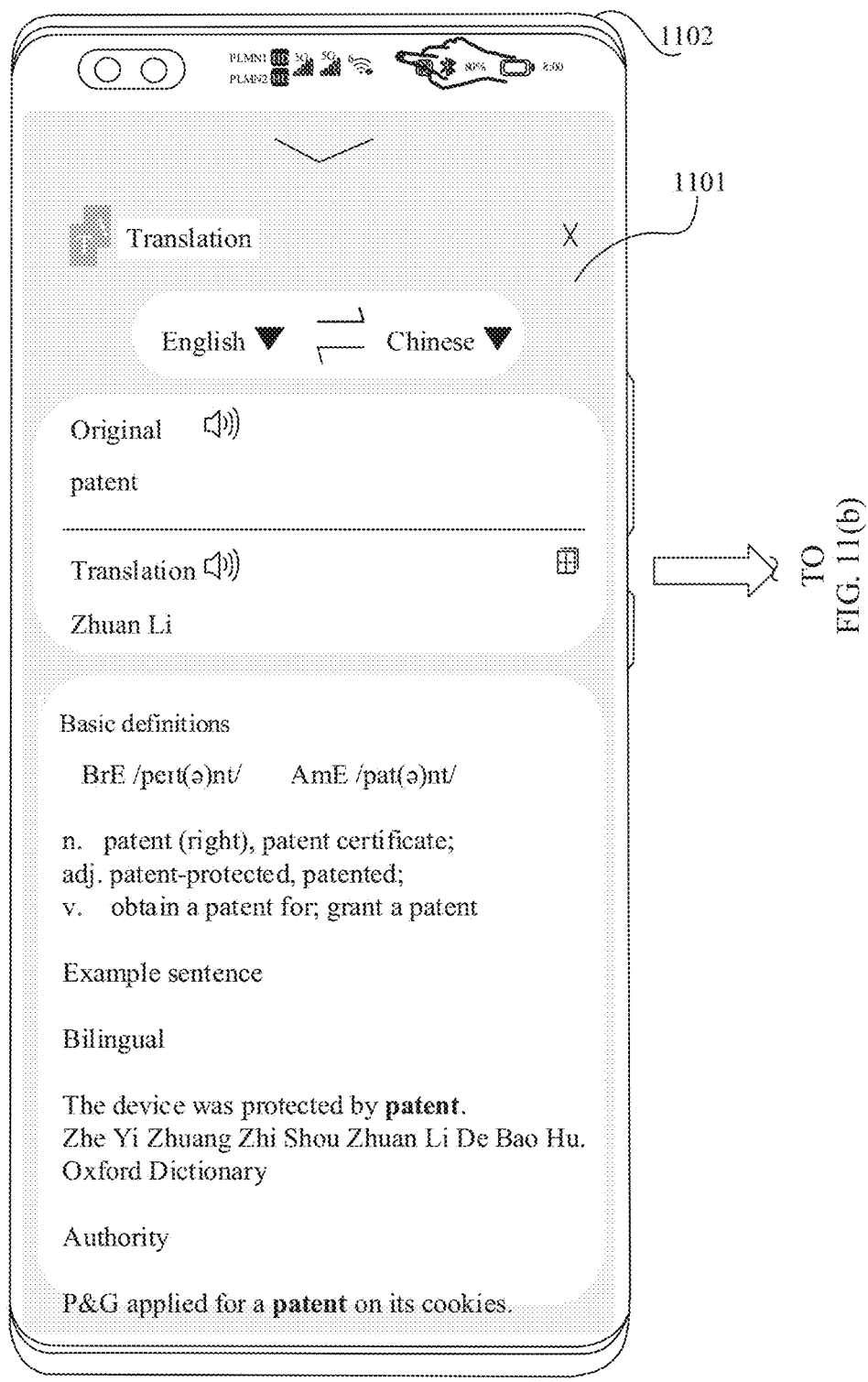
FIG. 11(a) and FIG. 11(b) are a schematic diagram of a status change of a modeless floating window according to an embodiment of this application.
Figure 11B:
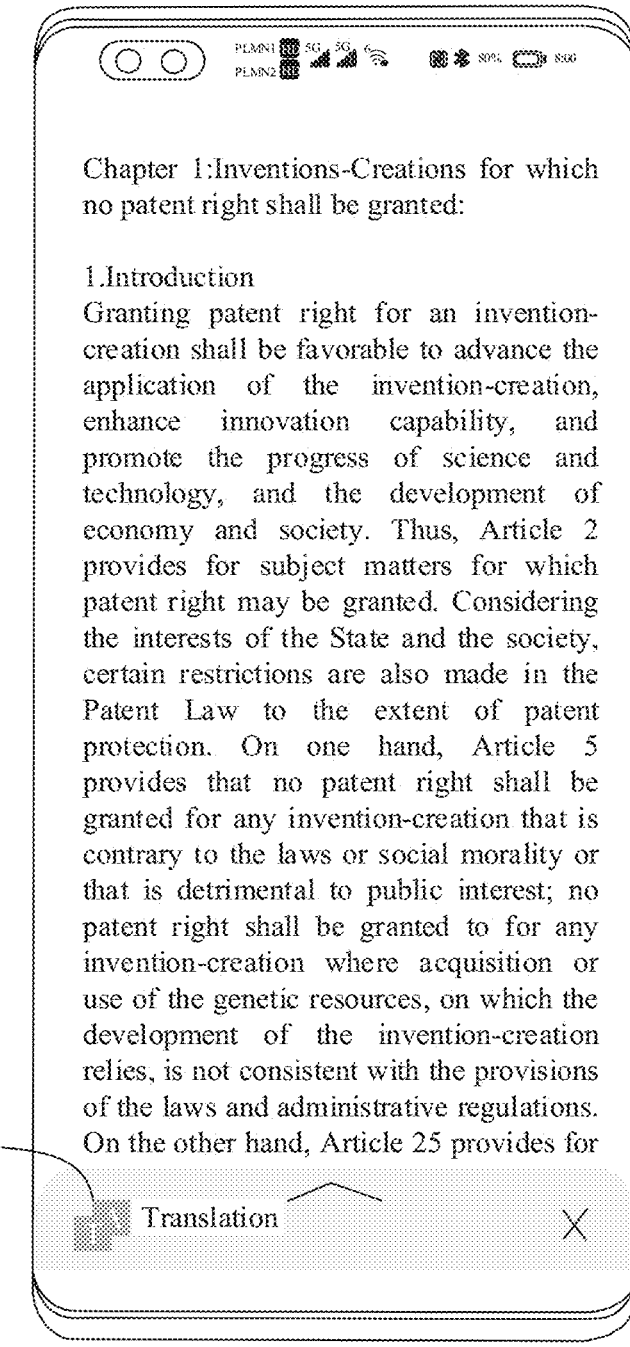

The floating window in the landscape mode also has a modeless dialog box of the floating window in the portrait mode in FIG. 10A(a) to FIG. 10A(e) to FIG. 11(a) and FIG. 11(b). The floating window in the landscape mode can also implement continuous copy shown in FIG. 10A(a) to FIG. 10A(e) to FIG. 11(a) and FIG. 11(b). The floating window in the landscape mode also has an effect of sliding in the floating window and pre-loading translation result content in FIG. 12(a) to FIG. 12(c). Specific descriptions of the foregoing implementation are the same as those in the portrait mode. Details are not described herein again.

A region 1502 outside the floating window is a region on the mobile phone screen other than the floating window. For example, in the landscape mode, the region is a status bar region at the top in the portrait mode. As described above, the floating window in the implementation of this application does not preempt the focus of the current application, and the user can still slide the original text of the current application. Therefore, when a touch or tap operation of the user is detected in the region 1502 outside the floating window, it is determined that an intention of the user in this case is to browse the original text of the current application rather than to translate, and the floating window displays the bottom state in FIG. 15(b) from the full-screen state in FIG. 15(a), so that the user can browse the original text of the current application.

Optionally, in the landscape mode, a maximum horizontal width of the floating window in the bottom state and the full-screen state should not overlap the status bar region at the top in the portrait mode. That is, a horizontal width of the floating window in the landscape mode may be designed to a width that does not occupy the entire screen in the landscape mode, to reserve an operation in the status bar region for the user, so as to improve user experience.

Figure 16:
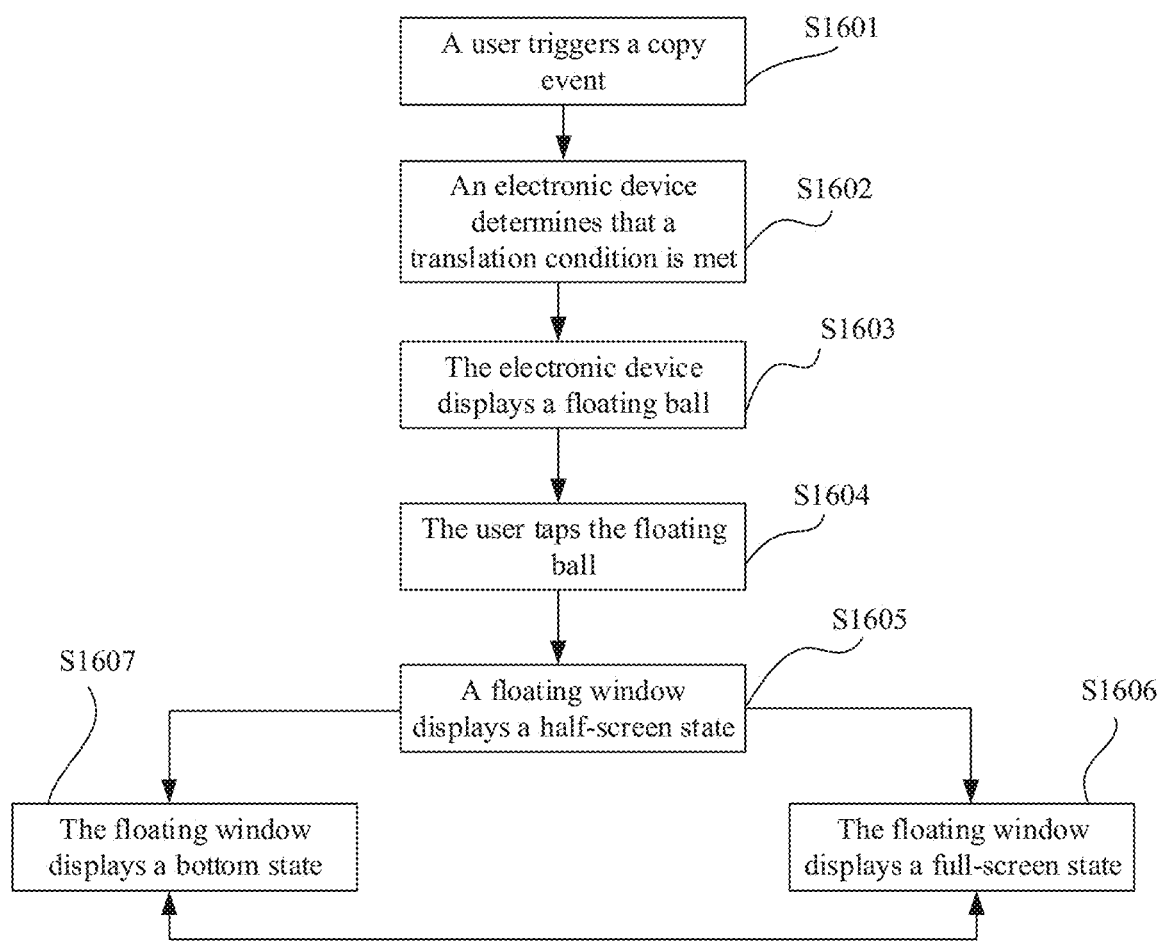
FIG. 16 is a flowchart of logic implementation according to an embodiment of this application.

FIG. 16 is an implementation flowchart according to an implementation of this application. The procedure specifically includes the following steps.

S1601: A user triggers a copy event.

S1602: An electronic device determines that a translation condition is met.

S1603: The electronic device displays a floating ball.

S1604: The user taps the floating ball.

S1605: A floating window displays a half-screen state.

S1606-S1607: According to different operations of the user, the floating window is switched between a bottom state S1607, the half-screen state S1605, and a full-screen state SI 607.

The foregoing implementation procedure has been described in the foregoing. For details, refer to descriptions in FIG. 1 to FIG. 15(a) and FIG. 15(b). Details are not described herein again.

Figure 17A:
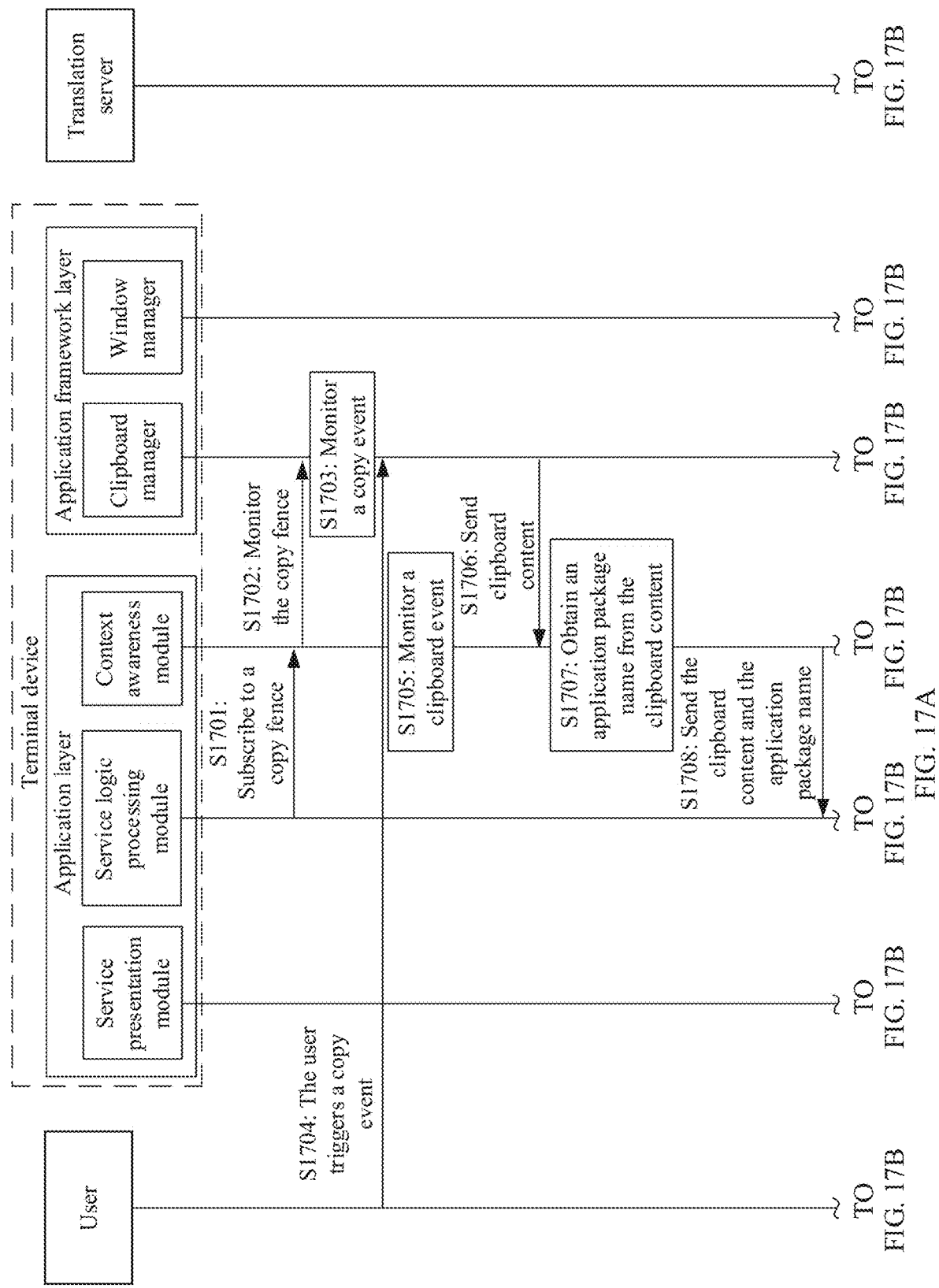
Figure 17B:
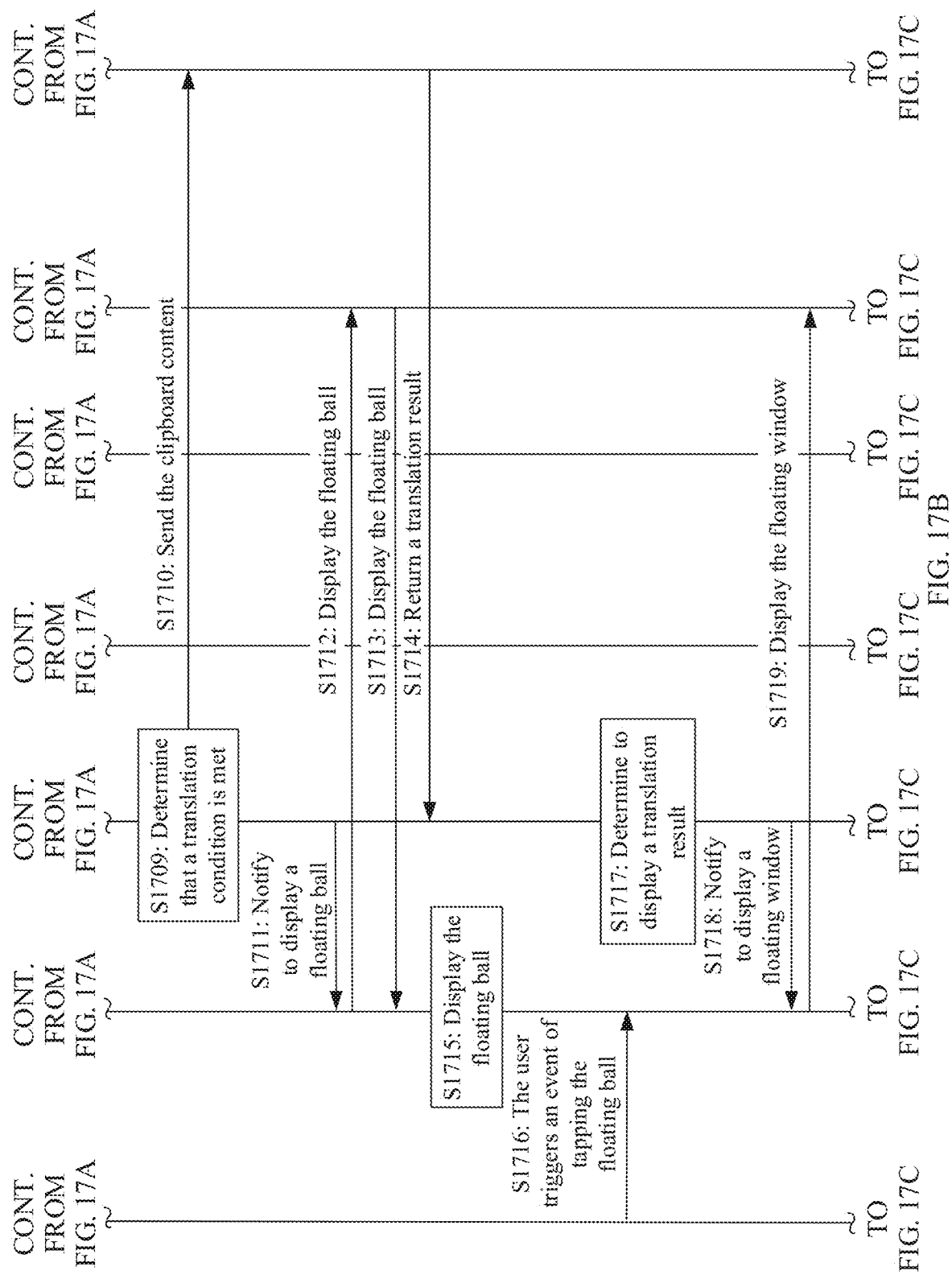

FIG. 17A to FIG. 17C are a logic implementation flowchart according to an implementation of this application. The procedure specifically includes the following steps.

S1701: A service logic processing module sends a copy fence subscription instruction to a context awareness module.

S1702: The context awareness module sends a copy fence monitoring instruction to a clipboard manager.

S1703: The clipboard manager monitors a copy event.

For example, after a mobile phone monitors a change of content in a clipboard, recognition of a text copy intention of a user is triggered. It should be understood that, after the user performs a copy operation on a text, the copied text is stored in the clipboard, and then the content in the clipboard changes.

S1704: The user triggers a copy event, and the clipboard manager perceives a content change in the clipboard.

For example, in a scenario in which translation needs to be performed, after the user copies a text on an open page of a current application, and a content change in the clipboard is monitored, recognition of a text copy intention of the user is triggered.

For example, in an implementation of this application, a copy operation is mainly used as an example to trigger the mobile phone to recognize an intention. However, actual implementation is not limited thereto. For example, an operation such as a selection operation, a touch and hold operation, a scribe operation, or a double-tap operation on the text may be used to trigger the mobile phone to recognize an intention.

S1705: The context awareness module monitors a clipboard event.

S1706: The clipboard manager sends clipboard content to the context awareness module.

For example, the clipboard manager stores the most recently copied text of the user and sends the text to the context awareness module, where the content includes the copied text and a specific application from which the copied text is obtained, that is, an application source of the copied text in the architecture provided by Android, the clipboard manager cannot recognize an application source of the copied text.

S1707: The context awareness module obtains the text copied by the user from the clipboard manager, and obtains an application package name from the clipboard content.

For example, the context awareness module recognizes the application source of the copied text from the clipboard content.

S1708: The context awareness module sends the clipboard content and the application package name to the service logic processing module.

S1709: The service logic processing module determines, based on the received clipboard content and application package name, whether a translation condition is met.

For example, that the service logic processing module determines whether a translation condition is met includes the following steps.

a. Determine whether the copied text includes a current non-system language of the mobile phone. Whether the text copied on the mobile phone triggers translation is related to the default language set by the system and the language of the copied text. For example, when the default language set by the system in the mobile phone is simplified Chinese, if any one of the following combinations is included, it may be considered that the translation condition is met.

First combination: The copied text includes both a text in the system language and a text in a non-system language. For example, when the copied text includes both Chinese and French, because the mobile phone recognizes that the copied text includes a French text that is not Chinese, after the user copies the text, a translation operation is still triggered.

Second combination: The copied text is a text in a non-system language set by the application. For example, when the application language set by the current application is English, and the user copies an English text in the application, because the mobile phone recognizes that the copied text includes a non-Chinese text, after the user copies the text, a translation operation is still triggered.

Third combination: The copied text is a text in a non-system language that is entered by the user. For example, in an application in which the user can manually enter a text, such as a, chat application or a memo, the user selects and copies an English text entered by the user. Because the mobile phone recognizes that the copied text includes a non-Chinese text, after the user copies the text, a translation operation is still triggered.

b. Determine whether the non-system language included in the copied text is a preset language supported by the mobile phone system. For example, if the non-system language text copied by the user, such as Russian, is not the preset language supported by the mobile phone system, the translation condition is not met.

c. Determine whether the copied text meets a specific text type. For example, if the copied text is not a character string that has a specific meaning, such as a web address link, an email address, or a password generated by a machine (such as a Taobao password), it is determined that the translation condition is met, d. Determine whether the source application of the copied text meets a specific application type. For example, if the application is not a separate professional translation application such as a translation application, or is not a shopping and entertainment application such as Taobao or Tik Tok, it is determined that the translation condition is met.

It should be noted that the foregoing listed determining conditions a, b, c, and d may all be met, or any one or more of the determining conditions may be met. An implementation of this application is not limited herein.

S1710: When determining that the translation condition is met, the service logic processing module sends the clipboard content to a translation server to request a translation result.

For example, the mobile phone is responsible for obtaining, by using the translation server, translation result content of the obtained text copied by the user. The translation server may be a third-party professional translation service provider, or may be a translation server provided by a manufacturer of the mobile phone. An implementation of this application is not limited herein.

For example, the mobile phone may alternatively obtain translation result content from a translation application installed in the mobile phone or a translation dictionary built in the mobile phone system, instead of using a cloud service, so that a translation function may be implemented offline without accessing a network.

S1711: When determining that the translation condition is met, the service logic processing module sends, to a service presentation module, an instruction for notifying to display a floating ball.

For example, the service presentation module is configured to coordinate a window manager to present the floating ball and a floating window in a mobile phone interface.

S1712: The service presentation module sends an instruction for displaying the floating ball to the window manager.

S1713: The window manager returns an instruction for displaying the floating ball to the service presentation module.

For example, the window manager is responsible for coordinating display of the floating ball, and needs to cooperate with the service presentation module.

S1714: The translation server sends translation result content to the service logic processing module.

S1715: The service presentation module displays the floating ball.

S1716: The user triggers a floating ball tap event.

For example, when the service presentation module displays the floating ball, the translation result content corresponding to the copied text of the user exists in the service logic processing module. Therefore, when the user needs to display the translation result content, that is, touch or tap the floating ball, the translation result may be displayed.

S1717: The service logic processing module determines to display the translation result.

For example, the service logic processing module determines, based on a floating ball touch or tap event of the user, whether to display the received translation result content. If the service logic processing module determines to display the translation result content, the service logic processing module determines to display the floating window.

S1718: When determining to display the translation result, the service logic processing module sends, to the service presentation module, an instruction for notifying to display a floating window.

For example, optionally, the floating window and the flag ball may be displayed at the same time, or one of the two may be displayed.

S1719: The service presentation module sends an instruction for displaying the floating window to the window manager.

S1720: The window manager returns an instruction for displaying the floating window to the service presentation module.

S1721: The service logic processing module sends an instruction for displaying the translation result to the service presentation module.

S1722: The service presentation module displays the floating window and the translation result.

For example, in this embodiment of this application, the floating window has three forms based on different screen occupation heights, that is, a bottom state, a half screen state, and a full-screen state. The three forms of the floating window can be switched to each other according to the operation of the user.

For example, the floating window is a modeless dialog box. In a state of displaying the floating window, the user may implement continuous text copying without closing the floating window after copying a new text and triggering translation manually.

For example, in an implementation of this application, the floating window does not preempt the focus of the window. When using the floating window in the implementation of this application, the user may return the floating window to the bottom state by touching or tapping a region outside the floating window, to continue to browse content of the current application, without closing the floating window.

S1723: The user triggers an event of touching or tapping a region outside the floating window.

S1724: The service presentation module sends an instruction for displaying the floating window in a bottom state to the window manager.

S1725: The window manager returns an instruction for displaying the floating window in the bottom state to the service presentation module.

S1726: The service presentation module displays the floating window in the bottom state.

Figure 18A:
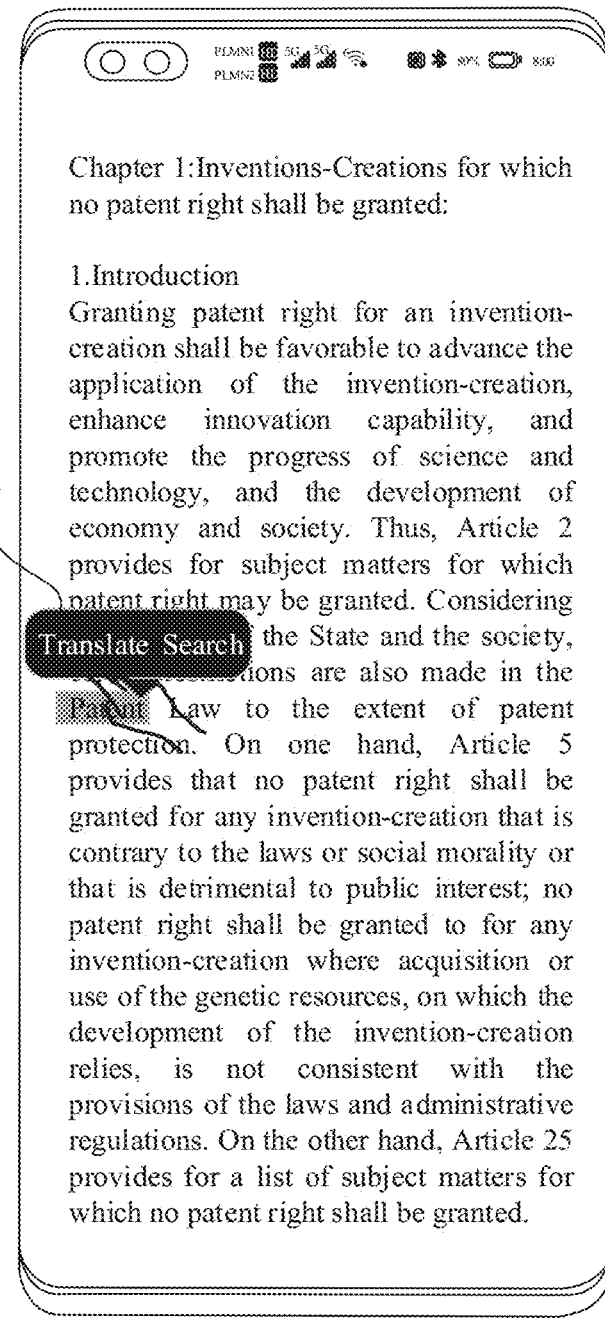
FIG. 18(a) and FIG. 18(b) are a schematic diagram of other translation interface triggering according to an embodiment of this application.
Figure 18B:
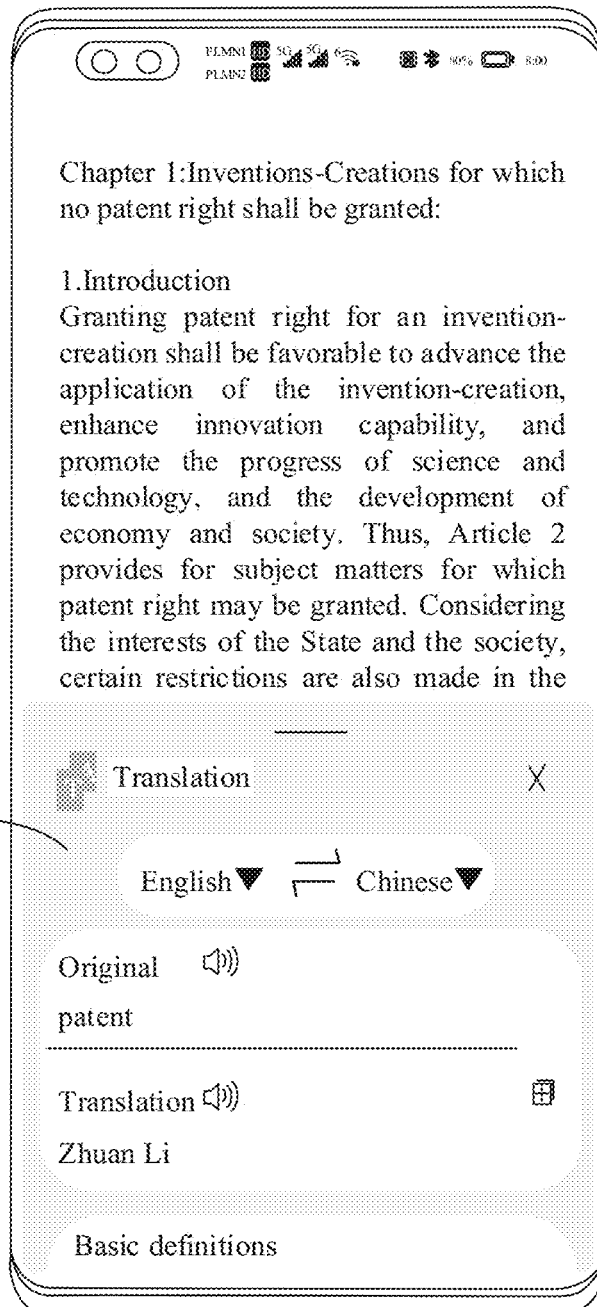

FIG. 18(*a*) and FIG. 18(*b*) show another implementation of this application. The implementation is consistent with the foregoing implementations in FIG. 1 to FIG. 17A to FIG. 17C. For example, a difference includes the following.

First, in FIG. 18(*a*), after the user selects a text, an option bar 1801 includes at least an operation option such as "translation". In FIG. 3(*a*), the option bar 301 includes the "copy" option, used by the mobile phone to trigger recognition of the text copy intention of the user after a content change in the clipboard is monitored. In FIG. 18(*a*), because the option "translation" directly describes a text translation intention of the user, the option can be used to directly trigger a translation operation.

Second, after the user selects and taps the "translation" option in the option bar 1801, the mobile phone directly displays a floating window 1802 in FIG. 18(*b*). The floating window 1802 is the same as the floating window 304 shown in FIG. 3(*d*), and the same translation result is displayed. Optionally, an initial state of the floating window is a half-screen state, or may be a bottom state or a full-screen state.

Third, the mobile phone directly displays the floating window 1802 after the user selects and taps the "translation" option in the option bar 1801. Therefore, in this implementation of this application, for example, the floating ball sign 302 shown in FIG. 3(*b*), the floating ball 303 in the first state in FIG. 3(*c*), and the floating ball 402 in the second state in FIG. 4A(b) are not displayed.

Figure 19A:
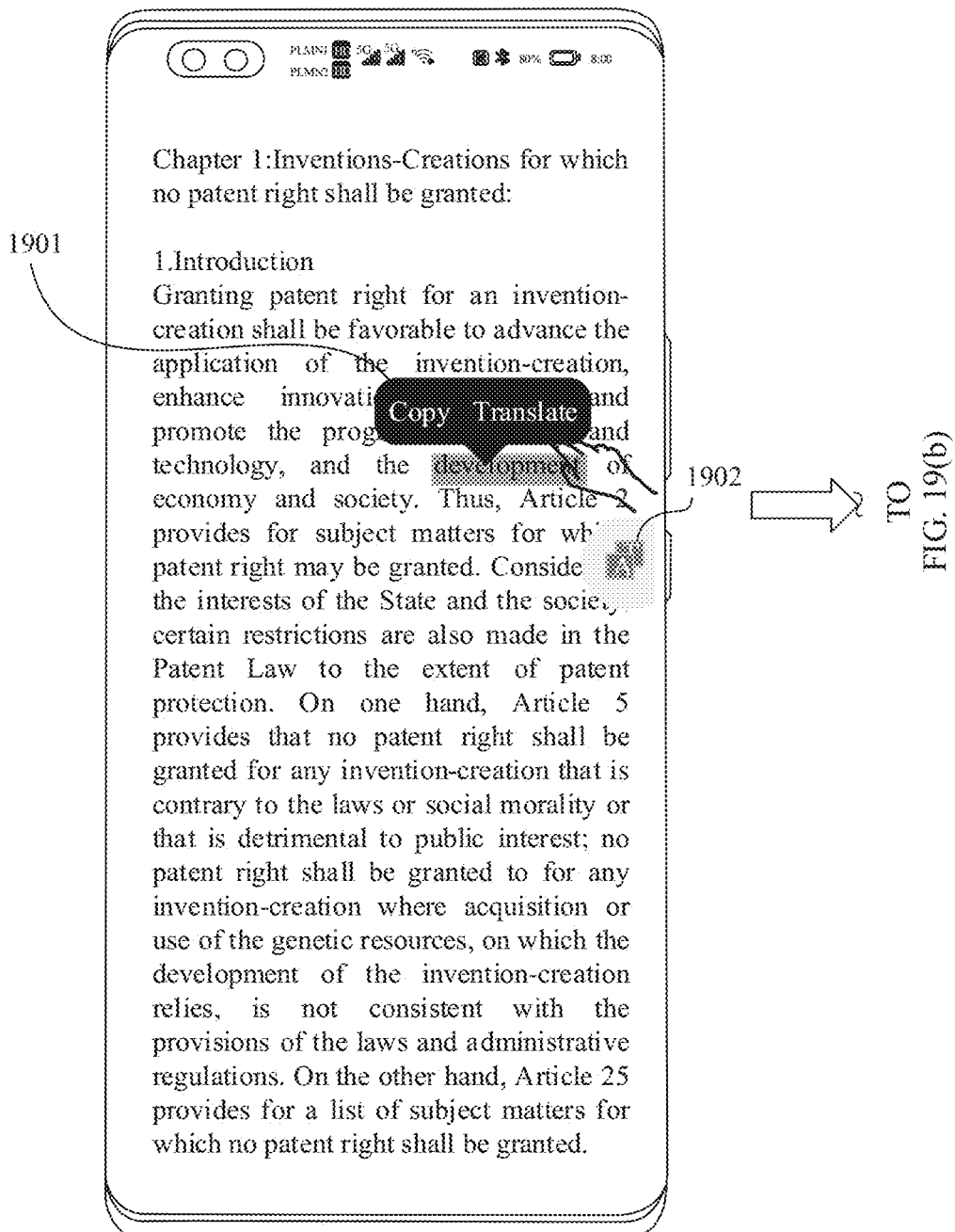
FIG. 19(a) and FIG. 19(b) are a schematic diagram of other translation interface triggering according to an embodiment of this application.
Figure 19B:
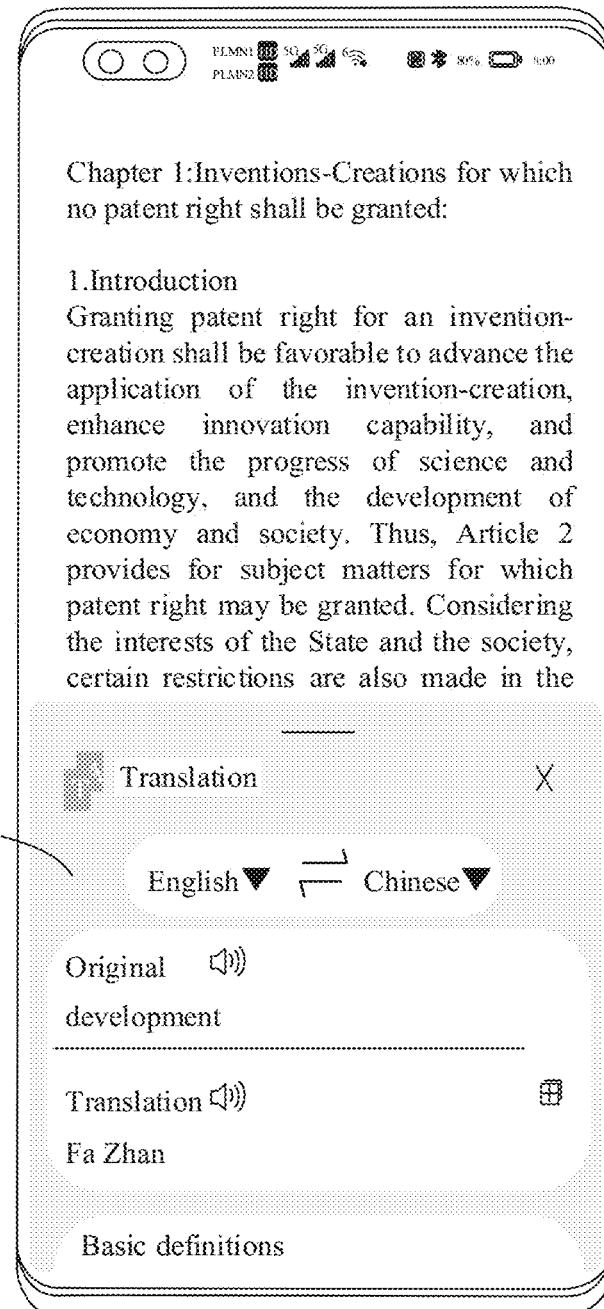

FIG. 19(*a*) and FIG. 19(*b*) show another implementation of this application. The implementation is consistent with the foregoing implementations in FIG. 1 to FIG. 18(*a*) and FIG. 18(*b*). For example, in the implementation of FIG. 19(*a*) and FIG. 19(*b*), in FIG. 19(*a*), an option bar 1901 includes both a "copy" option and a "translation" option. This is different from FIG. 3(*a*) in which the option bar 301 includes the "copy" option, and FIG. 18(*a*) in which the option bar 1801 includes at least an operation option such as "translation". Therefore, in the implementation of FIG. 19(*a*) and FIG. 19(*b*) in this application, the implementations in FIG. 1 to FIG. 17A to FIG. 17C and FIG. 18(*a*) and FIG. 18(*b*) are included. That is, the user may trigger translation in the implementation of "copy" in FIG. 1 to FIG. 17A to FIG. 17C, or may trigger translation in the implementation of "translation" in FIG. 18(*a*) and FIG. 18(*b*). Therefore, the user can flexibly select one or both of the two implementations according to user preferences.

For example, that the user triggers translation in the implementation of "copy" in FIG. 1 to FIG. 17A to FIG. 17C is used as an example. In FIG. 19(*a*), the user triggers translation of the word "patent" in the implementation of "copy" in FIG. 3(*a*). After implementation in FIG. 3(*b*) and FIG. 3(*c*), the user does not tap the floating ball 303 within a preset time period. Therefore, the mobile phone interface displays the interface in FIG. 4A(b). If the user needs to perform translation in this case, for example, the user needs to translate the word "development", optionally, there are the following manners.

First, the user may touch or tap a floating ball 1902 to trigger translation, and corresponding translation result content is displayed in a floating window 1903 in FIG. 19(*b*), It should be noted that an implementation of the floating ball 1902 corresponds to the floating ball 402 in FIG. 4A(a) to FIG. 4A(d), and an implementation of the floating window 1903 is the same as that in FIG. 1 to FIG. 18(*a*) and FIG. 18(*b*).

Second, the user may touch or tap a "translation" option in an option bar 1901, and corresponding translation result content is displayed in a floating window 1903 in FIG. 19(*b*). It should be noted that the implementation in which the "translation" option triggers translation is the same as that in FIG. 18(*a*) and FIG. 18(*b*), and the implementation of the floating window 1903 is the same as that in FIG. 1 to FIG. 18(*a*) and FIG. 18(*b*).

The foregoing descriptions are merely specific implementations of the present invention, and any modification or replacement readily figured out by a person skilled in the art within the technical scope disclosed in the present invention shall fall within the protection scope of the present invention. The protection scope of the present invention shall be subject to the protection scope of the claims.

What is claimed is:

1. A translation method, applied to an electronic device configured to execute an application, the method comprising:
   displaying a first interface of the application, wherein the first interface comprises a first text;
   responsive to receiving a first operation of a user on the first text, displaying a first control, wherein the first control comprises a copy option and a translation option;
   responsive to receipt of a copy operation of the user on the copy option, writing the first text into a clipboard of the electronic device and displaying a first floating ball control in the first interface;
   responsive to receipt of a floating ball operation of the user on the first floating ball control, displaying a floating window in the first interface, wherein the floating window comprises the first text in a first language and a first translation in a second language corresponding to the first text, and the floating window is displayed in a first state; and
   responsive to receipt of a translation operation of the user on the translation option, displaying the floating window in the first interface, wherein the floating window is displayed in a second state.

2. The translation method of claim 1, wherein the first state of the floating window comprises any one of a bottom state, a half-screen state, or a full-screen state, and wherein the second state of the floating window comprises any one of the bottom state, the half-screen state, or the full-screen state.

3. The translation method of claim 1, wherein after the floating window is displayed, the first interface further comprises a first region that is a region other than the floating window in the first interface.

4. The translation method of claim 3, wherein in response to a third operation of the user on the first region, the floating window is displayed in a third state that comprises any one of a bottom state, a half-screen state, or a full-screen state, wherein the third state is the same as or different from the first state, wherein the third state is the same as or different from the second state, and wherein the third operation comprises any one of a touch operation, a tap operation, a slide operation, or a touch and hold operation on the first region.

5. The translation method of claim 4, wherein the first interface further comprises a second text, the first control is displayed in response to a fourth operation of the user on the second text, the fourth operation comprises any one of a selection operation, a touch operation, a tap operation, a slide operation, a touch and hold operation, or a double-tap operation on the second text, the second text is the same as or different from the first text, the second text does not comprise a web address, an email address, or a password generated by a machine, and the second text is different from a system language of the electronic device.

6. The translation method of claim 5, wherein in response to a copy operation of the user on the copy option, the second text is written into the clipboard of the electronic device, the floating window is displayed in the first interface, the floating window is displayed in a fourth state, the floating window comprises the second text and a second translation corresponding to the second text, the floating window comprises neither the first text nor the first translation, and the fourth state is the same as or different from the third state.

7. The translation method of claim 5, wherein the floating window is displayed in the first interface in response to a translation operation of the user on the translation option, the floating window is displayed in a fifth state, the floating window comprises the second text and a second translation corresponding to the second text, the floating window comprises neither the first text nor the first translation, and the fifth state is the same as or different from the third state.

8. The translation method of claim 1, wherein the floating window is slidable, the floating window has any one or more of a bottom state, a half-screen state, or a full-screen state, and the floating window is slid in or between any one or more of the bottom state, the half-screen state, or the full-screen state,
   wherein in response to a first slide operation of the user on the floating window in the first state, either a) after it is determined that the slide operation meets a sliding condition, the floating window is displayed in a sixth state, wherein the sixth state is different from the first state, and the sixth state comprises any one of the bottom state, the half-screen state, or the full-screen state, or b) after it is determined that the slide operation does not meet a sliding condition, the floating window is displayed in a seventh state, wherein the seventh state is the same as the first state, and the seventh state comprises any one of the bottom state, the half-screen state, or the full-screen state, and
   wherein in response to a second slide operation of the user on the floating window in the second state, either c) after it is determined that the slide operation meets a sliding condition, the floating window is displayed in an eighth state, wherein the eighth state is different from the second state, or d) after it is determined that the slide operation does not meet a sliding condition, the floating window is displayed in a ninth state, wherein the ninth state is the same as the second state, wherein the eighth state comprises any one of the bottom state, the half-screen state, or the full-screen state, and the ninth state comprises any one of the bottom state, the half-screen state, or the full-screen state.

9. The translation method of claim 8, wherein the sliding condition comprises meeting any one or more of a sliding distance, a sliding speed, or a sliding direction, wherein determining that the sliding distance meets the sliding condition comprises determining that the sliding distance is greater than one quarter of a screen height of the electronic device, wherein when the sliding distance is greater than one quarter of the screen height of the electronic device and less than three quarters of the screen height, the method further comprises switching the floating window between the bottom state and the half-screen state or the half-screen state and the full-screen state, and wherein when the sliding distance is greater than three quarters of the screen height of the electronic device, the method further comprises switching the floating window between the bottom state and the full-screen state.

10. The translation method of claim 1, further comprising:
   responsive to receipt of the floating ball operation, performing a translation operation on the first text in the first language to determine the first translation in the second language; and
   pre-loading a first detailed translation corresponding to the first translation while the floating window is in the first state, wherein the first detailed translation comprises content that is of the first translation and that is displayed in the floating window in a second state but not displayed in the floating window in the first state.

11. The translation method of claim 10, wherein the floating window further comprises a first internal window, and the first internal window comprises the first translation and/or the first detailed translation, wherein the first internal window is slidable and configured to display content corresponding to the first translation, wherein when the floating window is in the full-screen state, in response to a second slide operation performed by the user on the first internal window, the first internal window displays a second detailed translation, and the second detailed translation comprises a part of the first detailed translation.

12. The translation method of claim 1, wherein before the first interface that is of the application and that comprises the first floating ball control is displayed, the method further comprises: displaying a second control in the first interface in response to a fifth operation of the user on a third text, wherein the first interface further comprises the third text, the fifth operation comprises any one of a selection operation, a touch operation, a tap operation, a slide operation, a touch and hold operation, or a double-tap operation on the third text, the third text is the same as or different from the first text, the third text does not comprise a web address, an email address, or a password generated by a machine, and the third text is different from a system language of the electronic device, and wherein an option in the second control comprises a copy option or a cut option.

13. The translation method of claim 12, wherein a second floating ball control is displayed in the first interface in response to a sixth operation of the user on the second control, and the sixth operation comprises either of a copy operation on the copy option in the second control or a cut operation on the cut option, wherein the second floating ball control and the first floating ball control are displayed on a same side of the first interface of the application on the electronic device, and wherein locations at which the second floating ball control and the first floating ball control are displayed on the same side are the same or different.

14. The translation method of claim 13, further comprising displaying the floating window in response to a seventh operation of the user on the second floating ball control, wherein the floating window comprises the third text and a third translation corresponding to the third text, and the seventh operation comprises any one of a touch operation, a tap operation, or a touch and hold operation.

15. The translation method of claim 13, further comprising displaying a floating ball sign before the second floating ball control is displayed, wherein after a first preset time period, the floating ball sign disappears, and the second floating ball control is displayed, and wherein the floating ball sign is used to determine that the sixth operation meets a translation condition, and the translation condition comprises any one or more of a language type of the third text, content of the third text, or a type of the application.

16. The translation method of claim 13, further comprising:
canceling display of the second floating ball control; and
displaying the first floating ball control when determining that none of a touch operation, a tap operation, a slide operation, or a touch and hold operation of the user on the second floating ball control is detected within a second preset time period,
wherein the floating window is displayed in the first interface in response to an eighth operation performed by the user on the first floating ball control, the floating window comprises the third text and a third translation corresponding to the third text, and the eighth operation comprises any one of a touch operation, a tap operation, or a touch and hold operation, wherein the first interface further comprises a fourth text, if the first floating ball control is displayed in the first interface, the second control is displayed in the first interface in response to a ninth operation performed by the user on the fourth text, and the first floating ball control continues to be displayed in the first interface in response to a tenth operation performed by the user on the second control, wherein the ninth operation comprises any one of a selection operation, a touch operation, a tap operation, a slide operation, a touch and hold operation, or a double-tap operation on the fourth text, the tenth operation comprises either of a copy operation on the copy option in the second control or a cut operation on the cut option, the fourth text is the same as or different from the third text, the fourth text does not comprise a web address, an email address, or a password generated by a machine, and the fourth text is different from the system language of the electronic device, and wherein the floating window is displayed in the first interface in response to an eleventh operation performed by the user on the first floating ball control, the floating window comprises the fourth text and a fourth translation corresponding to the fourth text, and the eleventh operation comprises any one of a touch operation, a tap operation, or a touch and hold operation on the first floating ball control.

17. The translation method of claim 1, wherein the floating window is a system window, and the system window is different from an application window of the application, wherein the floating window comprises a modeless dialog box, and when the floating window is displayed in the first interface, either of the first interface or the floating window is slidable.

18. The translation method of claim 1, wherein a window attribute of the floating window is set to comprise a flag to indicate touch processing characteristics related to the floating window and the first interface, and the floating window does not preempt a window focus with the first interface of the application, wherein when the floating window is displayed in the first interface, if the first interface is slid, the floating window does not disappear, and in response to a fact that the floating window is slid, the first interface does not disappear, and wherein if the floating window is slid, the first interface does not disappear, and in response to a fact that the first interface is slid, the floating window does not disappear.

19. An electronic device, comprising:
a processor; and
a memory coupled to the processor, wherein the memory is configured to store instructions that, when executed by the processor, cause the electronic device to be configured to:
display a first interface of an application executed by the electronic device, wherein the first interface comprises a first text;
responsive to receiving a first operation of a user on the first text, display a first control, wherein the first control comprises a copy option and a translation option;

responsive to receipt of a copy operation of the user on the copy option, write the first text into a clipboard of the electronic device display a first floating ball control in the first interface;

responsive to receipt of a floating ball operation of the user on the first floating ball control, display a floating window in the first interface, wherein the floating window comprises the first text in a first language and a first translation in a second language corresponding to the first text, and the floating window is displayed in a first state;

and responsive to receipt of a translation operation of the user on the translation option, display the floating window in the first interface, wherein the floating window is displayed in a second state.

20. A non-transitory computer-readable storage medium storing instructions that, when executed by a processor of an electronic device, cause the electronic device to be configured to:

display a first interface of an application executed by the electronic device, wherein the first interface comprises a first text;

responsive to receiving a first operation of a user on the first text, display a first control, wherein the first control comprises a copy option and a translation option;

responsive to receipt of a copy operation of the user on the copy option, write the first text into a clipboard of the electronic device display a first floating ball control in the first interface;

responsive to receipt of a floating ball operation of the user on the first floating ball control, display a floating window in the first interface, wherein the floating window comprises the first text in a first language and a first translation in a second language corresponding to the first text, and the floating window is displayed in a first state;

and responsive to receipt of a translation operation of the user on the translation option, display the floating window in the first interface, wherein the floating window is displayed in a second state.

\* \* \* \* \*